United States Patent
Lambiri et al.

(10) Patent No.: US 7,933,885 B1
(45) Date of Patent: Apr. 26, 2011

(54) LONGEST MATCHING PREFIX SEARCH ENGINE WITH HIERARCHICAL DECODERS

(75) Inventors: Cristian Lambiri, Ottawa (CA); Paul Nadj, Ottawa (CA)

(73) Assignee: NetLogic Microsystems, Inc., Santa Clara, CA (US)

( * ) Notice: Subject to any disclaimer, the term of this patent is extended or adjusted under 35 U.S.C. 154(b) by 447 days.

(21) Appl. No.: 12/110,103

(22) Filed: Apr. 25, 2008

(51) Int. Cl.
  *G06F 7/00* (2006.01)
  *G06F 17/30* (2006.01)

(52) U.S. Cl. ...................................... 707/706; 707/745

(58) Field of Classification Search .................. 707/706, 707/711
  See application file for complete search history.

(56) References Cited

U.S. PATENT DOCUMENTS

| | | | |
|---|---|---|---|
| 4,677,550 A | 6/1987 | Ferguson | |
| 5,497,485 A | 3/1996 | Ferguson et al. | |
| 5,664,184 A | 9/1997 | Ferguson et al. | |
| 6,532,457 B1 | 3/2003 | Tal et al. | |
| 6,539,369 B2 | 3/2003 | Brown | |
| 6,560,610 B1 | 5/2003 | Eatherton et al. | |
| 6,594,655 B2 * | 7/2003 | Tal et al. | 707/797 |
| 6,694,323 B2 | 2/2004 | Bumbulis | |
| 6,928,430 B1 | 8/2005 | Chien et al. | |
| 6,947,931 B1 | 9/2005 | Bass et al. | |
| 6,963,868 B2 * | 11/2005 | Basso et al. | 1/1 |
| 7,249,149 B1 | 7/2007 | Eatherton et al. | |
| 7,287,033 B2 * | 10/2007 | Shadmon et al. | 1/1 |
| 7,299,235 B2 | 11/2007 | Sample | |

* cited by examiner

*Primary Examiner* — Apu M Mofiz
*Assistant Examiner* — Jared M Bibbee
(74) *Attorney, Agent, or Firm* — Mahamedi Paradice Kreisman LLP; William L. Paradice, III

(57) ABSTRACT

A search engine searches a database for key candidates having a longest matching prefix with a search key. The search engine includes first stage decoders each having a matrix of interconnected cells for identifying preliminary candidate keys in the database. The search engine also includes a second stage decoder having a matrix of interconnected cells for identifying secondary candidate keys from the preliminary candidate keys. Additionally, the search engine includes a longest candidate prefix module to determine whether one of the secondary candidate keys matches the search key. In some embodiments, the search engine includes a longest prefix match module for identifying the secondary candidate key having a longest matching prefix with the search key.

8 Claims, 28 Drawing Sheets

700

705

| 310a | 310e | 310f |
|------|------|------|
| 7*   | 6*   | 6    |

715

| 320a     | 320e     | 320f     | 320g     |
|----------|----------|----------|----------|
| ******** | 1******* | 1000011* | 110100** |

| 310a | 310f |
|------|------|
| 7*   | 6    |

2515

| 320a      | 320f      | 320g      |
|-----------|-----------|-----------|
| ******** | 1000011* | 110100** |

FIG. 25

LONGEST MATCHING PREFIX SEARCH ENGINE WITH HIERARCHICAL DECODERS

BACKGROUND

A computer database typically includes a collection of records, each of which is identified by a unique key. One technique for locating a record in such a database involves a search key and a search tree. The search tree includes nodes and leafs interconnected with branches. Each of the nodes includes data for making a branching decision at the node based on the search key. Each leaf includes a unique key associated with a record in the database. A search of the database is performed by comparing the search key with the data of a root node in the search tree and making a branching decision based on a result of that comparison to identify another node or a leaf in the search tree. This process is repeated until a leaf is identified in the search tree. In this way, the unique key associated with the record is identified.

In one type of search tree, the unique keys in the database are numerical or character strings. Moreover, each node in the search tree is associated with a common prefix of one or more unique keys in the database. Generally, the common prefix associated with the root node of the search tree is an empty string and the length of the common prefixes increase at each lower level of the search tree. This type of search tree is often referred to as a search trie. A search of the database is performed by comparing the search key with the common prefix associated with a root node of the search trie to determine the next number or character following the common prefix in the search key. A branching decision is then made based on the next number or character to identify another node or a leaf in the search trie. This process is repeated until a leaf is identified in the search tree.

In one form of a search trie, branching decisions are based on single binary digits. Moreover, each node of the search trie is associated with a common prefix of binary digits. In this form of search trie, the search key is a string of binary digits and branching decisions are made at a node of the search trie based on a distinguishing bit associated with the node. The distinguishing bit represents the next bit following the common prefix associated with the node. This type of search tree is often referred to as a digital search trie. Such a digital search trie may include a one-way branch at a node along a path from the root node to a leaf in the digital search trie. Such a path in the digital search trie may be compressed by collapsing the node with another node at a higher level of the digital search trie. This type of path-compressed digital search trie is often referred to as a Patricia trie.

Some applications require searching a computer database to find the key in the computer database having a longest common prefix with a search key. For example, an application may require searching a computer database of Internet Protocol (IP) addresses to find the IP address having a longest common prefix with a search key. In some applications, a computer database including a digital search trie is stored in a memory and a computer program is executed to search the database in the memory. In other applications, a digital search trie of a computer database is implemented in hardware to improve searching performance. Although searching performance is improved in these applications over those in which a digital search trie is stored in a memory, the hardware uses a linear decoding technique to identify a key in the digital search trie based on a search key.

In light of the above, a need exits for an improved system and method of searching a computer database for a key having a longest matching prefix with a search key.

SUMMARY

In various embodiments, a search engine searches a database for key candidates having a common prefix with a search key. The search engine includes first stage decoders each having a matrix of interconnected cells for identifying preliminary candidate keys in the database. The search engine also includes a second stage decoder having a matrix of interconnected cells for identifying secondary candidate keys from the preliminary candidate keys. Additionally, the search engine includes a longest candidate prefix module to determine whether one of the secondary candidate keys matches the search key. In some embodiments, the search engine includes a longest prefix match module for identifying the secondary candidate key having a longest matching prefix with the search key. An advantage of the search engine is that a search may be performed in parallel with a linear time complexity and the cells in the decoders have a near-linear space complexity.

A search engine, in accordance with one embodiment, searches a database including a first sequence of distinguishing bit indexes and a sequence of keys together representing a first digital search trie. The search engine includes first stage decoders, a distinguishing bit selection module coupled to the first stage decoders, and a second stage decoder coupled to the distinguishing bit selection module. The first stage decoders are configured to generate a first sequence of key indexes based on the first sequence of distinguishing bit indexes and a search key. Each key index of the first sequence of key indexes identifies a preliminary candidate key in the sequence of keys. The distinguishing bit selection module is configured to generate a second sequence of distinguishing bit indexes based on the first sequence of distinguishing bit indexes and the first sequence of key indexes. The second sequence of distinguishing bit indexes and the sequence of preliminary candidate keys together represent a second digital search trie. The second stage decoder is configured to generate a second sequence of key indexes based on the search key and the second sequence of distinguishing bit indexes. Each key index in the second sequence of key indexes identifies a secondary candidate key in the sequence of keys having a matching prefix with the search key.

A search engine, in accordance with one embodiment, searches a database including a first sequence of distinguishing bit indexes and a sequence of keys together representing a first digital search trie. The search engine includes first stage decoders, a distinguishing bit module coupled to the first stage decoders, and a second stage decoder coupled to the distinguishing bit module. Each first stage decode is configured to identify at least one preliminary candidate key in the database based on a search key and a subsequence of distinguishing bit indexes corresponding to the first stage decoder in the first sequence of distinguishing bit indexes. The distinguishing bit selection module is configured to generate a second sequence of distinguishing bit indexes based on the first sequence of distinguishing bit indexes and the preliminary candidate keys identified by the first stage decoders. The second stage decoder is configured to identify at least one secondary candidate key in the database having a common prefix with the search key based on the second sequence of distinguishing bit indexes and the search key.

A method, in accordance with one embodiment, searches a database comprising a first sequence of distinguishing bit indexes and a sequence of keys together representing a first digital search trie. The method includes partitioning the sequence of distinguishing bit indexes into subsequences of distinguishing bit indexes. Further, the method includes identifying at least one preliminary candidate key in the database for each subsequence of distinguishing bit indexes based on the subsequence of distinguishing bit indexes and a search key. The method also includes generating a second sequence of distinguishing bit indexes based on the subsequences of distinguishing bit indexes and the identified preliminary key candidates. Additionally, the method includes identifying at least one secondary candidate key in the database having a matching prefix with the search key based on the second sequence of distinguishing bit indexes and the search key.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 7 is a block diagram of a database, in accordance with an embodiment of the present invention.

FIG. 25 is a block diagram of a database, in accordance with an embodiment of the present invention.

DETAILED DESCRIPTION

In various embodiments, a search engine searches a database including a sequence of distinguishing bit indexes and a sequence of keys that together represent a digital search trie. The search engine identifies preliminary candidate keys based on subsequences in the sequence of distinguishing bit index and a search key. Additionally, the search engine generates a sequence of distinguishing bit indexes for the preliminary candidate keys. The sequence of distinguishing bit indexes generated by the search engine and the preliminary candidate keys together represent another digital search trie. The search engine identifies at least one secondary candidate key from the preliminary candidate keys having a matching prefix with the search key based on the sequence of distinguishing bit indexes generated by the search engine and the search key. In further embodiments, the search engine determines whether the search key matches a secondary candidate key or identifies the secondary candidate key having a longest matching prefix with the search key.

In various embodiments, the search engine includes decoders each having a matrix of interconnected cells for identifying the preliminary candidate keys and a decoder having a matrix of interconnected cells for identifying the secondary candidate keys. In these embodiments, the search engine searches the database in parallel. The cells in the decoders have a space complexity of less than n-squared, where n is the number of keys in the database. In some embodiments, the space complexity of the cells in the decoders is near-linear. In this way, the search engine with near linear space complexity performs a parallel search of the database for identifying a matching key in the database.

Figure 1:
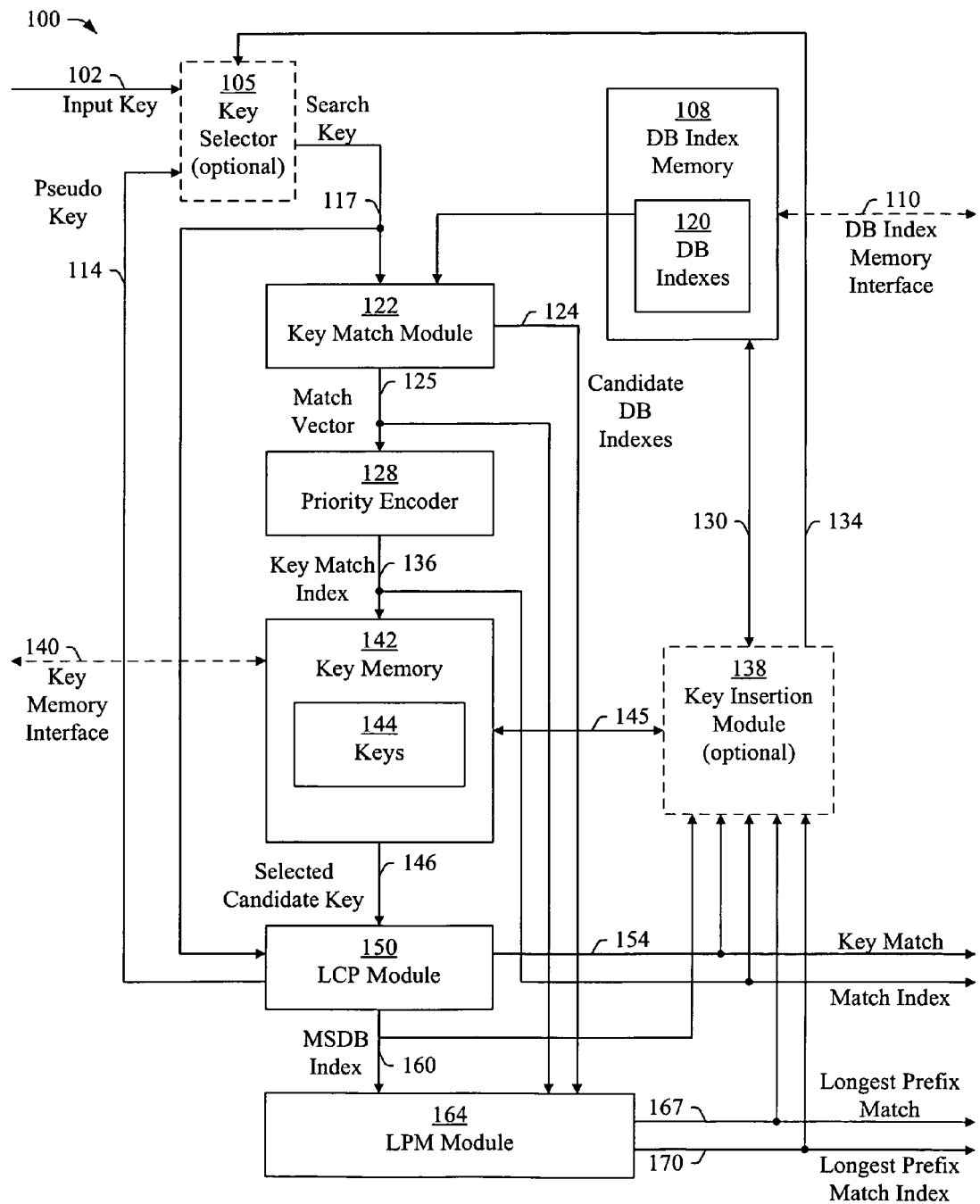
FIG. 1 is a block diagram of a search engine, in accordance with an embodiment of the present invention.

FIG. 1 illustrates a search engine 100, in accordance with an embodiment of the present invention. The search engine 100 includes a distinguishing bit index memory (DB index memory) 108, a key match module 122, a priority encoder 128, a key memory 142, and a longest candidate prefix module (LCP module) 150. The key match module 122 is coupled (e.g., connected) to the distinguishing bit index memory 108 and the priority encoder 128. Additionally, the key memory 142 is coupled (e.g., connected) to the priority encoder 128 and the longest candidate prefix module 150. The distinguishing bit index memory 108 stores a sequence of distinguishing bit indexes (DB indexes) 120 and the key memory 142 stores a sequence of keys 144. The sequence of distinguishing bit indexes 120 and the sequence of keys 144 together represent a digital search trie of a database, as is described more fully herein. In operation, the search engine 100 searches the database for a key that matches a search key 117 or has a longest matching prefix with the search key 117, or both, and outputs a result of that search operation.

In various embodiments, the sequence of distinguishing bit indexes 120 and the sequence keys in the database are in a canonical form and represent a digital trie in the canonical form. In this canonical form, each distinguishing bit index in the sequence of distinguishing bit indexes 120 represents a node in the digital search trie. The first distinguishing bit index in the sequence of distinguishing bit indexes 120 represents a root node (e.g., a top node) in the digital search trie. Each node in the digital search trie has a left branch that is selected in a search if a distinguishing bit identified by the distinguishing bit index of the node has a value of zero. Additionally, each node in the digital search trie has a right branch that is selected in a search if a distinguishing bit identified by the distinguishing bit index of the node has a value of one. The keys in the sequence of keys 144 are ordered from smallest to largest and represent a corresponding sequence of leaves ordered from left to right in the digital search trie. For example, the keys in the sequence of keys 144 may be numbers ordered from smallest to largest numeral value. Also in the canonical form, the branches do not cross each other and the most significant distinguishing bit that differentiates two adjacent keys in the sequence of keys 144 is positioned between the leaves represented by the two adjacent keys. It is to be appreciated that the digital search trie of the database may be constructed in this canonical form by using the sequence of distinguishing bit indexes 120 and the sequence of keys 144 representing the digital search trie.

In a further embodiment, a distinguishing bit may represent a value of zero, one, or *. The * value is a wildcard value representing both the values of zero and one. Moreover, the keys in the sequence of keys 144 are strings ordered from smallest to largest such that the wildcard is considered to represent a value is less than the values of zero and one. For example, the keys in the sequence of keys 144 may be character strings or bit strings. In the canonical form of this further embodiment, a distinguishing bit index in the sequence of distinguishing bit indexes 120 may represent a conventional node or a wildcard node in the digital search trie. Each conventional node in the digital search trie has a left branch that is selected in a search if a distinguishing bit identified by the distinguishing bit index of the conventional node has a value of zero. Additionally, each conventional node in the digital search trie has a right branch that is selected in a search if a distinguishing bit identified by the distinguishing bit index of the conventional node has a value of one. Each wildcard node in the search trie has a left branch and a right branch, both of which are selected in a search regardless of the distinguishing bit identified by the distinguishing bit index of the wildcard node.

In various embodiments, the distinguishing bit index memory 108 provides the sequence of distinguishing bit indexes 120 to the key match module 122. In one embodiment, the distinguishing bit index memory 108 includes an optional distinguishing bit index memory interface (DB Index Memory Interface) 110 for loading distinguishing bits into the distinguishing bit index memory 108. In a further embodiment, the distinguishing bit index memory interface 110 may be used to retrieve distinguishing bits stored in the distinguishing bit index memory 108.

The key match module 122 identifies one or more candidate keys in the database based on the sequence of distinguishing bit indexes 120 and the search key 117. Each candidate key identified by the key match module 122 is a key in the database that potentially matches the search key 117. In this way, the key match module 122 reduces the number of keys in the database that may match the search key 117 to a fewer number of candidate keys. Moreover, the key match module 122 generates a match vector 125 indicating a sequence of the candidate keys identified by the key match module 122 and a sequence of candidate distinguishing bit indexes 124 corresponding to the sequence of candidate keys.

In one embodiment, the match vector 125 is a bit vector having bits corresponding to the sequence of keys 144 and identifying those keys in the sequence of keys 144 that are candidate keys. For example, a bit having a value of one in the bit vector may indicate that a corresponding key in the sequence of keys 144 is a candidate key.

The priority encoder 128 selects a key match index 136 from the sequence of key indexes indicated by the match vector 125 and provides the key match index 136 to the key memory 142. In one embodiment, the priority encoder 128 selects the key match index 136 by selecting the last key index in the sequence of key indexes indicated by the match vector 125. In this embodiment, the key match index 136 identifies the rightmost key in the digital search trie of the database that is a candidate key identified by the key match module 122.

The key memory 142 outputs a selected candidate key 146 stored in the key memory 142 based on the key match index 136 and provides the selected candidate key 146 to the longest candidate prefix module 150. In one embodiment, the key memory 142 includes an optional key memory interface 140 for storing keys in the key memory 142. In a further embodiment, the key memory interface 140 may be used to retrieve keys stored in the key memory 142.

The longest candidate prefix module 150 identifies a longest candidate prefix based on the selected candidate key 146 selected by the key memory 142 and the search key 117. The longest candidate prefix is the longest prefix in the selected candidate key 146 that matches a prefix of the search key 117. For example, if both the selected candidate key 146 and the search key 117 do not have a wildcard bit, the longest candidate prefix is the longest common prefix between the selected candidate key 146 and the search key 117. Additionally, the longest candidate prefix module 150 determines whether the selected candidate key 146 matches the search key 117 and generates a key match indicator (key match) 154 indicating whether the selected candidate key 146 matches the search key 117. For example, if both the selected candidate key 146 and the search key 117 do not have a wildcard bit, the longest candidate prefix module 150 determines that the selected candidate key 146 matches the search key 117 if the longest candidate prefix between the selected candidate key 146 and the search key 117 is the same as the selected candidate key 146 and the search key 117. As illustrated in FIG. 1, the search engine 100 outputs the key match indicator 154, indicating whether the selected candidate key 146 matches the search key 117, and the key match index 136, which identifies the selected candidate key 146. In this way, the search engine searches the database to determine whether the search key 117 matches a key in the database and, if the search key 117 matches a key in the database, the search engine 100 identifies that key.

In some embodiments, the search engine 100 includes a longest prefix match module 164 coupled (e.g., connected) to the distinguishing bit index memory 108, the key match module 122, the longest candidate prefix module 150, and the key insertion module 138. In this embodiment, the longest candidate prefix module 150 identifies a most significant distinguishing bit index (MSDB index) 160 between the selected candidate key 146 and the search key 117 and provides the most significant distinguishing bit index 160 to the longest prefix match module 164. In turn, the longest prefix match module 164 determines whether a candidate key identified by the key match module 122 has a matching prefix with the search key 117. Additionally, the longest prefix match module 164 generates a longest prefix match indicator (longest prefix match) 167 indicating whether any candidate key identified by the key match module 122 has a matching prefix with the search key 117. The longest matching prefix is the longest prefix in the candidate key that matches a prefix in the search key 117. For example, if both a candidate key and the search key 117 do not have any wildcard bits, the longest matching prefix between the candidate key and the search key 117 is the longest common prefix between the candidate key and the search key 117. If at least one candidate key identified by the key match module 122 has a matching prefix with the search key 117, the longest prefix match module 164 identifies the candidate key having a longest matching prefix with the search key 117 and generates a longest prefix match index 170 identifying that candidate key.

In some embodiments, the search engine 100 includes an optional key selector 105 and an optional key insertion module 138. In these embodiments, the key selector 105 is coupled (e.g., connected) to the key match module 122 and the longest candidate prefix module 150. Further, the key insertion module 138 is coupled (e.g., connected) to the distinguishing bit index memory 108, the key memory 142, and the longest candidate prefix module 150. In these embodiments, the longest candidate prefix module 150 generates a pseudo key 114 based on the search key 117 and the selected candidate key 146. The pseudo key 114 includes the longest matching prefix between the search key 117 and the selected candidate key 146. Additionally, each bit following the longest matching prefix in the pseudo key 114 has a value of the most significant distinguishing bit in the search key 117 (e.g., the value of the bit in the search key 117 identified by the most significant distinguishing bit index 160). The search engine 100 uses the pseudo key 114 to insert the search key 117 into the database, as is described more fully herein.

The key insertion module 138 generates a select signal 134 to indicate whether an input key 102 or the pseudo key 114 is to be the search key 117 in a search operation. In turn, the key selector 105 selects the input key 102 or the pseudo key 114 based on the select signal 134 and passes the selected input key 102 or the selected pseudo key 114 as the search key 117. In a search operation, the search engine 100 receives the input key 102, the key selector 105 passes the input key 102 as the search key 117 based on the select signal 134, and the search engine 100 searches the database based on the search key 117 to determine whether the search key 117 matches a key in the sequence of keys 144. In some embodiments, the search engine 100 also identifies a key in the sequence of keys 144 having a longest matching prefix with the search key 117.

In an update operation, key insertion module 138 determines whether to insert the search key 117 into the database based on the result of a search operation. In various embodiments, the key insertion module 138 determines whether to insert the search key 117 into the database based on the key match indicator 154, the match index 136, the longest prefix match indicator 167, or the longest prefix match index 170, or some combination thereof. In further embodiments, the key insertion module 138 also determines whether to insert the search key 117 into the database based on one or more control inputs to the search engine 100.

If the key insertion module 138 determines the search key 117 of a search operation is to be inserted into the database, the key insertion module 138 stores the search key 117 as an insertion key and generates the select signal 134 indicating the search key 117 is to be the pseudo key 114. In turn, the key selector 105 selects the pseudo key 114 based on the select signal 134 and passes the pseudo key 114 as the search key 117. Further, the search engine 100 performs a search operation on the search key 117 and the longest prefix match module 164 generates the longest prefix match index 170 identifying a key in the sequence of keys 144 having a longest matching prefix with the pseudo key 114. The key insertion module 138 inserts the insertion key into the sequence of keys 144 of the key memory 142 through a communication bus 145 based on the longest prefix match index 170 by writing the insertion key into the key memory 142. Additionally, the key insertion module 138 inserts the most significant distinguishing bit index 160 into the sequence of distinguishing bit indexes 120 of the distinguishing bit index memory 108 through a communication bus 130 by writing the most significant distinguishing bit index 160 into the distinguishing bit index memory 108. In this way, the key insertion module 138 inserts the insertion key into the database.

In various embodiments, the search engine 100 performs a first search operation using the search key 117 to generate a pseudo key 114 and performs a second search operation using the pseudo key 114 to identify a predecessor key or a successor key of the search key 117 used in the first search operation. The key identified by the longest prefix match index 170 generated by the longest prefix match module 164 in the second search operation is the predecessor key or the successor key of the search key 117 used in the first search operation.

If the value of the bit (e.g., the key value) in the search key 117 identified by the most significant distinguishing bit index 160 in the first search operation is one, the key insertion module 138 determines the key identified by the longest prefix match index 170 in the second search operation is a predecessor key of the search key 117. Additionally, the key insertion module 138 identifies the most significant distinguishing bit index associated with the predecessor key in the sequence of distinguishing bit indexes 120 based on the canonical form of the sequence of distinguishing bit indexes 120 and the sequence of keys 144. The most significant distinguishing bit index associated with the predecessor key represents a node connected to the predecessor key in the digital search trie represented by the sequence of distinguishing bit indexes 120 and the sequence of keys 144. The key insertion module 138 inserts the search key 117 used in the first search operation into the sequence of keys 144 immediately after the predecessor key and inserts the most significant distinguishing bit index 160 generated in the second search operation immediately before the most significant distinguishing bit index associated with the predecessor key in the sequence of distinguishing bit indexes 120.

Otherwise, if the value of the bit (e.g., the key value) in the key identified by the most significant distinguishing bit index 160 in the second search operation is zero, the key insertion module 138 determines the key identified by the longest prefix match index 170 in the second search operation is a successor key of the search key 117. Additionally, the key insertion module 138 identifies the most significant distinguishing bit index associated with the successor key in the sequence of distinguishing bit indexes 120 based on the canonical form of the sequence of distinguishing bit indexes 120 and the sequence of keys 144. The most significant distinguishing bit index associated with the successor key represents a node connected to the successor key in the digital search trie represented by the sequence of distinguishing bit indexes 120 and the sequence of keys 144. The key insertion module 138 inserts the search key 117 used in the first search operation into the sequence of keys 144 immediately before the successor key and inserts the most significant distinguishing bit index 160 generated in the second search operation immediately after the most significant distinguishing bit index associated with the successor key in the sequence of distinguishing bit indexes 120.

Figure 2:
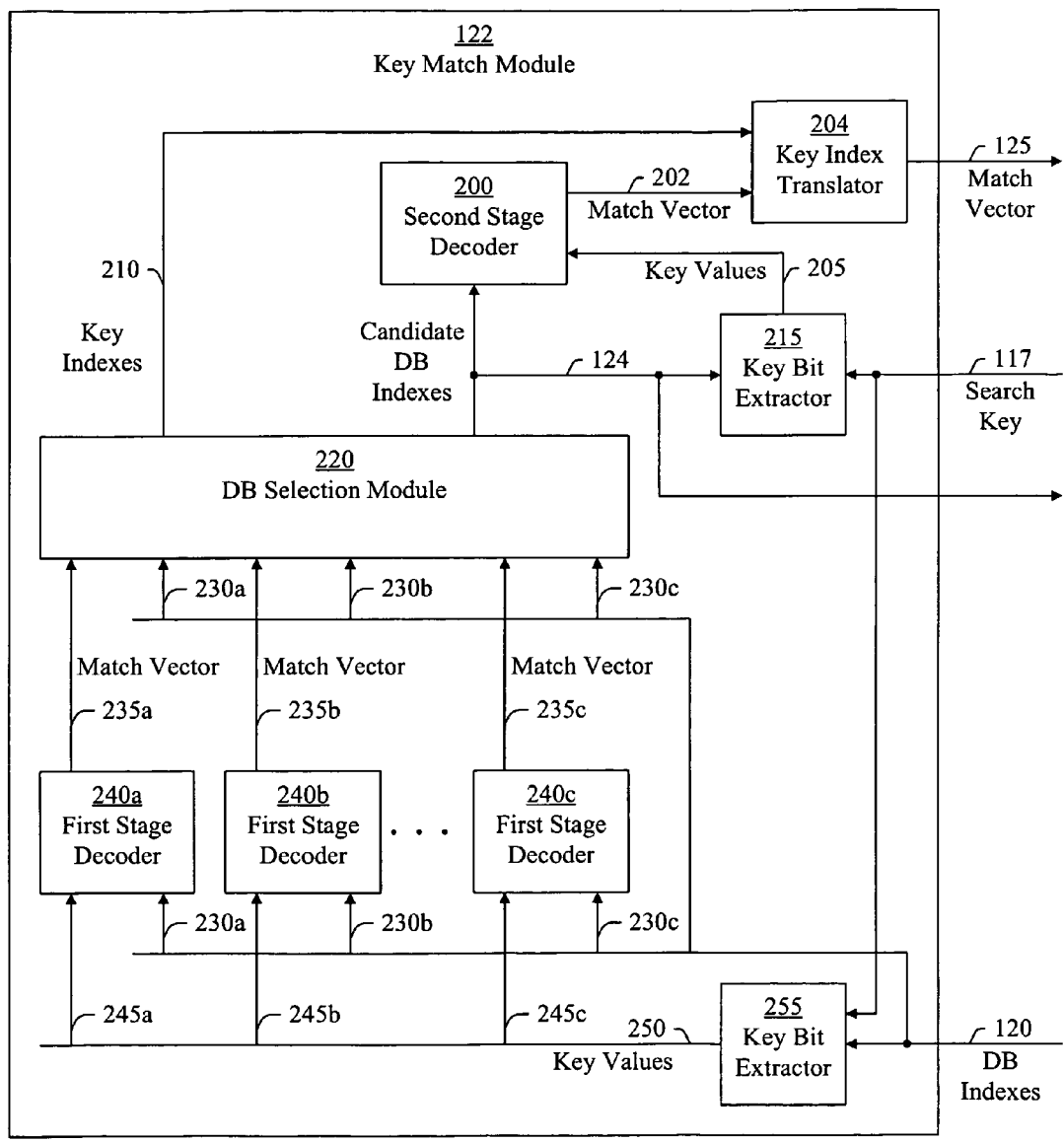
FIG. 2 is a block diagram of a key match module, in accordance with an embodiment of the present invention.

FIG. 2 illustrates the key match module 122, in accordance with an embodiment of the present invention. The key match module 122 includes a second stage decoder 200, a key index translator 204, a key bit extractor 215, a distinguishing bit selection module (DB selection module) 220, first stage decoders 240 (e.g., first stage decoders 240a-c), and a key bit extractor 255. The key bit extractor 215 is coupled to the second stage decoder 200 and the distinguishing bit selection module 220. The key index translator 204 is coupled to the second stage decoder 200 and the distinguishing bit selection module 220. Further, the distinguishing bit selection module 220 is coupled to the second stage decoder 200 and each of the first stage decoders 240. Additionally, the key bit extractor 255 is coupled to each of the first stage decoders 240. Although three first stage decoders 240 are illustrated in FIG. 2, the key match module 122 may have more or fewer than three first stage decoders 240 in other embodiments.

The key bit extractor 255 identifies data bits in the search key 117 based on the sequence of distinguishing bit indexes 120 and generates a sequence of key values 250 based on the identified data bits. In one embodiment, the key bit extractor 255 identifies each data bit in the search key 117 corresponding to a distinguishing bit index in the sequence of distinguishing bit indexes 120. In this way, the key bit extractor 255 identifies a key value in the search key 117 for each node in the digital search trie represented by the sequence of distinguishing bit indexes 120 and the sequence of keys 144.

Further in this embodiment, the sequence of key values 250 is a sequence of the identified data bits ordered according to the corresponding distinguishing bit indexes in the sequence of distinguishing bit indexes 120. Each of the first stage decoders 240 receives a subsequence of distinguishing bit indexes 230 (e.g., subsequences of distinguishing bit indexes 230a-c) for a corresponding partition of the sequence of distinguishing bit indexes 120. In one embodiment, the key bit extractor 255 partitions the sequence of distinguishing bit indexes 120 into the subsequences of distinguishing bit indexes 230 and provides the subsequences of distinguishing bit indexes 230 to corresponding first stage decoders 240. In this way, the key bit extractor 255 partitions the digital search trie represented by the sequence of distinguishing bit indexes 120 and the sequence of keys 144 among the first stage decoders 240.

Each first stage decoder 240 identifies one or more preliminary candidate keys in the sequence of keys 144 based on the subsequence of key values 245 corresponding to the first stage decoder 240 and the sequence of distinguishing bit indexes 120. Each preliminary candidate key identified by first stage decoder 240 is a key in the sequence of keys 144 that potentially matches the search key 117. In this way, each first stage decoder 240 identifies one or more preliminary candidate keys in the sequence of keys 144. Additionally, each first stage decoder 240 generates a match vector 235 (e.g., match vector 235a-c) indicating a sequence including each preliminary candidate key identified by the first stage decoder 240. The sequence of preliminary candidate keys indicated by the match vector 235 may include zero, one, or more than one preliminary candidate key. In one embodiment, the match vector 235 generated by each first stage decoder 240 is a bit vector having bits corresponding to a subsequence of keys in the sequence of keys 144 corresponding to the first stage decoder 240 and identifying those keys in the subsequence of keys that are preliminary candidate keys. For example, a bit having a value of one in a match vector 235 generated by a first stage decoder 240 may indicate that a corresponding key in the subsequence of keys corresponding to the first stage decoder 240 is a preliminary candidate key.

The distinguishing bit selection module 220 identifies the sequence of candidate distinguishing bit indexes 124 of the sequences of preliminary candidate keys indicated by the match vectors 235 and the subsequences of distinguishing indexes 230. In this way, the distinguishing bit selection module 220 identifies the sequence of candidate distinguishing bit indexes 124 for the preliminary candidate keys identified by the first stage decoders 240 using the subsequences of distinguishing bit indexes 230. Additionally, the distinguishing bit selection module 220 generates a sequence of key indexes 210 based on the match vectors 230. The sequence of key indexes 210 indicates the preliminary candidate keys selected by the first stage decoders 240 from the sequence of keys 144.

In various embodiments, the sequences of preliminary candidate keys identified by the first stage decoders 240 are subsequences in a sequence of preliminary candidate keys identified by the first stage decoders 240 in which the preliminary candidate keys have the same order as the order of the preliminary candidate keys in the sequence of keys 144. Moreover, the sequence of preliminary candidate keys identified by the first stage decoders 240 and the sequence of candidate distinguishing bit indexes 124 identified by the distinguishing bit selection module 220 together represent a digital search trie. As may be envisioned from the digital search trie, each distinguishing bit index in the sequence of distinguishing bit indexes 120 that represents a node in the digital search trie is between two adjacent keys in the sequence of keys 144 that represent two adjacent leaves in the digital search trie. As may be further envisioned from the digital search trie, two or more distinguishing bit indexes representing nodes in the digital search trie may be between two non-adjacent keys in the sequence of keys 144 representing two non-adjacent leaves in the digital search trie. The distinguishing bit selection module 220 generates the sequence of distinguishing bit indexes 124 by selecting the distinguishing bit indexes between each pair of successive preliminary candidate keys identified by each of the first stage decoders 240, if any, and a most significant distinguishing bit index for each pair of adjacent first stage decoders 240 that is between the rightmost preliminary candidate key identified by one of the first stage decoder 240 in the pair and the leftmost preliminary candidate key of the successive first stage decoder 240 in the pair.

The key bit extractor 215 identifies data bits in the search key 117 based on the sequence of candidate distinguishing bit indexes 124 generated by the distinguishing bit selection module 220 and generates a sequence of key values 205 based on the identified data bits. In one embodiment, the key bit extractor 215 identifies each data bit in the search key 117 corresponding to a distinguishing bit index in the sequence of candidate distinguishing bit indexes 124 generated by the distinguishing bit selection module 220. In this way, the key bit extractor 215 identifies a key value in the search key 117 for each node in the digital search trie represented by the sequence of preliminary candidate keys identified by the first stage decoders 240 and the sequence of candidate distinguishing bit indexes 124 identified by the distinguishing bit selection module 220.

The second stage decoder 200 identifies one or more secondary candidate keys based on the sequence of candidate distinguishing bit indexes 124 generated by the distinguishing bit selection module 220 and the sequence of key values 205 identified by the key bit extractor 215. Each secondary candidate key identified by second stage decoder 200 is a primary candidate key in the sequence of primary candidate keys generated by the first stage decoders 240 that potentially matches the search key 117. In this way, the second stage decoder 200 identifies one or more secondary candidate keys in the sequence of preliminary candidate keys identified by the first stage decoders 240. Additionally, the second stage decoder 200 generates a match vector 202 indicating a sequence including each secondary candidate key identified by the second stage decoder 200. The sequence of secondary candidate keys indicated by the match vector 202 may include zero, one, or more than one secondary candidate key. In various embodiments, the length of the match vector 202 is less than or equal to the number of first stage decoders 240. In one embodiment, the match vector 202 is a bit vector having bits corresponding to the sequence of preliminary candidate keys generated by the first stage decoders 240 and identifying those preliminary candidate keys in the sequence of preliminary candidate keys that are secondary candidate keys. For example, a bit having a value of one in the match vector 202 may indicate that a corresponding preliminary key in the sequence of preliminary candidate keys generated by the first stage decoders 240 is a secondary candidate key.

The key index translator 204 generates the match vector 125 based on the match vector 202 and the sequence of key indexes 210 such that the match bits in the match vector 202 correspond to keys in the sequence of keys 144. Moreover, the match bits in the match vector 125 correspond to the keys in the sequence of keys 144. In this way, the key index translator 204 identifies secondary candidate keys in the sequence of keys 144 (e.g., the original sequence of keys) and the match vector 125 indexes the keys in the sequence of keys 144.

As illustrated in FIG. 2, the key match module 122 includes a two-stage hierarchy of decoders, which includes the first stage decoders 240 and the second stage decoder 200. In other embodiments, the key match module 122 may include a hierarchy of decoders having more than two stages. For example, the key match module 122 may include a three-stage hierarchy of decoders including one decoder at the top of the hierarchy, more than one decoder in the middle of the hierarchy, and a number of decoders at a bottom of the hierarchy that is greater than the number of decoders in the middle of the hierarchy.

Figure 3:
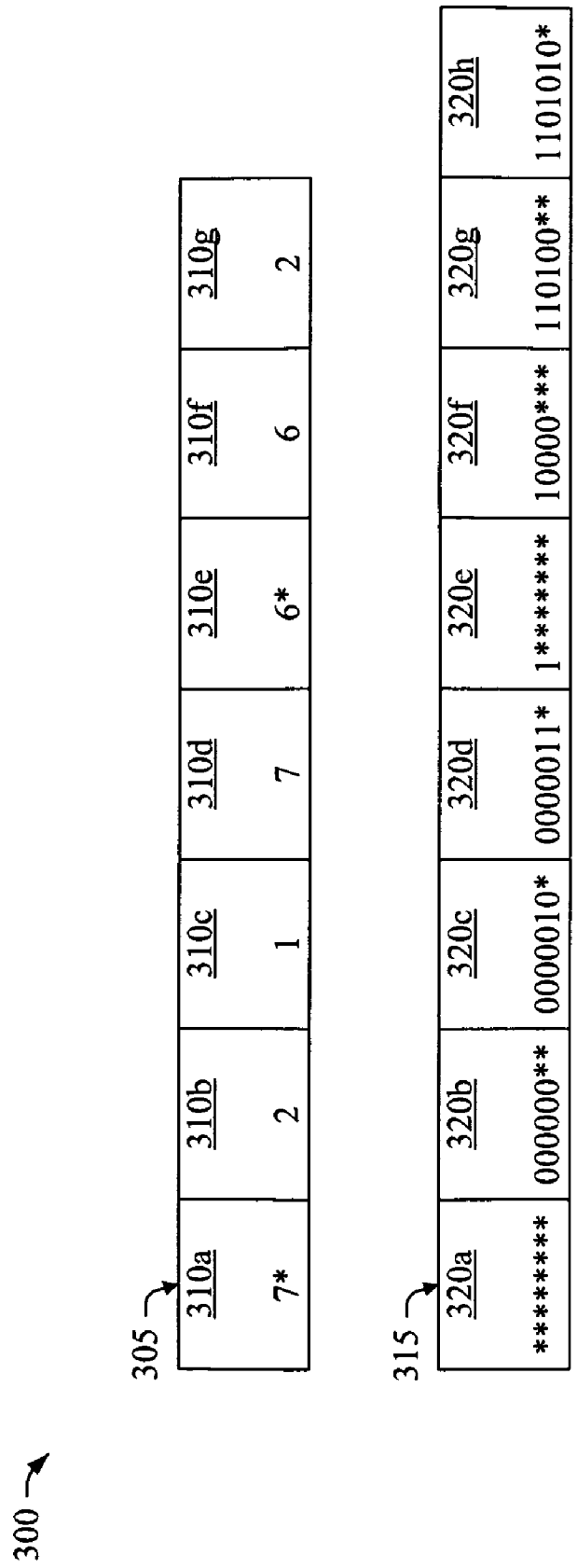
FIG. 3 is a block diagram of a database, in accordance with an embodiment of the present invention.

FIG. 3 illustrates a database 300, in accordance with an embodiment of the present invention. The database 300 includes a sequence of distinguishing bit indexes 305 and a sequence of keys 315. The sequence of distinguishing bit indexes 305 includes distinguishing bit indexes 310*a-g* and the sequence of keys 315 includes the keys 320*a-h*. The sequence of distinguishing bit indexes 305 and the sequence of keys 315 together represent a digital search trie in a canonical form, as is described more fully herein.

As illustrated in FIG. 3, the distinguishing bit index 310*a* is a wildcard bit index having a value of 7* and is the first distinguishing bit index in the sequence of distinguishing bit indexes 305. The distinguishing bit index 310*b* is a conventional bit index having a value of 2 and follows the distinguishing bit index 310*a*. The distinguishing bit index 310*c* is a conventional bit index having a value of 1 and follows the distinguishing bit index 310*b*. The distinguishing bit index 310*d* is a conventional bit index having a value of 7 and follows the distinguishing bit index 310*c*. The distinguishing bit index 310*e* is a wildcard bit index having a value of 6* and follows the distinguishing bit index 310*d*. The distinguishing bit index 310*f* is a conventional bit index having a value of 6 and follows the distinguishing bit index 310*e*. The distinguishing bit index 310*g* is a conventional bit index having a value of 2 and follows the distinguishing bit index 310*f*. Moreover, the distinguishing bit index 310*g* is the last distinguishing bit index in the sequence of distinguishing bit indexes 305.

As also illustrated in FIG. 3, the key 320*a* has a value of ****** and is the first key in the sequence of keys 315. The key 320***b* has a value of 000000 and follows the key 320***a*. The key 320*c* has a value of 0000010* and follows the key 320*b*. The key 320*d* has a value of 0000011* and follows the key 320*c*. The key 320*e* has a value of 1***** and follows the key 320***d*. The key 320*f* has a value of 10000* and follows the key 320***e*. The key 320*g* has a value of 110100 and follows the key 320***f*. The key 320*h* has a value of 1101010* and follows the key 320*g*. Moreover, the key 320*h* is the last key in the sequence of keys 315.

Figure 4:
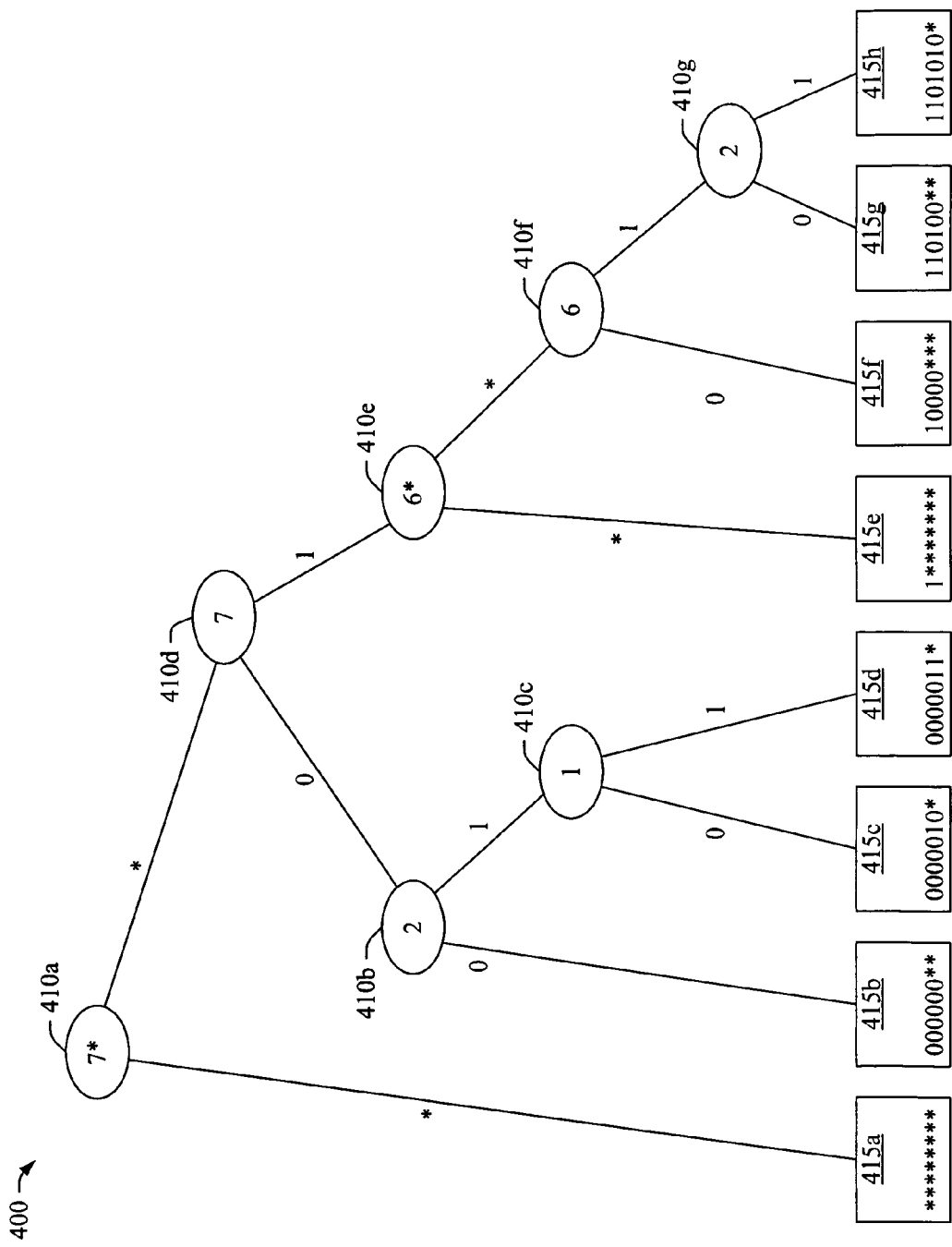
FIG. 4 is a block diagram of a digital search trie, in accordance with an embodiment of the present invention.

FIG. 4 illustrates a digital search trie 400, in accordance with an embodiment of the present invention. The digital search trie 400 represents an exemplary digital search trie represented by the sequence of distinguishing bit indexes 120 and the sequence of keys 144. In particular, the digital search trie 400 represents the exemplary sequence of distinguishing bit indexes 305 and the exemplary sequence of keys 315. The digital search trie 400 includes nodes 410*a-g* and leaves 415*a-h*. The distinguishing bit indexes 310*a-g* in the sequence of distinguishing bit indexes 305 correspond to and represent the nodes 410*a-g*. The keys 320*a-h* in the sequence of keys 315 correspond to and represent the leaves 415*a-h*. As may be envisioned from FIG. 3 and FIG. 4, the sequence of distinguishing key indexes 305 and the sequence of keys 315 together represent the digital search trie 400. Moreover, the digital search trie 400 is a Patricia tree.

As illustrated in FIG. 4, the node 410*a* is a wildcard node having a value of 7* and is the root node of the digital search trie 400. Additionally, the node 410*a* has a left branch connected to the leaf 415*a* and a right branch connected to the node 410*d*. The leaf 415*a* has a value of ******. In a search of the digital search trie 400 involving the node 410***a*, both the left branch and the right branch of the node 410*a* would be selected regardless of the value of the data bit identified by the distinguishing bit index 310 associated with the node 410*a*. For example, the search key 117 may include eight bits and a distinguishing bit index 310 having a value of 7 identifies the most significant data bit in the search key 117. In this example, a distinguishing bit index 310 having a value of zero identifies the least significant data bit in the search key 117.

The node 410*d* has a value 7, a left branch connected to the node 410*b*, and a right branch connected to the node 410*e*. In a search of the digital search trie 400 involving the node 410*d*, the left branch would be selected if the value of the data bit identified by the distinguishing bit index 310 associated with the node 410*d* has a value of zero and the right branch would be selected if the value of the data bit has a value of one.

The node 410*b* has a value of 2, a left branch connected to the leaf 415*b*, and a right branch connected to the node 410*c*. The leaf 415*b* has a value of 000000. In a search of the digital search trie 400 involving the node 410***b*, the left branch would be selected if the value of the data bit identified by the distinguishing bit index 310 associated with the node 410*b* has a value of zero and the right branch would be selected if the value of the data bit has a value of one.

The node 410*c* has a value of 1, a left branch connected to the leaf 415*c*, and a right branch connected to the leaf 415*d*. The leaf 415*c* has a value of 0000010* and the leaf 415*d* has a value of 0000011*. In a search of the digital search trie 400 involving the node 410*c*, the left branch would be selected if the value of the data bit identified by the distinguishing bit index 310 associated with the node 410*c* has a value of zero and the right branch would be selected if the value of the data bit has a value of one.

The node 410*e* is a wildcard node and has a value of 6*. Additionally, the node 410*e* has a left branch connected to the leaf 415*e* and a right branch connected to the node 410*f*. The leaf 415*e* has a value of 1*******. In a search of the digital search trie 400 involving the node 410e, both the left branch and the right branch of the node 410e would be selected regardless of the value of the data bit identified by the distinguishing bit index 310 associated with the node 410e.

The node 410f has a value of 6, a left branch connected to the leaf 415f, and a right branch connected to the node 410g. The leaf 415f has a value of 10000***. In a search of the digital search trie 400 involving the node 410f, the left branch would be selected if the value of the data bit identified by the distinguishing bit index 310 associated with the node 410f has a value of zero and the right branch would be selected if the value of the data bit has a value of one.

The node 410g has a value of 2. Additionally, the node 410g has a left branch connected to the leaf 415g and a right branch connected to the leaf 415h. The leaf 415g has a value of 110100** and the leaf 415h has a value of 1101010*. In a search of the digital search trie 400 involving the node 410g the left branch would be selected if the value of the data bit identified by the distinguishing bit index 310 associated with the node 410g has a value of zero and the right branch would be selected if the value of the data bit has a value of one.

Because the sequence of distinguishing bit indexes 305 and the sequence of keys 315 are in a canonical form as is described more fully herein, the digital search trie 400 may be constructed from the sequence of distinguishing bit indexes 305 and the sequence of keys 315. The digital search trie 400 of FIG. 4 is presented for illustrative purposes to better describe the sequence of distinguishing bit indexes 305 and the sequence of keys 315 in the database 300 and need not be constructed in various embodiments of the present invention.

Figure 5:
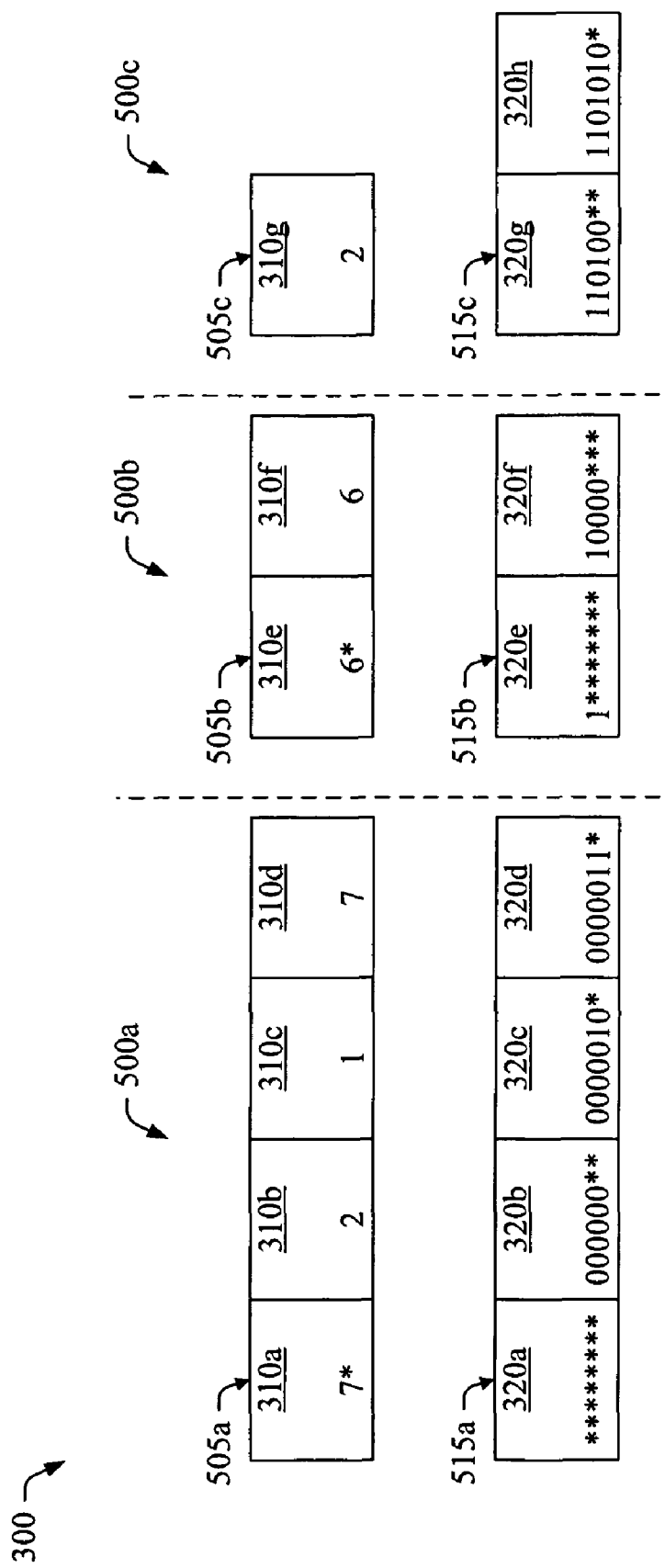
FIG. 5 is a block diagram of a database, in accordance with an embodiment of the present invention.

FIG. 5 illustrates the database 300, in accordance with an embodiment of the present invention. The database 300 is partitioned into partitions 500 (e.g., partitions 500a-c). The partition 500a is the first partition and includes a sequence of distinguishing bit indexes 505a including the distinguishing bit indexes 310a-d and a sequence of keys 515a including the keys 320a-d. The partition 500b includes a sequence of distinguishing bit indexes 505b including the distinguishing bit indexes 310e-f and a sequence of keys 515b including the keys 320e-f. The partition 500c is the last partition and includes a sequence of distinguishing bit indexes 505c including the distinguishing bit index 310g and a sequence of keys 515c including the keys 320g-h. The sequences of distinguishing bit indexes 505a-c illustrated in FIG. 5 are exemplary subsequences of distinguishing bit indexes 230a-c.

In this embodiment, each partition 500 except the last partition has the same number of distinguishing bit indexes 310 and the same number of keys 320. The number of distinguishing bit indexes 310 in the last partition (e.g., the partition 500c) is one less than the number of keys 320 in the last partition. In other embodiments, the database 300 may be partitioned such that the last partition 500 (e.g., the partition 500c) has the same number of distinguishing bit indexes 310 and the same number of keys 320. Although FIG. 5 illustrates the database 300 partitioned into three partitions 500a-c, the database 300 may be partitioned into more or fewer than three partitions 500 in other embodiments.

Figure 6:
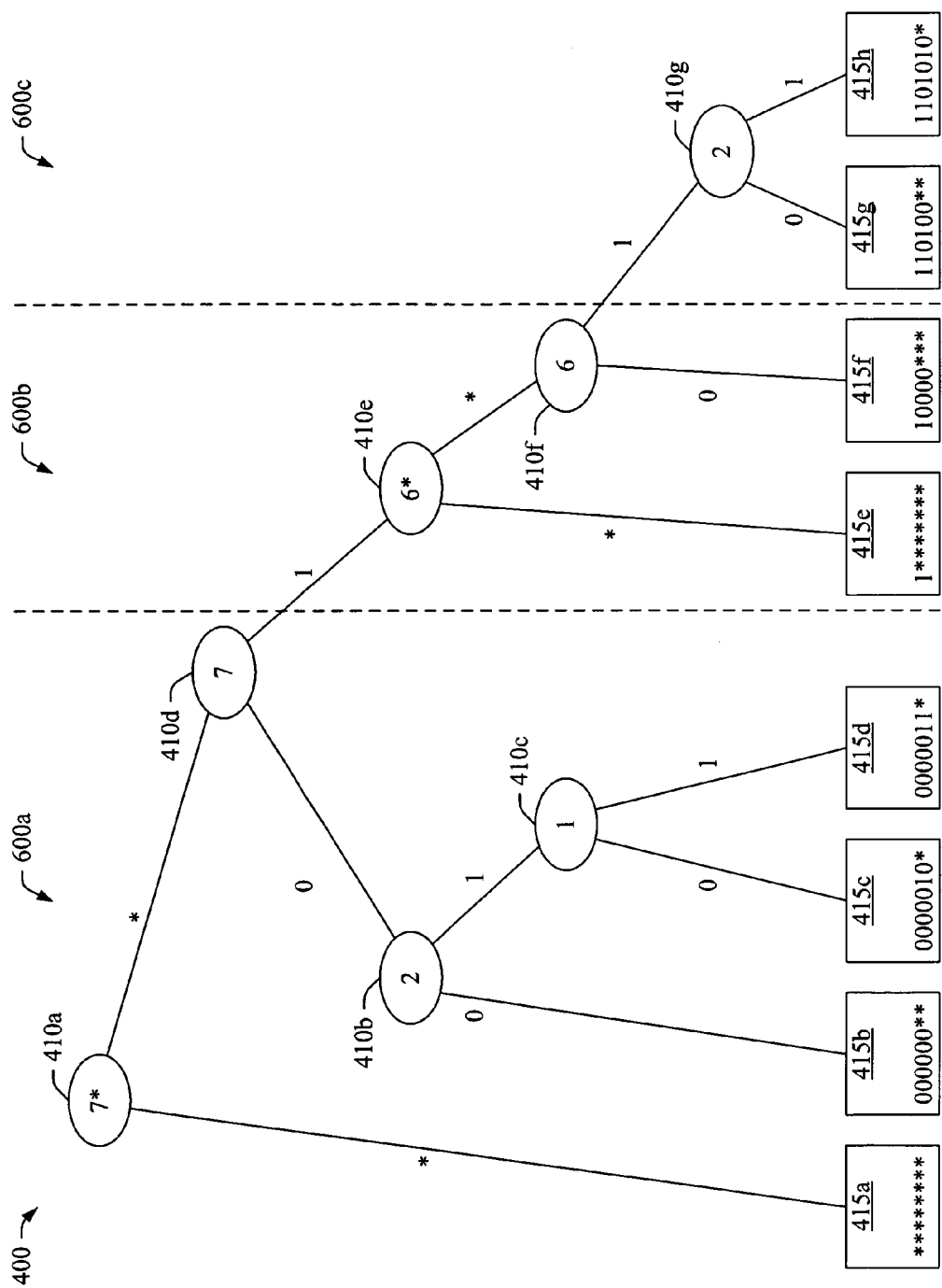
FIG. 6 is a block diagram of a digital search trie, in accordance with an embodiment of the present invention.

FIG. 6 illustrates the digital search trie 400, in accordance with an embodiment of the present invention. The digital search trie 400 is partitioned into partitions 600 (e.g., partitions 600a-c). The partition 600a is the first partition and includes the nodes 410a-d and the leaves 415a-d. The partition 600b includes the nodes 410e-f and the leaves 415e-f. The partition 600c is the last partition and includes the node 410g and the leaves 415g-h. As may be envisioned from FIG. 5 and FIG. 6, the partitions 500a-c of the database 300 represent corresponding partitions 600a-c of the digital search trie 400.

The digital search trie 400 of FIG. 6 is presented for illustrative purposes to better describe partitioning of the sequence of distinguishing bit indexes 305 and the sequence of keys 315 in the database 300 and need not be constructed in various embodiments of the present invention.

FIG. 7 illustrates a database 700, in accordance with an embodiment of the present invention. The database 700 includes a sequence of distinguishing bit indexes 705 and a sequence of keys 715. The sequence of distinguishing bit indexes 705 includes the distinguishing bit indexes 310a, 310e, and 310f and the sequence of keys 715 includes the keys 320a, 320e, 320f, and 320g. The sequence of distinguishing bit indexes 705 and the sequence of keys 715 together represent a digital search trie in a canonical form, as is described more fully herein. Moreover, the sequence of distinguishing bit indexes 705 is an exemplary sequence of candidate distinguishing bit indexes 124 and the sequence of keys 715 is an exemplary sequence of preliminary candidate keys identified by the first stage decoders 240.

As illustrated in FIG. 7, the distinguishing bit index 310a is the first distinguishing bit index in the sequence of distinguishing bit indexes 705. The distinguishing bit index 310e follows the distinguishing bit index 310a. The distinguishing bit index 310f follows the distinguishing bit index 310e and is the last distinguishing bit index in the sequence of distinguishing bit indexes 705. As is also illustrated in FIG. 7, the key 320a is the first key in the sequence of keys 715. The key 320e follows the key 320a and the key 320f follows the key 320e. The key 320g follows the key 320f and is the last key in the sequence of keys 715.

Figure 8:
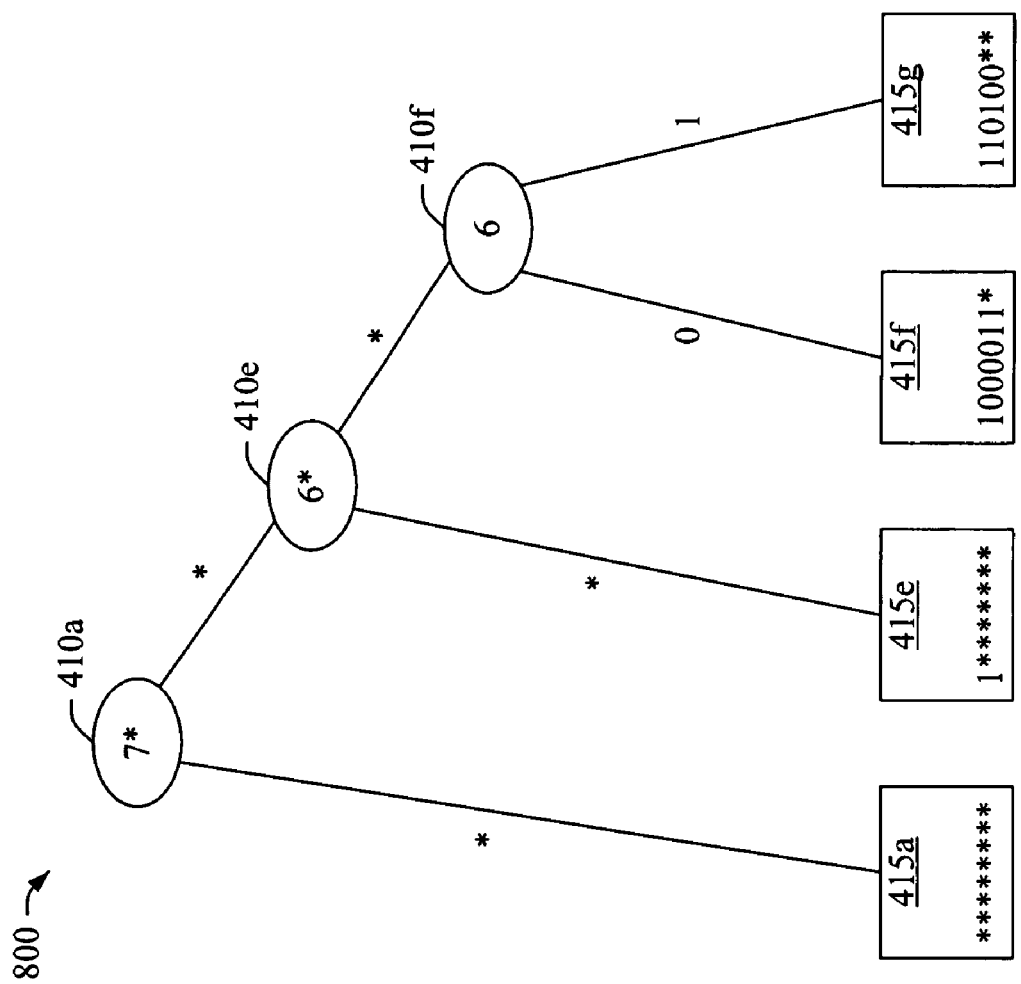
FIG. 8 is a block diagram of a digital search trie, in accordance with an embodiment of the present invention.

FIG. 8 illustrates a digital search trie 800, in accordance with an embodiment of the present invention. The digital search trie 800 includes nodes 410a, 410e, and 410f. Additionally, the digital search trie 800 includes the leaves 415a, 415e, 415f, and 415g. The distinguishing bit indexes 310a, 310e, and 310f in the sequence of distinguishing bit indexes 705 correspond to and represent the nodes 410a, 410e, and 410f. The keys 320a, 320e, 320f, and 320g in the sequence of keys 715 correspond to and represent the leaves 415a, 415e, 415f, and 415g. As may be envisioned from FIG. 7 and FIG. 8, the sequence of distinguishing bit indexes 705 and the sequence of keys 715 together represent the digital search trie 800. Moreover, the digital search trie 800 is a Patricia tree.

As illustrated in FIG. 8, the node 410a has a left branch connected to the leaf 415a and a right branch connected to the node 410e. Each of the left branch and the right branch of the node 410a is associated with a wildcard value. In a search of the digital search trie 800 involving the node 410a, both the left branch and the right branch of the node 410a would be selected regardless of the value of the data bit identified by the distinguishing bit index 310 associated with the node 410a.

The node 410e has a left branch connected to the leaf 415e and a right branch connected to the node 410f. Each of the left branch and the right branch of the node 410e is associated with a wildcard value. In a search of the digital search trie 800 involving the node 410e, both the left branch and the right branch of the node 410e would be selected regardless of the value of the data bit identified by the distinguishing bit index 310 associated with the node 410e.

The node 410f has a left branch connected to the leaf 415f, and a right branch connected to the leaf 415g. The left branch of the node 410f is associated with a value of zero and the right branch of the node 410f is associated with a value of 1. In a search of the digital search trie 800 involving the node 410f, the left branch would be selected if the value of the data bit identified by the distinguishing bit index 310 associated with the node 410*f* has a value of zero and the right branch would be selected if the value of the data bit has a value of one.

Because the sequence of distinguishing bit indexes 705 and the sequence of keys 715 are in a canonical form as is described more fully herein, the digital search trie 800 may be constructed from the sequence of distinguishing bit indexes 705 and the sequence of keys 715. The digital search trie 800 is presented for illustrative purposes to better describe the sequence of distinguishing bit indexes 705 and the sequence of keys 715 in the database 700 and need not be constructed in various embodiments of the present invention.

Figure 9:
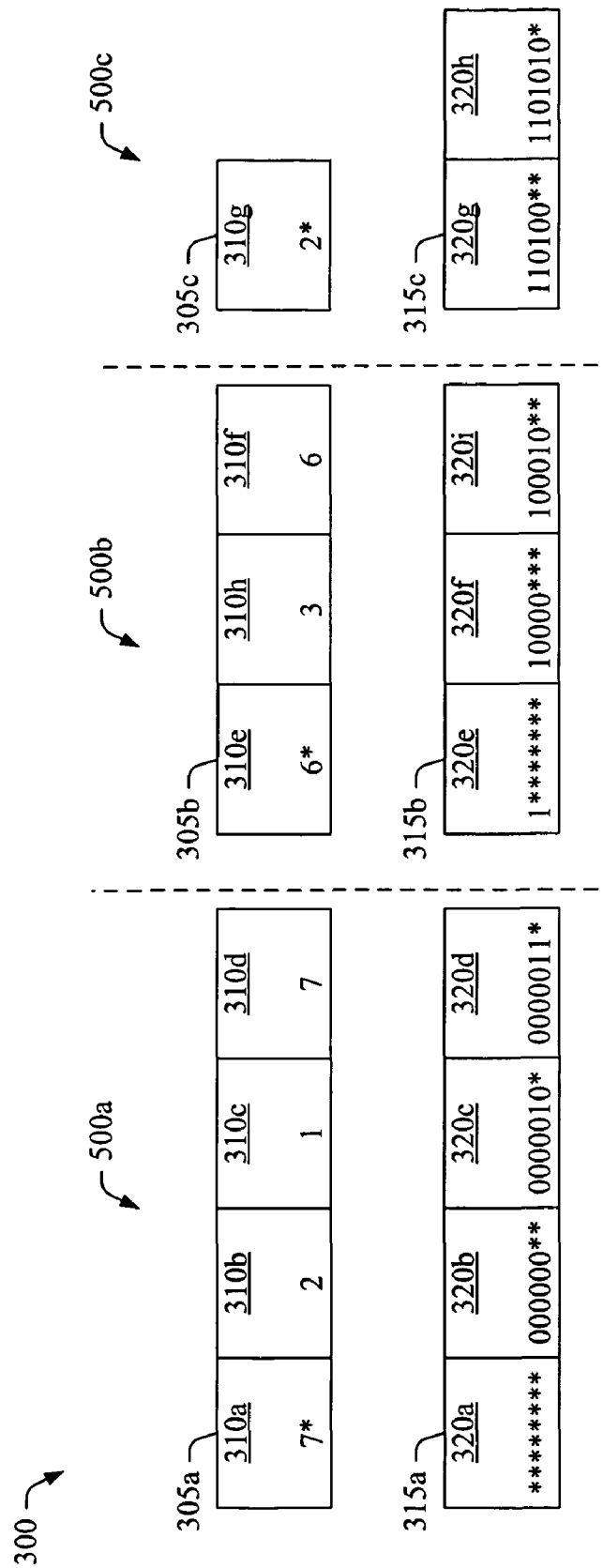
FIG. 9 is a block diagram of a database, in accordance with an embodiment of the present invention.

FIG. 9 illustrates the database 300, in accordance with an embodiment of the present invention. The database 300 illustrated in FIG. 9 represents the database 300 of FIG. 5 after a search key 117 having a value of 100010** has been inserted into the database 300. As may be envisioned from FIG. 8 and FIG. 9, a distinguishing bit index 310*h* has been inserted into the sequence of distinguishing bit indexes 505*b* between the distinguishing bit index 310*e* and the distinguishing bit index 310*f*. Additionally, a key 320*i* having the value of the search key 117 has been inserted into the sequence of keys 515*b* immediately after the key 320*f*. As illustrated in FIG. 9, the key 320*i* has the value of 100010**.

In this embodiment, the search engine 100 generates the pseudo key 114 based on the search key 117 and identifies the key 320*f* as the predecessor key or the successor key of the search key 117 based on the pseudo key 114. Additionally, the search engine 100 determines that the most significant distinguishing bit index 160 is the fourth least significant distinguishing bit index. Accordingly, the most significant distinguishing bit index 160 has a value of 3. Because the data bit (e.g., the key value) in the search key 117 identified by the most significant distinguishing bit index 160 is 1, the search engine 100 determines that the key 320*f* is a predecessor key of the search key 117. Because the key 320*f* is the predecessor key of the search key 117, the search engine 100 inserts the search key 117 immediately after the key 320*f* in the sequence of keys 515*b*. Additionally, the search engine 100 identifies the distinguishing bit index 310*f* as the distinguishing bit index associated with the key 320*f* based on the canonical form of the sequence of distinguishing bit indexes 505*b* and the sequence of keys 515*b*. The distinguishing bit index 310*f* associated with the key 320*f* represents a node 410 connected to the leaf 415*f* in the partition 505*b* of the digital search trie 400. Because the leaf 415*f* represented by the key 320*f* in the digital search trie is connected to the node 410*f* represented by the distinguishing bit index 310*f* through a left branch, the search engine 100 inserts the most significant distinguishing bit index 160 immediately before the distinguishing bit index 310*f* in the sequence of distinguishing bit indexes 505*b*.

Figure 10:
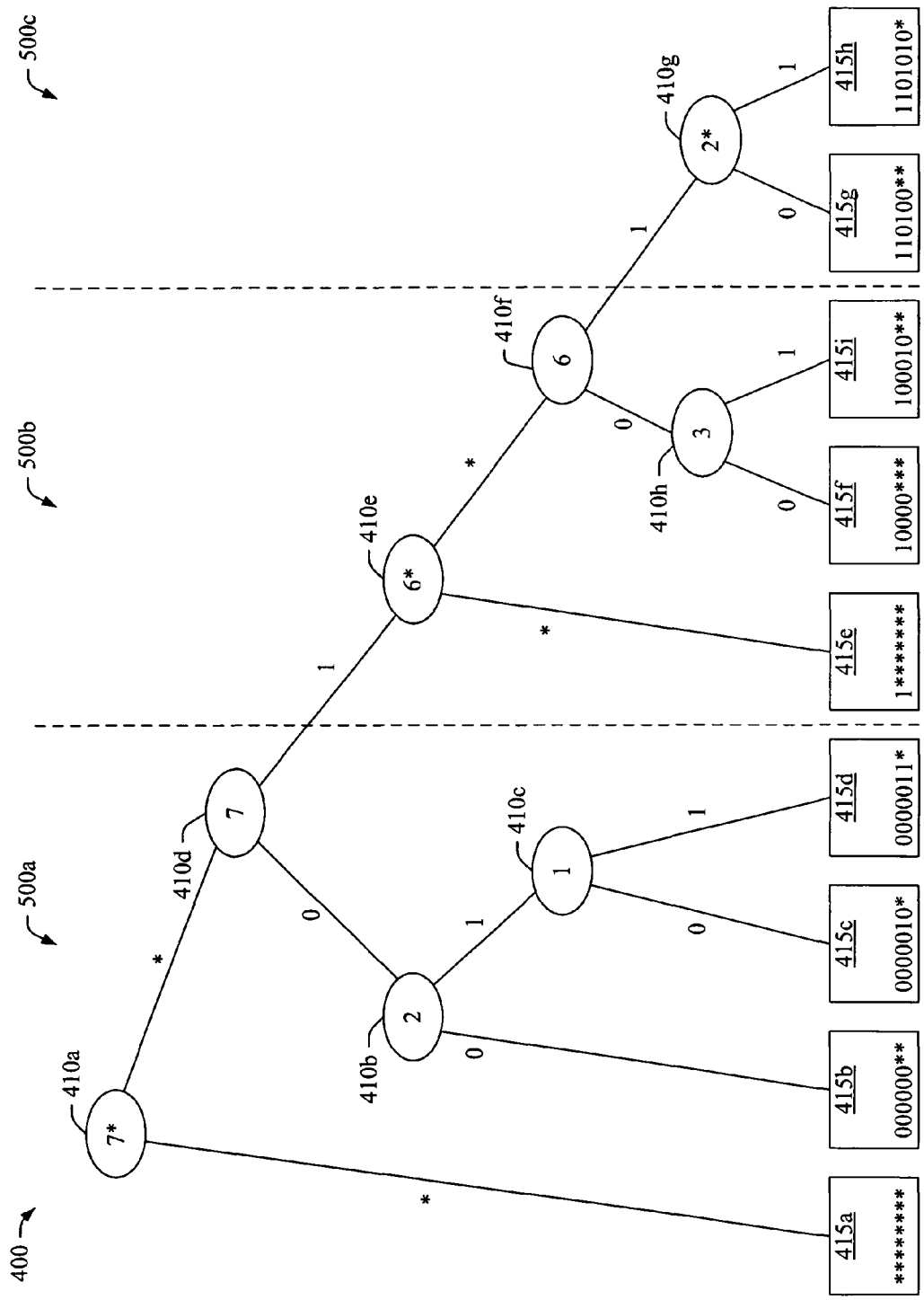
FIG. 10 is a block diagram of a digital search trie, in accordance with an embodiment of the present invention.

FIG. 10 illustrates the digital search trie 400, in accordance with an embodiment of the present invention. The digital search trie 400 illustrated in FIG. 10 represents the database 300 of FIG. 9 after a search key 117 having a value of 100010** has been inserted into the database 300. As illustrated in FIG. 10, the left branch of the node 410*f* is now connected to a node 410*h* instead of the leaf 415*f*. The node 410*f* is a conventional node having a value of 3, a left branch connected to the leaf 415*f*, and a right branch connected to a leaf 415*i*. The leaf 415*i* has a value of 100010**. The distinguishing bit index 310*h* represents the node 410*h* and the key 320*i* represents the leaf 415*i* in the digital search trie 400. The digital search trie 400 of FIG. 10 is presented for illustrative purposes to better describe the sequence of distinguishing bit indexes 505*b* and the sequence of keys 515*b* in the partition 500*b* and need not be constructed in various embodiments of the present invention.

Figure 11:
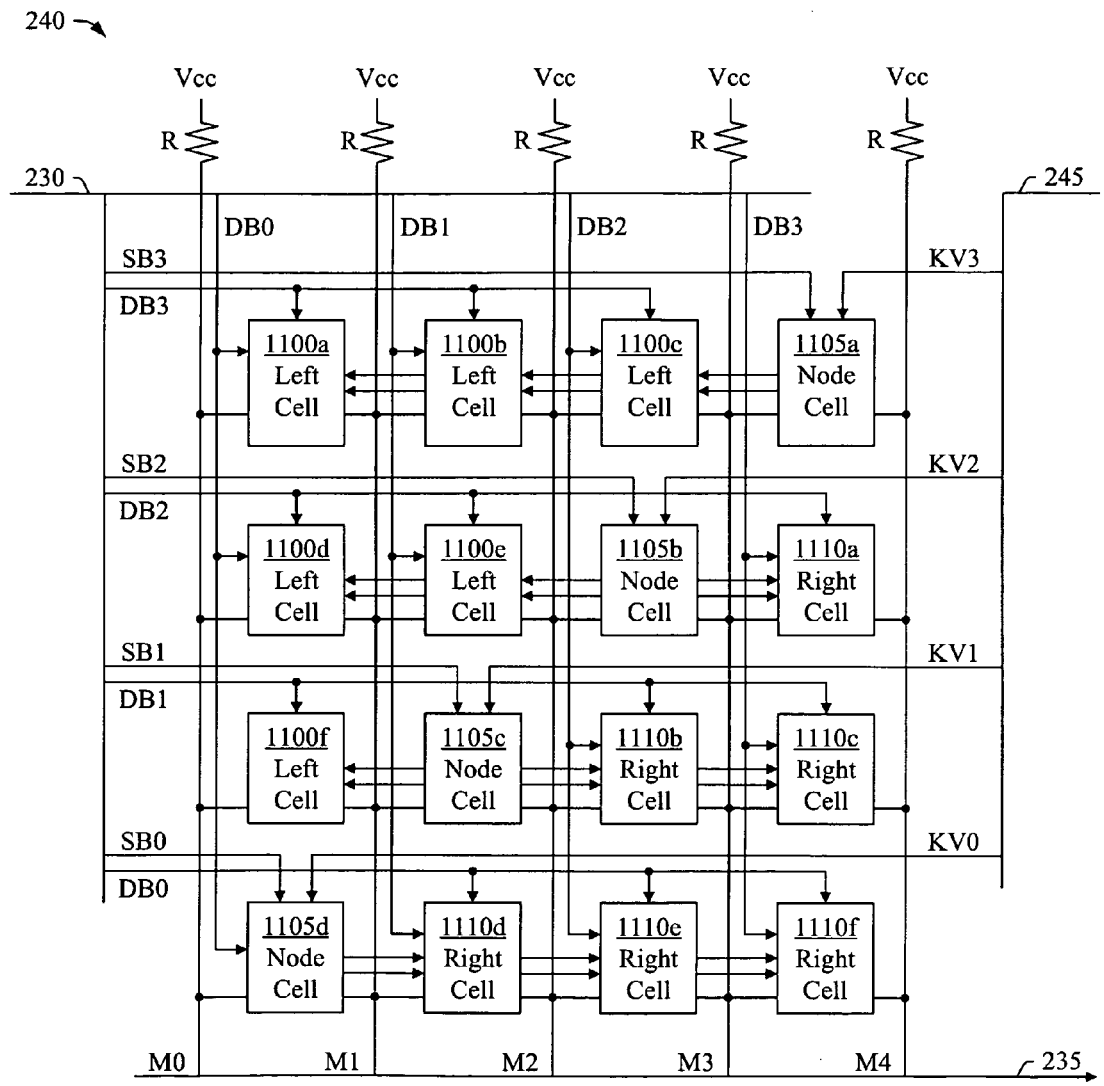
FIG. 11 is a block diagram of a first stage decoder, in accordance with an embodiment of the present invention.

FIG. 11 illustrates the first stage decoder 240, in accordance with an embodiment of the present invention. The first state decoder 240 includes a matrix of interconnected cells, which includes left cells 1100 (e.g., left cells 1100*a-f*), nodes cells 1105 (e.g., node cells 1105*a-d*), and right cells 1110 (e.g., right cells 1110*a-f*). The node cells 1105 are located along a diagonal of the matrix. Each cell in the matrix to the left of a node cell 1105 is a left cell 1100 and represents a potential node 410 along a left path of a parent node in the digital search trie represented by the node cell 1105 in the same row of the matrix as the left cell 1100. Each cell in the matrix to the right of a node cell 1105 is a right cell 1110 and represents a potential node 410 along a right path of a parent node in the digital search trie represented by the node cell 1105 in the same row of the matrix as the right cell 1110.

Each left cell 1100 and each right cell 1110 in the matrix receives a distinguishing bit value DB (e.g., distinguishing bit values DB0-3) of a distinguishing bit index 310 in the subsequence of distinguishing bit indexes 230 associated with a row of the matrix and a distinguishing bit value DB (e.g., distinguishing bit values DB0-3) of a distinguishing bit index 310 in the subsequence of distinguishing bit indexes 230 associated with a column of the matrix. Each node cell 1105 in the matrix receives a star bit value SB (e.g., star bit values SB0-SB3) of a distinguishing bit index 310 in the subsequence of distinguishing bit indexes 230. The distinguishing bit value DB and the star bit value SB of each distinguishing bit index 310 in the subsequence of distinguishing bit indexes 230 represents the value of the distinguishing bit index 310. Additionally, each node cell 1105 in the matrix receives a key value in the subsequence of key values 245.

As illustrated in FIG. 11, the first stage decoder 240 generates the match vector 235 which includes five match bits M (e.g., match bits M0-M4). The match bits M correspond to keys 320 in the sequence of keys 144. Each cell in the matrix (e.g. the left cells 1100*a-f*, the node cells 1105*a-d*, and the right cells 1110*a-f*) is connected to a match line associated with a match bit M located to the left of the cell and another match line associated with a match bit M located to the right of the cell. Additionally, each of the match lines associated with a match bit M is connected to a supply voltage Vcc through a pull-up resistor R for establishing a supply voltage (e.g., Vcc) on the match line. The match bits M in the match vector 235 represent a bit vector in which a bit has a value of one if the voltage of the corresponding match line is the supply voltage and a value of zero if the voltage of the corresponding match line is a ground potential. Moreover, each bit in the bit vector having a value of one identifies a primary candidate key in the sequence of primary candidate keys indicated by the match vector 235.

In operation, each cell in the matrix may pull down the voltage on the match line to the left of the cell, the match line to the right of the cell, or both. For example, a cell in the matrix may pull down a match line to a ground voltage potential. The voltage on each match line indicates whether a corresponding key 320 in the sequence of keys 144 indicated by the match vector 235 is selected by the first stage decoder 240. If the first stage decoder 240 selects a key 320, the voltage on the match line corresponding to the key 320 has the supply voltage and the match bit M associated with the match line has a value of one. Otherwise, if the first stage decoder 240 does not select a key 320, the voltage on the match line corresponding to the key 320 has a ground potential and the match bit M associated with the match line has a value of zero. If a match bit M has a value of zero, the key 320 in the sequence of keys 144 corresponding to the match bit M is pruned from the digital search trie represented by the sequence of distinguishing bit indexes 120 and the sequence of keys 144. Otherwise, if the match bit M has a value of one (e.g., a supply voltage), the key 320 in the sequence of keys 144 corresponding to the match bit M is selected as a preliminary candidate key. In various embodiments, the cells in the matrix of the first stage decoder 240 operate substantially in parallel with each other to determine the match bits M of the match vector 235. In this way, the first stage decoder 240 identifies the sequence of preliminary candidate keys indicated by the match vector 235 in substantially constant time (e.g., linear time).

Each node cell 1105 in the matrix represents a node 410 in the digital search trie 400 represented by the sequence of distinguishing bit indexes 120 and the sequence of keys 144. Additionally, each left cell 1100 in the same row of the matrix as the node cell 1105 represents a node 410 in the digital search trie 400 to the left of the node 410 represented by the node cell 1105a. Further, each right cell 1110 in same row of the matrix as the right cell 1110 represents a node 410 in the digital search trie 400 to the right of the node 410 represented by the node cell 1105a. Generally, adjacent cells in each row of the matrix communicate with each other to determine which branch or branches are selected by the node 410 in the digital search trie 400 represented by the node cell 1105 in the row. Further, adjacent cells in each row of the matrix communicate with each other to determine relationships among the nodes 410 in the digital search trie 400 represented by the node cells 1105 in the matrix. For example, adjacent cells in a row of the matrix may determine whether a node 410 represented by the node cell 1105 in the row is a parent node or child node of a node 410 represented by a node cell 1105 in another row of the matrix.

As illustrated in FIG. 11, a first row of the matrix includes the left cells 1100a-c and the node cell 1105a. In the first row, the left cell 1100a is connected to the left cell 1100b, the left cell 1100b is connected to the left cell 1100c, and the left cell 1100c is connected to the node cell 1105a. The node cell 1105a in the first row of the matrix receives the star bit value SB3 and the key value KV3. Each of the left cells 1100a-c in the first row of the matrix receives the distinguishing bit value DB3 associated with the first row. Additionally, the left cell 1100a receives the distinguishing bit value DB0 associated with the first column, the left cell 1100b receives the distinguishing bit value DB1 associated with the second column, and the left cell 1100c receives the distinguishing bit value DB2 associated with the third column. Further, the left cell 1100a is connected to the match lines associated with the match bits M0 and M1, the left cell 1100b is connected to the match lines associated with the match bits M1 and M2, the left cell 1100c is connected to the match lines associated with the match bits M2 and M3, and the node cell 1105a is connected to the match lines associated with the match bits M3 and M4.

A second row of the matrix includes the left cells 1100d-e, the node cell 1105b, and the right cell 1110a. In the second row, the left cell 1100d is connected to the left cell 1100e, the left cell 1100e is connected to the node cell 1105b, and the node cell 1105b is connected to the right cell 1110a. The node cell 1105b in the second row of the matrix receives the star bit value SB2 and the key value KV2. Each of the left cells 1100d-e and the right cell 1110a in the second row of the matrix receives the distinguishing bit value DB2 associated with the second row of the matrix. Additionally, the left cell 1100d receives the distinguishing bit value DB0 associated with the first column, the left cell 1100e receives the distinguishing bit value DB1 associated with the second column, and the right cell 1110a receives the distinguishing bit value DB3 associated with the fourth column. Further, the left cell 1100d is connected to the match lines associated with the match bits M0 and M1, the left cell 1100e is connected to the match lines associated with the match bits M1 and M2, the node cell 1105b is connected to the match lines associated with the match bits M2 and M3, and the right cell 1110a is connected to the match lines associated with the match bits M3 and M4.

A third row of the matrix includes the left cell 1100f, the node cell 1105c, and the right cells 1110b-c. In the third row, the left cell 1100f is connected to the node cell 1105c, the node cell 1105c is connected to the right cell 1110b, and the right cell 1110b is connected to the right cell 1110c. The node cell 1105c in the third row of the matrix receives the star bit value SB1 and the second key value KV1. The left cell 1100f and each of the right cells 1110b-c in the third row of the matrix receives the distinguishing bit value DB1 associated with the third row. Additionally, the left cell 1100f receives the distinguishing bit value DB0 associated with the first column, the right cell 1110b receives the distinguishing bit value DB2 associated with the third column, and the right cell 1110c receives the distinguishing bit value DB3 associated with the fourth column. Further, the left cell 1100f is connected to the match lines associated with the match bits M0 and M1, the node cell 1105c is connected to the match lines associated with the match bits M1 and M2, the right cell 1110b is connected to the match lines associated with the match bits M2 and M3, and the right cell 1110c is connected to the match lines associated with the match bits M3 and M4.

A fourth row of the matrix includes the node cell 1105d and the right cells 1110d-f. In the fourth row, the node cell 1105d is connected to the right cell 1110d, the right cell 1110d is connected to the right cell 1110e, and the right cell 1110e is connected to the right cell 1110f. The node cell 1105d in the fourth row of the matrix receives the star bit value SB0 and the key value KV0. The left cell 1100f and each of the right cells 1110b-c in the fourth row of the matrix receives the distinguishing bit value DB0 associated with the fourth row. Additionally, the right cell 1110d receives the distinguishing bit value DB1, the right cell 1110e receives the distinguishing bit value DB3, and the right cell 1110f receives the distinguishing bit value DB3. Further, the node cell 1105d is connected to the match lines associated with the match bits M0 and M1, the right cell 1110d is connected to the match lines associated with the match bits M1 and M2, the right cell 1110e is connected to the match lines associated with the match bits M2 and M3, and the right cell 1110f is connected to the match lines associated with the match bits M3 and M4.

Although the first stage decoder 240 illustrated in FIG. 11 has four rows and four columns of cells, the first stage decoder 240 may have more or fewer than four rows and columns in other embodiments. In operation, one or more of the rows and columns of cells in the matrix may be unused (e.g., disabled). For example, the sequence of distinguishing bit indexes 120 and the sequence of keys 144 may be partitioned among the first stage decoders 240 such that a first stage decoder 240 includes one or more rows and columns of unused cells in the matrix of the first stage decoder 240. Moreover, a row and column of unused cells in the matrix of the first stage decoder 240 may be used to insert a new key 320 into the database 300 represented by the sequence of distinguishing bit indexes 120 and the sequence of keys 144, as is described more fully herein.

Figure 12:
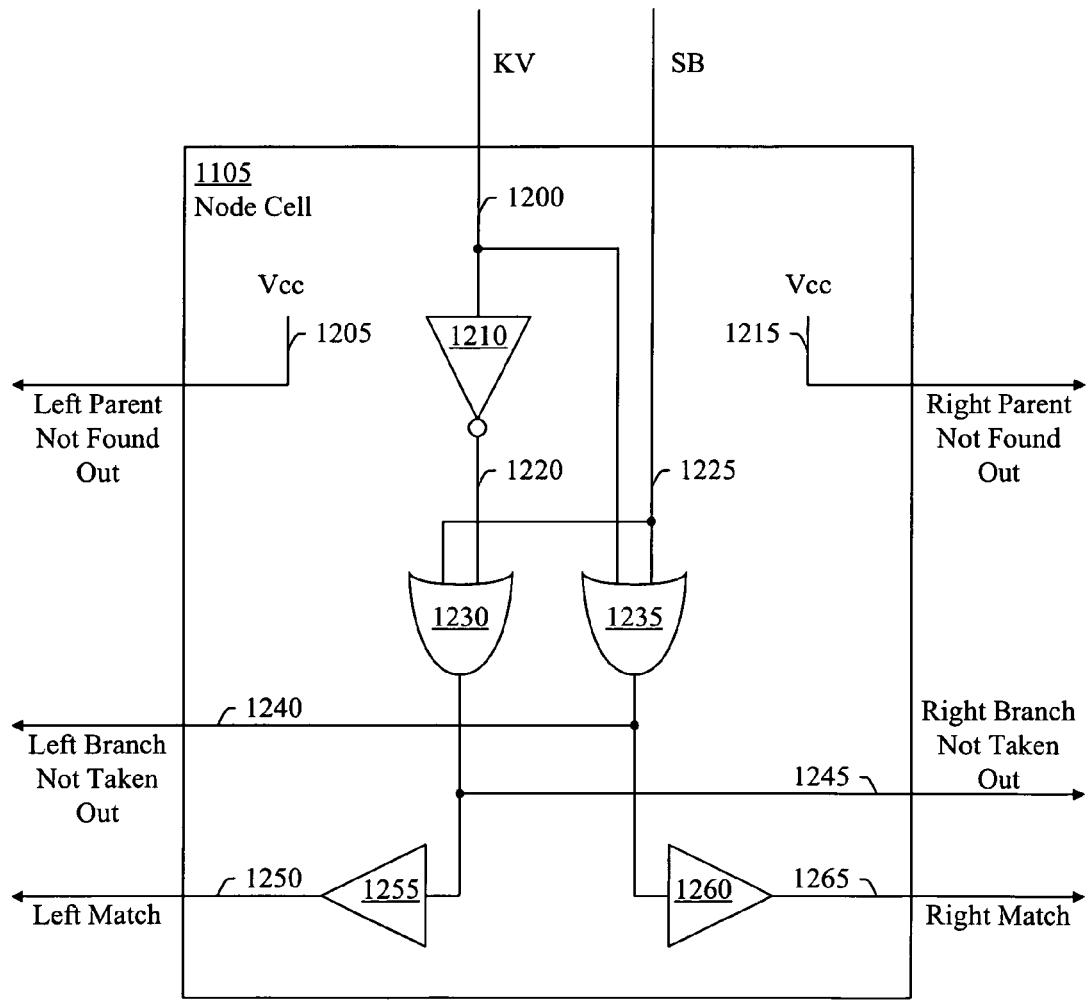
FIG. 12 is a block diagram of a node cell, in accordance with an embodiment of the present invention.

FIG. 12 illustrates the node cell 1105, in accordance with an embodiment of the present invention. The node cell 1105 includes an inverter 1210, an OR circuit 1230, an OR circuit 1235, a driver circuit 1255, and a driver circuit 1260. The OR circuit 1230 is coupled (e.g., connected) to the inverter 1210 and the driver circuit 1255. Further, the OR circuit 1235 is coupled (e.g., connected) to the driver circuit 1260. The node cell 1105 receives a key value (KV) 1200 in the subsequence of key values 245 and a star bit value (SB) in the subsequence of distinguishing bit indexes 230, and generates a parent indicator (left parent not found out) indicator 1205, a branch indicator (left branch not taken out) 1240, a match indicator (left match) 1250, a parent indicator (right parent not found out) 1215, a branch indicator (right branch not taken out) 1245, and a match indicator (right match) 1265.

The inverter 1210 generates an inverted key value 1220 by inverting the key value 1200. The OR circuit 1230 generates the branch indicator 1245 by performing a logical OR operation on the star bit value 1225 and the inverted key value 1220. The branch indicator 1245 indicates whether a right branch of the node 410 represented by the node cell 1105 in the digital search trie 400 represented by the sequence of distinguishing bit indexes 120 and the sequence of keys 144 is selected or pruned in a search operation. If the right branch of the node 410 represented by the node cell 1105 is selected in a search, the branch indicator 1245 has a value of one. Otherwise, if the right branch of the node 410 represented by the node cell 1105 is pruned, the branch indicator 1245 has a value of zero.

The driver circuit 1255 generates the match indicator 1250 by inverting the branch indicator 1245. For example, the driver circuit 1255 may be an open-collector driver. The match indicator 1250 indicates whether a leaf 415 connected the left branch of the node 410 represented by the node cell 1105, if any, is pruned from the digital search trie 400. If the match indicator 1250 has a value of zero, the leaf 415 is pruned from the digital search trie 400 and the key 320 associated with the leaf 415 is eliminated as a preliminary candidate key. The node cell 1105 provides the match indicator 1250 to the match line located to the left of the node cell 1105 in the matrix of cells including the node cell 1105. Moreover, if the match line has a value of one as a result of the search operation, the key 320 identified by the match bit M associated with the match line is a primary candidate key identified by the first stage decoder 240.

As illustrated in FIG. 12, the parent indicator 1205 is the supply voltage (e.g., Vcc) and has a value of one (e.g., a logical value of one). If the row in the matrix of cells in the first stage decoder 240 including the node cell 1105 has a left cell 1100 adjacent to the node cell 1105 and to the left of the node cell 1105, the node cell 1105 provides the parent indicator 1205 and the branch indicator 1240 to the left cell 1100.

The OR circuit 1235 generates the branch indicator 1240 by performing a logical OR operation on the star bit value 1225 and the key value 1200. If a left branch of a node 410 in the digital search trie 400 represented by the sequence of distinguishing bit indexes 120 and the sequence of keys 144 is not selected in a search operation, the branch indicator 1240 has a value of one. Otherwise, the branch indicator 1240 has a value of zero.

The driver circuit 1260 generates the match indicator 1265 by inverting the branch indicator 1240. For example, the driver circuit 1260 may be an open-collector driver. The match indicator 1265 indicates whether a leaf 415 connected the right branch of the node 410 represented by the node cell 1105, if any, is pruned from the digital search trie 400. If the match indicator 1265 has a value of zero, the leaf 415 is pruned from the digital search trie and the key 320 associated with the leaf 415 is eliminated as a preliminary candidate key. The node cell 1105 provides the match indicator 1265 to the match line located to the right of the node cell 1105 in the matrix of cells including the node cell 1105. Moreover, if the match line has a value of one as a result of the search operation, the key 320 identified by the match bit M associated with the match line is a primary candidate key identified by the first stage decoder 240.

As illustrated in FIG. 12, the parent indicator 1215 is the supply voltage (e.g., Vcc) and has a value of one (e.g., a logical value of one). If the row in the matrix of cells in the first stage decoder 240 including the node cell 1105 has a right cell 1110 adjacent to the node cell 1105 and to the right of the node cell 1105, the node cell 1105 provides the parent indicator 1215 and the branch indicator 1245 to the right cell 1110.

Figure 13:
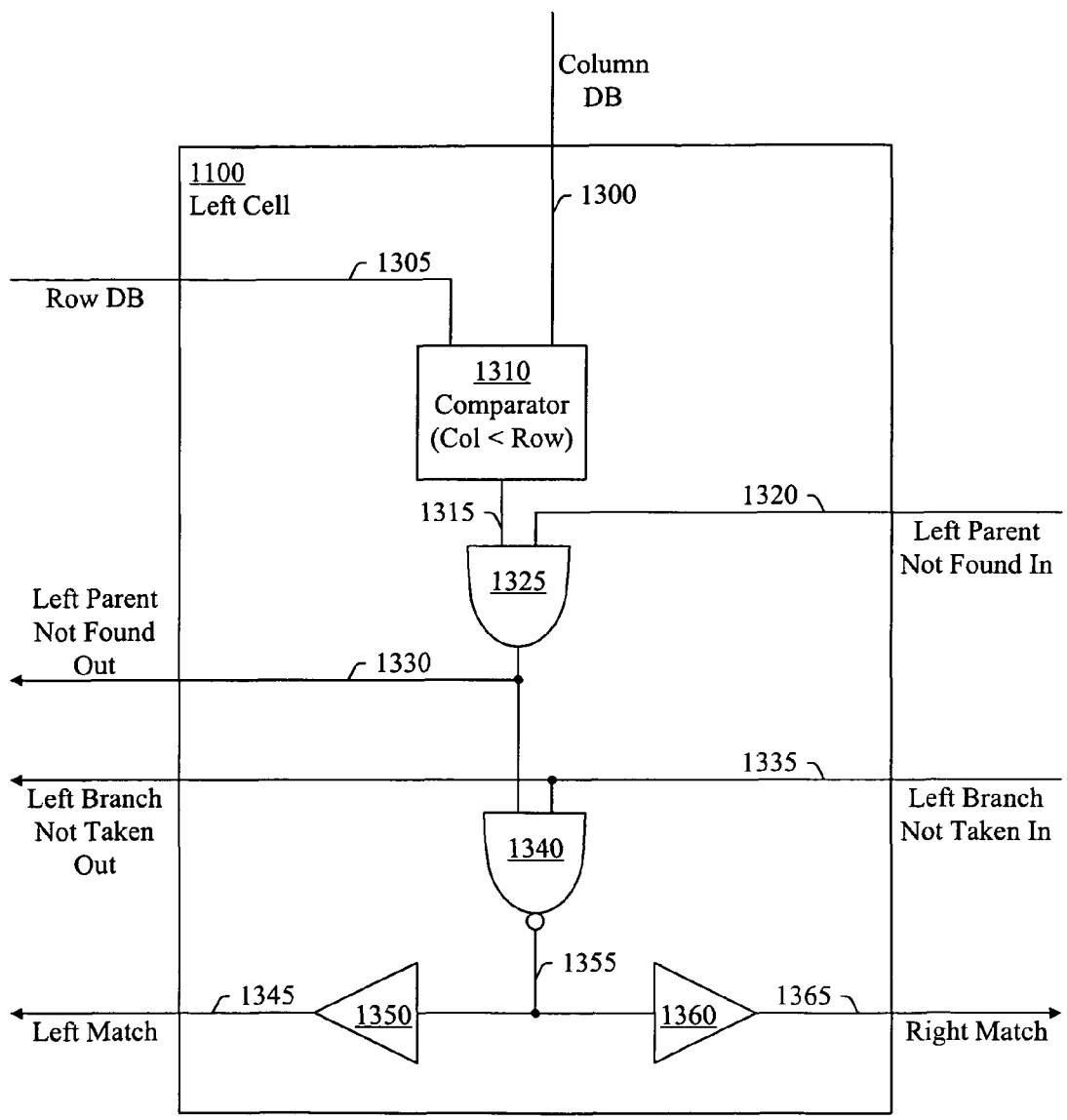
FIG. 13 is a block diagram of a left cell, in accordance with an embodiment of the present invention.

FIG. 13 illustrates the left cell 1100, in accordance with an embodiment of the present invention. The left cell 1100 includes a comparator 1310, an AND circuit 1325, a NAND circuit 1340, a driver circuit 1350, and a driver circuit 1360. The AND circuit 1325 is coupled (e.g., connected) to the comparator 1310 and the NAND circuit 1340. Additionally, the NAND circuit 1340 is coupled (e.g., connected) to the driver circuit 1350 and the driver circuit 1360. The left cell 1100 in a given row of the matrix of the first stage decoder 240 receives a distinguish bit value (Row DB) 1305 of the distinguishing bit index 310 in the subsequence of distinguishing bit indexes 230 received by each left cell 1100 and each right cell 1110 in the row. Additionally, the left cell 1100 in a given column of the matrix of the first stage decoder 240 receives a distinguish bit value (Column DB) 1300 of the distinguishing bit index 310 in the subsequence of distinguishing bit indexes 230 received by each left cell 1100 and each right cell 1110 in the column.

If the left cell 1100 is adjacent to a node cell 1105 or another left cell 1100 to the right of the left cell 1100 in the row of the matrix of the first stage decoder 240 containing the left cell 1100, the left cell 1100 receives a parent indicator (left parent not found in) 1320 and a branch indicator (left branch not taken in) 1335 from the adjacent node cell 1105. If the adjacent cell is a node cell 1105, the left cell 1100 receives the parent indicator 1205 of the node cell 1105 as the parent indicator 1320 and the branch indicator 1240 of the node cell 1105 as the branch indicator 1335. If the adjacent cell is another left cell 1100, the left cell 1100 receives a parent indicator (left parent not found out) 1330 generated by the adjacent left cell 1100 as the parent indicator 1320. Further, the left cell 1100 receives the branch indicator (left branch not taken out) 1335 of the adjacent left cell 1100 as the branch indicator (left brand not taken in) 1335.

The comparator 1310 generates a result 1315 by comparing the distinguishing bit value 1305 with the distinguishing bit value 1300. The result 1315 indicates whether the distinguishing bit value 1305 is less than the distinguishing bit value 1300. If the distinguishing bit value 1305 is less than the distinguishing bit value 1300, the result 1315 has a value of one. Otherwise the result 1315 has a value of zero. Thus, the comparator 1310 outputs a value of one if the column distinguishing bit index (Column DB) is less than the row distinguishing bit index (Row DB) and otherwise outputs a zero. The AND circuit 1325 generates the parent indicator 1330 by performing a logical AND operation on the result 1315 and the parent indicator 1320. The parent indicator 1320 indicates whether the left cell 1100 represents a node 410 along a left path of a parent node in the digital search trie 400 represented by the node cell 1105 in the same row of the matrix of the first stage decoder 240 as the left cell 1100.

The NAND circuit 1340 generates a match indicator 1355 by performing a logical NAND operation on the parent indicator 1330 and the branch indicator 1335. The match indicator 1355 indicates whether the node 410 represented by the left cell 1100 in the digital search trie 400 represented by the sequence of distinguishing bit indexes 120 and the sequence of keys 144 is selected or pruned in a search operation. If the node 410 represented by the left cell 1100 is pruned in a search operation, the match indicator 1355 has a value of zero. Otherwise, the match indicator 1355 has a value of zero.

The driver circuit 1350 generates a match indicator (left match) 1345 having the value of the match indicator 1355. For example, the driver circuit 1350 may be an open-collector driver. The match indicator 1345 indicates whether a leaf 415 connected the left branch of the node 410 represented by the left cell 1100, if any, is pruned from the digital search trie 400. If the match indicator 1345 has a value of zero, the leaf 415 is pruned from the digital search trie 400 and the key 320 associated with the leaf 415 is eliminated as a preliminary candidate key. The left cell 1100 provides the match indicator 1345 to the match line located to the left of the left cell 1100 in the matrix of cells including the left cell 1100.

The driver circuit 1360 generates a match indicator (right match) 1365 having the value of the match indicator 1355. For example, the driver circuit 1360 may be an open-collector driver. The match indicator 1365 indicates whether a leaf 415 connected the right branch of the node 410 represented by the left cell 1100, if any, is pruned from the digital search trie 400. If the match indicator 1365 has a value of zero, the leaf 415 is pruned from the digital search trie and the key 320 associated with the leaf 415 is eliminated as a preliminary candidate key. The left cell 1100 provides the match indicator 1365 to the match line located to the right of the left cell 1100 in the matrix of cells including the left cell 1100.

Figure 14:
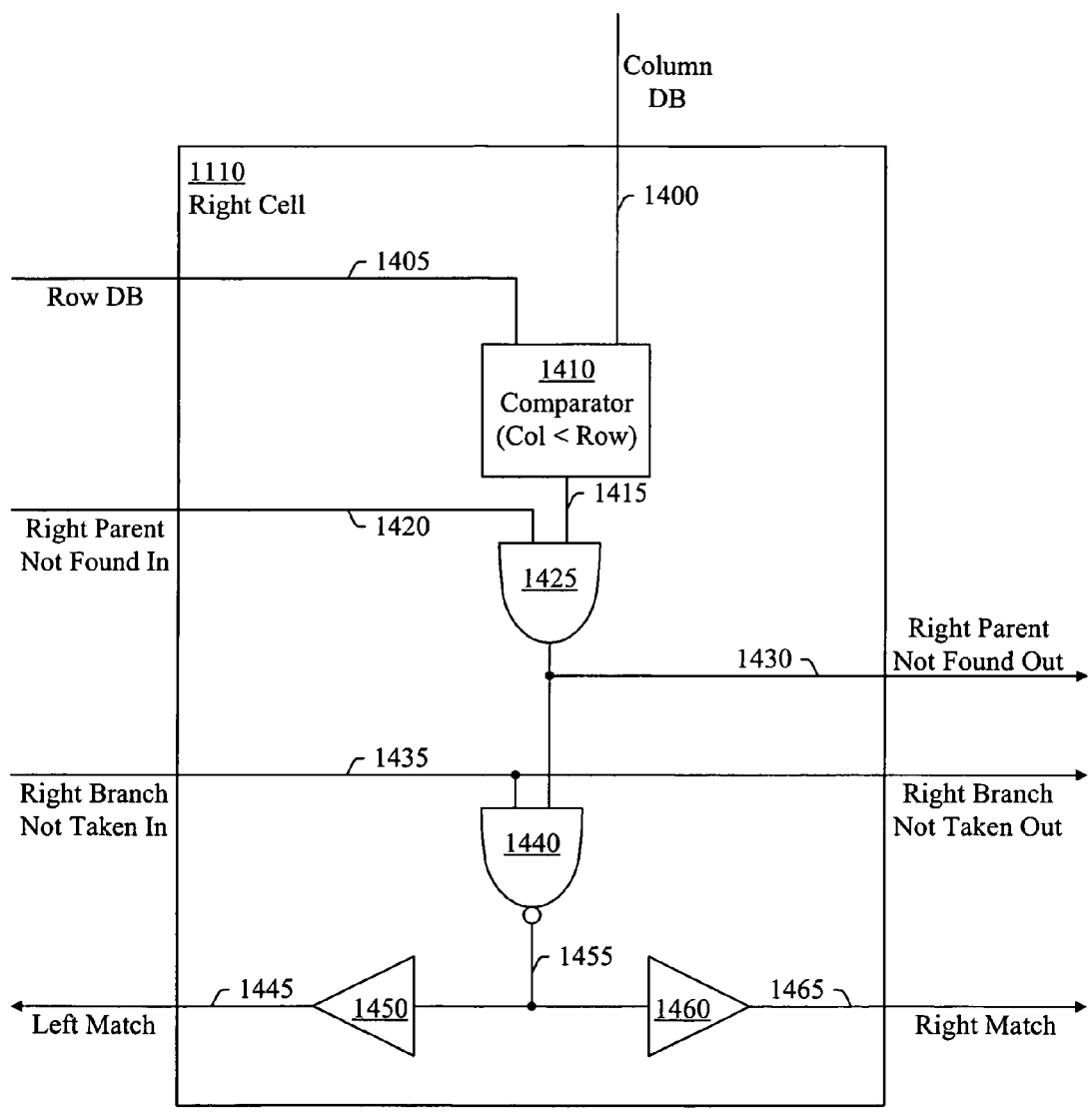
FIG. 14 is a block diagram of a right cell, in accordance with an embodiment of the present invention.

FIG. 14 illustrates the right cell 1110, in accordance with an embodiment of the present invention. The right cell 1110 includes a comparator 1410, an AND circuit 1425, a NAND circuit 1440, a driver circuit 1450, and a driver circuit 1460. The AND circuit 1425 is coupled (e.g., connected) to the comparator 1410 and the NAND circuit 1440. Additionally, the NAND circuit 1440 is coupled (e.g., connected) to the driver circuit 1450 and the driver circuit 1460. The right cell 1110 in a given row of the matrix of the first stage decoder 240 receives a distinguish bit value (Row DB) 1405 of the distinguishing bit index 310 in the subsequence of distinguishing bit indexes 230 received by each left cell 1100 and each right cell 1110 in the row. Additionally, the right cell 1110 in a given column of the matrix of the first stage decoder 240 receives a distinguish bit value (Column DB) 1400 of the distinguishing bit index 310 in the subsequence of distinguishing bit indexes 230 received by each left cell 1100 and each right cell 1110 in the column.

If the right cell 1110 is adjacent to a node cell 1105 or another right cell 1110 to the left of the right cell 1110 in the row of the matrix of the first stage decoder 240 containing the right cell 1110, the right cell 1110 receives a parent indicator (right parent not found in) 1420 and a branch indicator (right branch not taken in) 1435 from the adjacent node cell 1105. If the adjacent cell is a node cell 1105, the right cell 1110 receives the parent indicator 1215 of the node cell 1105 as the parent indicator 1420 and the branch indicator 1245 of the node cell 1105 as the branch indicator 1435. If the adjacent cell is another right cell 1110, the right cell 1110 receives a parent indicator (right parent not found out) 1430 generated by the adjacent right cell 1110 as the parent indicator 1420. Further, the right cell 1110 receives the branch indicator (right branch not taken out) 1435 of the adjacent right cell 1110 as the branch indicator (right brand not taken in) 1435.

The comparator 1410 generates a result 1415 indicating whether the distinguishing bit value 1405 is less than the distinguishing bit value 1400. If he distinguishing bit value 1405 is less than the distinguishing bit value 1400, the result 1415 has a value of one. Otherwise the result 1415 has a value of zero. Thus, the comparator 1410 outputs a value of one if the column distinguishing bit index (Column DB) is less than the row distinguishing bit index (Row DB) and otherwise outputs a zero. The AND circuit 1425 generates the parent indicator 1430 by performing a logical AND operation on the result 1415 and the parent indicator 1420. The parent indicator 1420 indicates whether the right cell 1110 represents a node 410 along a right path of a parent node in the digital search trie 400 represented by the node cell 1105 in the same row of the matrix of the first stage decoder 240 as the right cell 1110.

The NAND circuit 1440 generates a match indicator 1455 by performing a logical NAND operation on the parent indicator 1430 and the branch indicator 1435. The match indicator 1455 indicates whether the node 410 represented by the right cell 1100 in the digital search trie 400 represented by the sequence of distinguishing bit indexes 120 and the sequence of keys 144 is selected or pruned in a search operation. If the node 410 represented by the right cell 1110 is pruned in a search operation, the match indicator 1455 has a value of zero. Otherwise, the match indicator 1455 has a value of one.

The driver circuit 1450 generates a match indicator (left match) 1445 having the value as the match indicator 1455. For example, the driver circuit 1450 may be an open-collector driver. The match indicator 1445 indicates whether a leaf 415 connected the left branch of the node 410 represented by the right cell 1110, if any, is pruned from the digital search trie 400. If the match indicator 1445 has a value of zero, the leaf 415 is pruned from the digital search trie 400 and the key 320 associated with the leaf 415 is eliminated as a preliminary candidate key. The right cell 1110 provides the match indicator 1445 to the match line located to the left of the right cell 1110 in the matrix of cells including the right cell 1110.

The driver circuit 1460 generates a match indicator (right match) 1465 having the value of the match indicator 1455. The match indicator 1465 indicates whether a leaf 415 connected the right branch of the node 410 represented by the right cell 1110, if any, is pruned from the digital search trie 400. If the match indicator 1465 has a value of zero, the leaf 415 is pruned from the digital search trie 400 and the key 320 associated with the leaf 415 is eliminated as a preliminary candidate key. The right cell 1110 provides the match indicator 1465 to the match line located to the right of the right cell 1110 in the matrix of cells including the right cell 1110.

Figure 15:
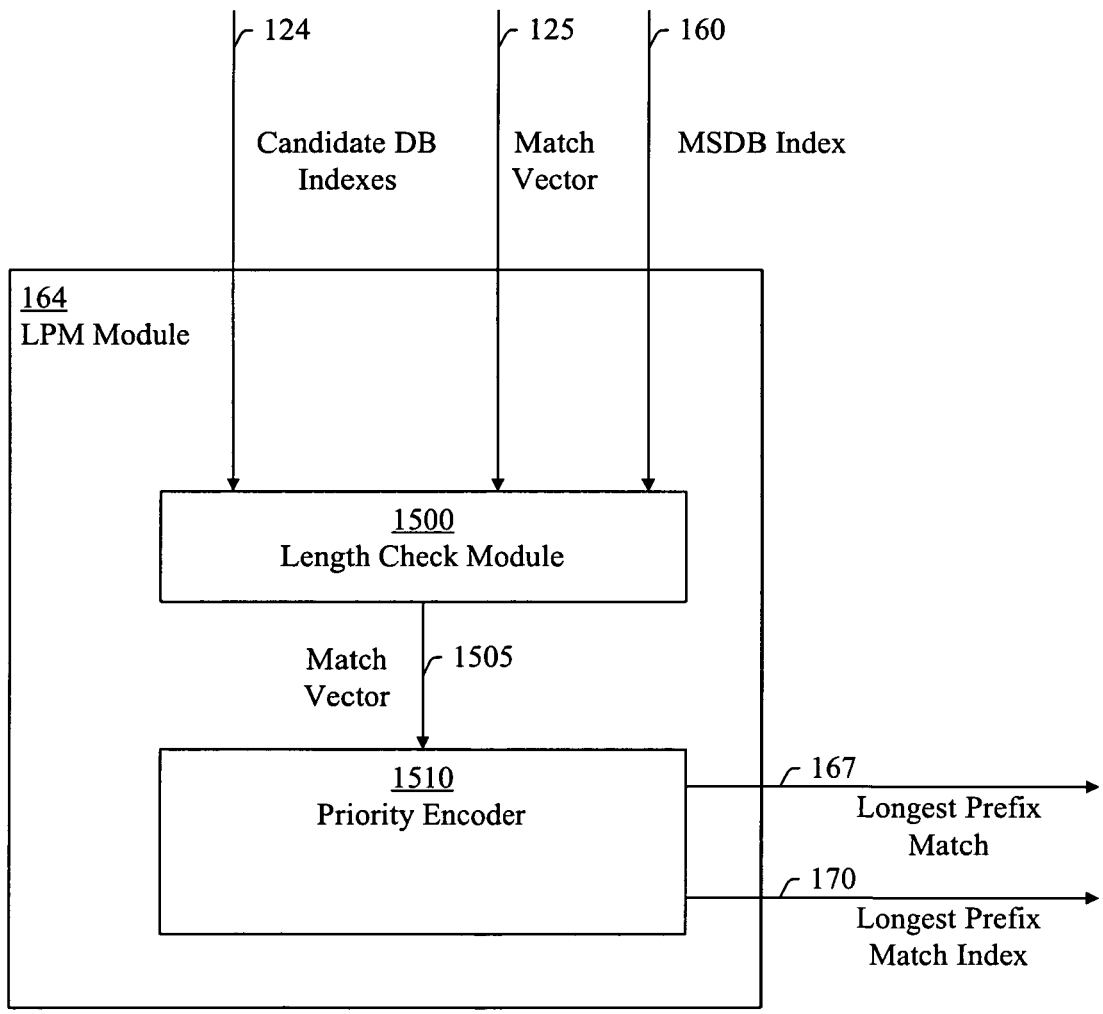
FIG. 15 is a block diagram of a longest prefix match module, in accordance with an embodiment of the present invention.

FIG. 15 illustrates the longest prefix match module 164, in accordance with an embodiment of the present invention. The longest prefix match module 164 includes a length check module 1500 and a priority encoder 1510 coupled (e.g., connected) to the length check module 1500. The length check module 1500 generates the match vector 1505 based on the match vector 125, the sequence of candidate distinguishing bit indexes 124, and the most significant distinguishing bit index 160. The match vector 1505 identifies any candidate key identified by the match vector 125 having a distinguishing bit index 310 that is greater than the most significant distinguishing bit index 160. In this way, the length check module 1500 prunes any candidate key identified by the match vector 125 that has a prefix longer than the longest candidate prefix. Further, the length check module 1500 generates a match vector 1505 identifying any candidate key identified by the match vector 125 that has a shorter prefix than the longest candidate prefix identified by the longest candidate prefix module 150.

If the selected candidate key 146 does not match the search key 117, the longest prefix match module 164 functions to find a candidate key identified by key match module 122 that has a shorter prefix than the longest candidate prefix. Because the sequence of candidate distinguishing bit indexes 124 and the sequence of keys identified by the match vector 125 is in a canonical form, as described more fully herein, if the search key 117 matches a key 320 in the sequence of keys 144, the matching key 320 is a candidate key identified by the match vector 125. Moreover, if the selected candidate key 146 does not match the search key 117, the matching key 320 has a shorter matching prefix than the longest candidate prefix.

The priority encoder 1510 identifies the candidate key identified by the match vector 1505 that has a longest matching prefix with the search key 117. Additionally, the priority encoder 1510 generates the longest prefix match indicator 167 indicating that the longest prefix match module 164 identified a key 320 in the sequence of keys 144 having a matching prefix with the search key 117. Further, the priority encoder 1510 generates the longest prefix match index 170 which identifies the key 320 in the sequence of keys 144, if any, having a longest matching prefix with the search key 117.

Figure 16:
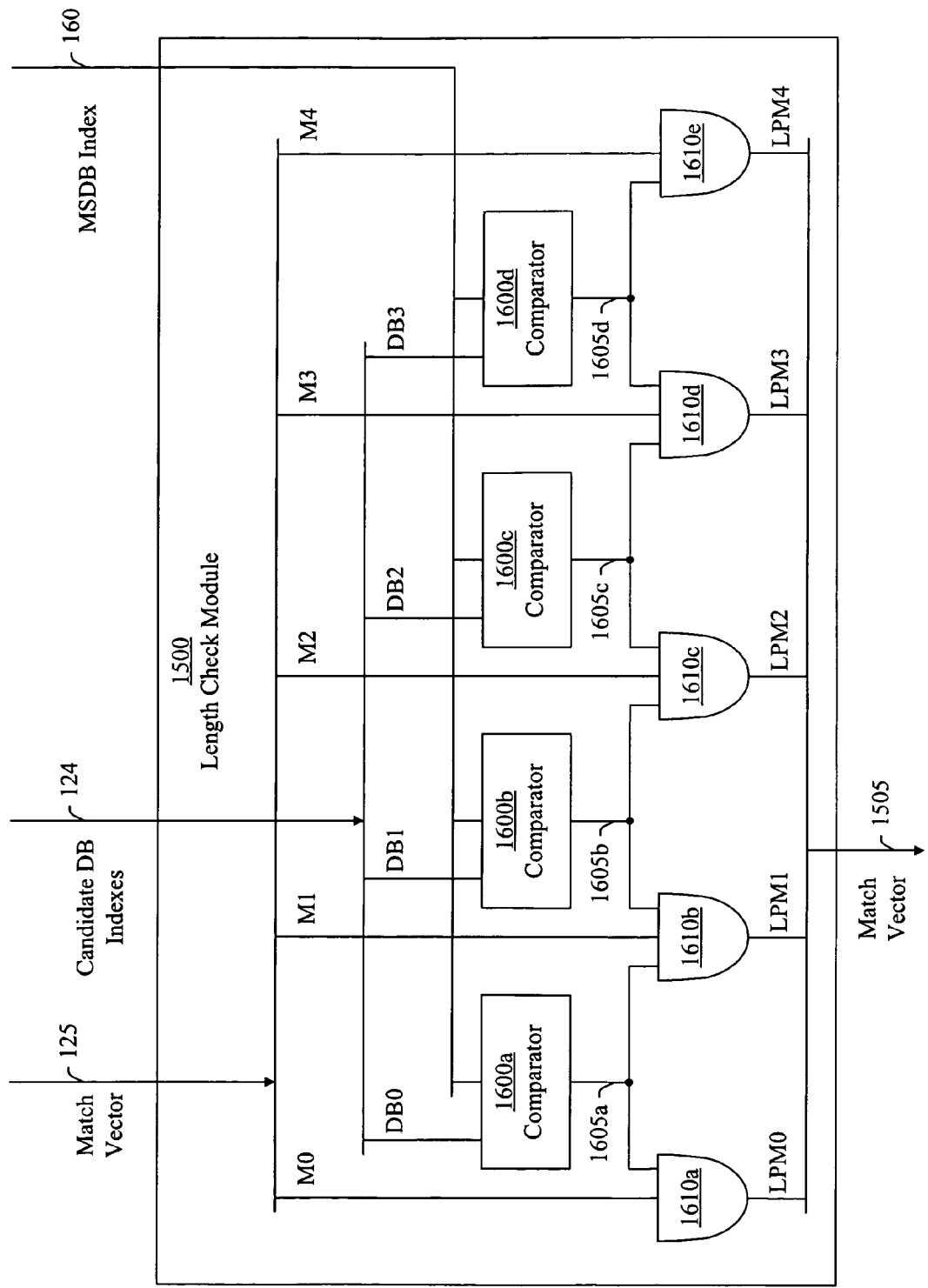
FIG. 16 is a block diagram of a length check module, in accordance with an embodiment of the present invention.

FIG. 16 illustrates the length check module 1500, in accordance with an embodiment of the present invention. The length check module 1500 includes comparators 1600 (e.g., comparators 1600a-d) and AND circuits 1610 (e.g., AND circuits 1610a-e). Each of the comparators 1600 compares a corresponding distinguishing bit index 310 of the sequence of candidate distinguishing bit indexes 124 with the most significant distinguishing bit index 160 and generates a result 1605 (e.g., results 1605a-d) of the comparison. If the distinguishing bit index 310 of the sequence of candidate distinguishing bit indexes 124 is less than the most significant distinguishing bit index 160 the result 1605 generated by the comparator 1600 is zero, otherwise the result 1605 generated by the comparator 1600 is one.

Each of the AND circuits 1610 generates a longest prefix match bit LPM (e.g., longest prefix match bits LPM0-4) of the match vector 1505 by performing a logical AND operation on a corresponding match bit M in the match vector 125 and the result 1605 generated by each comparator 1600 corresponding to a distinguishing bit index 310 adjacent to the candidate key identified by the match bit M in the digital search trie 800. The longest prefix match bit LPM indicates whether the key 320 identified by the match bit M corresponding to the longest prefix match bit LPM has a longest matching prefix with the search key 117 that is less than the longest candidate prefix generated by the longest candidate prefix module 150.

As illustrated in FIG. 16, the comparator 1600a generates the result 1605a by comparing the bit value DB0 of the distinguishing bit index 310 corresponding to the comparator 1600a with the most significant distinguishing bit index 160. The comparator 1600b generates the result 1605b by comparing the bit value DB1 of the distinguishing bit index 310 corresponding to the comparator 1600b with the most significant distinguishing bit index 160. The comparator 1600c generates the result 1605c by comparing the bit value DB2 of the distinguishing bit index 310 corresponding to the comparator 1600c with the most significant distinguishing bit index 160. The comparator 1600d generates the result 1605d by comparing the bit value DB3 of the distinguishing bit index 310 corresponding to the comparator 1600d with the most significant distinguishing bit index 160.

As also illustrated in FIG. 16, the AND circuit 1610a generates the prefix match bit LPM0 by performing a logical AND operation on the match bit M0 and the result 1605a. The prefix match bit LPM0 indicates whether the candidate prefix of the candidate key identified by the match bit M0 is shorter than the longest candidate prefix. The AND circuit 1610b generates the prefix match bit LPM1 by performing a logical AND operation on the match bit M1, the result 1605a, and the result 1605b. The prefix match bit LPM1 indicates whether the candidate prefix of the candidate key identified by the match bit M1 is shorter than the longest candidate prefix. The AND circuit 1610c generates the prefix match bit LPM2 by performing a logical AND operation on the match bit M2, the result 1605b, and the result 1605c. The prefix match bit LPM2 indicates whether the candidate prefix of the candidate key identified by the match bit M2 is shorter than the longest candidate prefix. The AND circuit 1610d generates the prefix match bit LPM3 by performing a logical AND operation on the match bit M3, the result 1605c, and the result 1605d. The prefix match bit LPM3 indicates whether the candidate prefix of the candidate key identified by the match bit M3 is shorter than the longest candidate prefix. The AND circuit 1610e generates the prefix match bit LPM4 by performing a logical AND operation on the match bit M4 and the result 1605d. The prefix match bit LPM4 indicates whether the candidate prefix of the candidate key identified by the match bit M4 is shorter than the longest candidate prefix.

Figure 17:
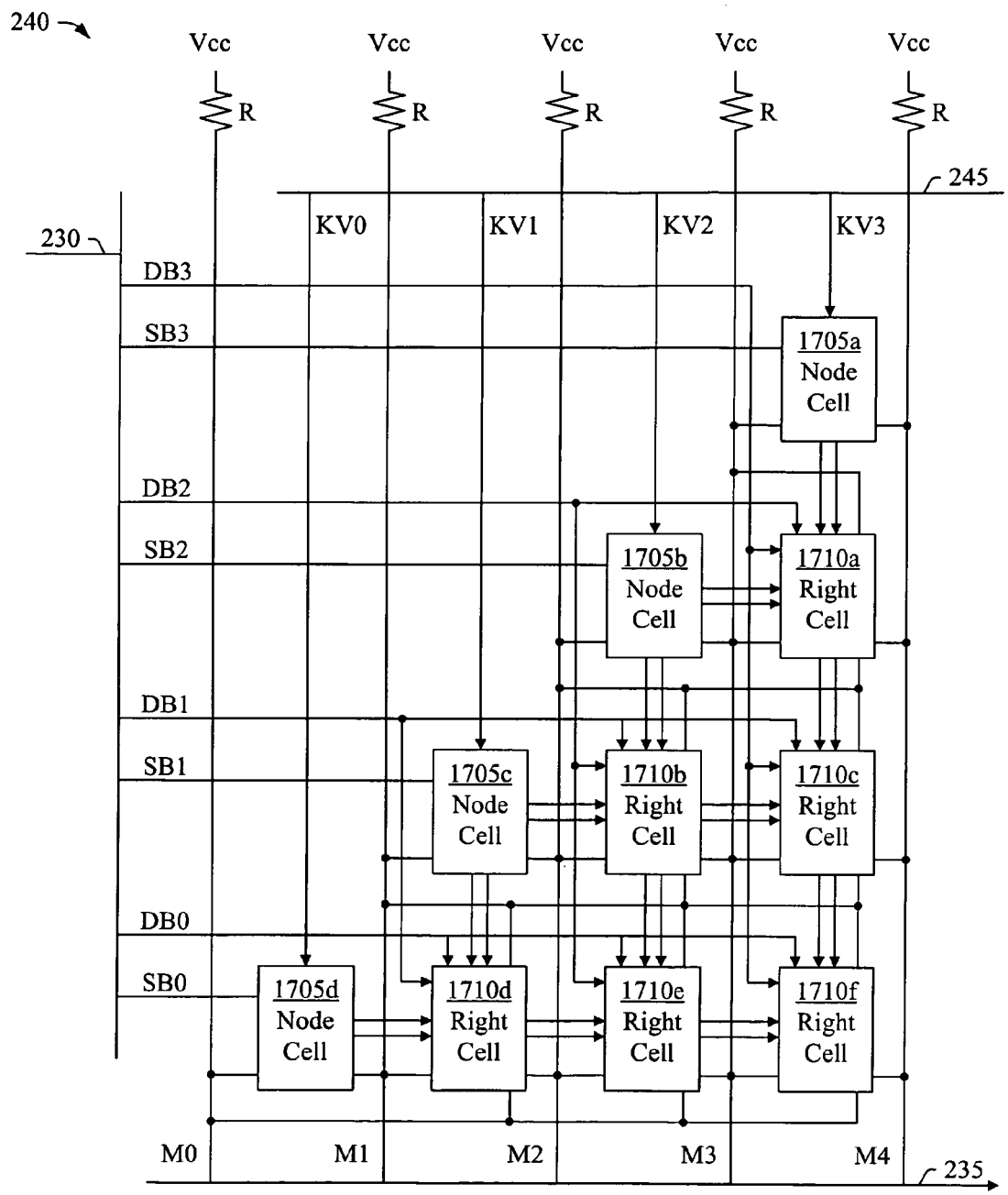
FIG. 17 is a block diagram of a first stage decoder, in accordance with an embodiment of the present invention.

FIG. 17 illustrates the first stage decoder 240, in accordance with an embodiment of the present invention. The first state decoder 240 includes a matrix of interconnected cells, which includes nodes cells 1705 (e.g., node cells 1705a-d) and right cells 1710 (e.g., right cells 1710a-f). The node cells 1705 are located along a diagonal of the matrix and each cell in the matrix to the right of a node cell 1705 is a right cell 1710.

Each right cell 1710 represents a potential node 410 along a left path of a parent node in the digital search trie 400 represented by the node cell 1705 in the same column of the matrix of the first stage decoder 240 as the right cell 1710. Additionally, each right cell 1710 represents a potential node 410 along a right path of a parent node in the digital search trie 400 represented by the node cell 1705 in the same row of the matrix of the first stage decoder 240 as the right cell 1710. As may be envisioned from FIG. 11 and FIG. 17, the first stage decoder 240 of FIG. 17 represents the first stage decoder 240 of FIG. 11 folded along its diagonal such that a right cell 1710 in the first stage decoder 240 of FIG. 17 performs the function of a corresponding left cell 1100 and a corresponding right cell 1110 of the first stage decoder 240 of FIG. 11. For example, the right cell 1710f in the first stage decoder 240 of FIG. 17 performs the functions of both the left cell 1100a and the right cell 1110f in the first stage decoder 240 of FIG. 11.

Each right cell 1710 in a given row of the matrix of interconnected cells receives a row bit value DB (e.g., bit values DB0-3) of a distinguishing bit index 310 in the subsequence of distinguishing bit indexes 230. Additionally, each right cell 1710 in a column of the matrix of interconnected cells receives a column bit value DB (e.g., bit values DB0-3) of a distinguishing bit index 310 in the subsequence of distinguishing bit indexes 230. Each node cell 1705 in the matrix receives a star bit value SB (e.g., star bit value SB0-SB3) of a distinguishing bit index 310 in the subsequence of distinguishing bit indexes 230. Additionally, each node cell 1705 in the matrix receives a key value KV in the subsequence of key values 245.

As illustrated in FIG. 17, the first stage decoder 240 generates the match vector 235 which includes four match bits M (e.g., match bits M0-M4). The match bits M correspond to keys 320 in the sequence of keys 144. Each cell in the matrix (e.g. the node cells 1705a-d and the right cells 1710a-f) is connected to a match line associated with a match bit M located to the left of the cell and another match line associated with a match bit M located to the right of the cell. Additionally, each of the match lines associated with a match bit M is connected to a supply voltage Vcc through a pull-up resistor R for establishing a supply voltage (e.g., Vcc) on the match line. The match bits M in the match vector 235 represent a bit vector in which a bit has a value of one if the voltage of the corresponding match line is the supply voltage and a value of zero if the voltage of the corresponding match line is a ground potential. Moreover, each bit in the bit vector having a value of one identifies a primary candidate key in the sequence of primary candidate keys indicated by the match vector 235.

In operation, each cell in the matrix may pull down the voltage on the match line to the left of the cell, the match line to the right of the cell, or both. For example, a cell in the matrix may pull down a match line to a ground voltage potential. The voltage on each match line indicates whether a corresponding key 320 in the sequence of keys 144 indicated by the match vector 235 is selected by the first stage decoder 240. The voltage on each match line indicates whether a corresponding key 320 in the sequence of keys 144 indicated by the match vector 235 is selected by the first stage decoder 240. If the first stage decoder 240 selects a key 320, the voltage on the match line corresponding to the key 320 is the supply voltage and the match bit M associated with the match line has a value of one. Otherwise, if the first stage decoder 240 does not select a key 320, the voltage on the match line corresponding to the key is a ground potential and the match bit M associated with the match line has a value of zero. If a match bit M has a value of zero, the key 320 in the sequence of keys 144 corresponding to the match bit M is pruned from the digital search trie represented by the sequence of distinguishing bit indexes 120 and the sequence of keys 144. Otherwise, if the match bit M has a value of one (e.g., a supply voltage), the key 320 in the sequence of keys 144 corresponding to the match bit M is selected as a preliminary candidate key.

Each node cell 1705a in the matrix represents a node 410 in the digital search trie 400 represented by the sequence of distinguishing bit indexes 120 and the sequence of keys 144. Additionally, each right cell 1710 in the same row of the node cell 1705a represents a node 410 in the digital search trie 400 to the left of the node 410 represented by the node cell 1705a and a node 410 in the digital search trie 400 to the right of the node 410 represented by the node cell 1705a. Generally, adjacent cells in each row of the matrix communicate with each other to determine which branch or branches are selected to the right of the node 410 in the digital search trie 400 represented by the node cell 1705 in the row. Additionally, adjacent cells in each column of the matrix communicate with each other to determine which branch or branches are selected to the left of the node 410 in the digital search trie 400 represented by the node cell 1705 in the column. Further, adjacent cells in each row of the matrix and adjacent cells in each column of the matrix communicate with each other to determine relationships among the nodes 410 in the digital search trie 400 represented by the node cells 1705 in the matrix. For example, adjacent cells in a column of the matrix may determine whether a node 410 represented by the node cell 1705 in the column is a parent node or child node of a node 410 represented by a node cell 1705 in another column of the matrix. Further, adjacent cells in a row of the matrix may determine whether a node 410 represented by the node cell 1705 in the row is a parent node or child node of a node 410 represented by a node cell 1705 in another row of the matrix.

As illustrated in FIG. 17, a first row of the matrix includes the node cell 1705a. The node cell 1705a receives the star bit value SB3 and the key value KV3. Further, the node cell 1705a is connected to the match lines associated with the match bits M3 and M4.

A second row of the matrix includes the node cell 1705b, and the right cell 1710a. In the second row, the node cell 1705b is connected to the right cell 1710a and receives the star bit value SB2 and the key value KV2. The right cell 1710a receives a distinguishing bit value DB2 associated with the second row and a distinguishing bit value DB3 associated with the fourth column. Further, the node cell 1705b is connected to the match lines associated with the match bits M2 and M3, and the right cell 1710a is connected to the match lines associated with the match bits M2, M3, and M4.

A third row of the matrix includes the node cell 1705c and the right cells 1710b-c. In the third row, the node cell 1705c is connected to the right cell 1710b, and the right cell 1710b is connected to the right cell 1710c. The node cell 1705c in the third row of the matrix receives the star bit value SB1 and the second key value KV1. Each of the right cells 1710b-c in the third row of the matrix receives the distinguishing bit value DB1 associated with the third row. Additionally, the right cell 1710b receives the distinguishing bit value DB2 associated with the third column and the right cell 1710c receives the distinguishing bit value DB3 associated with the fourth column. Further, the node cell 1705c is connected to the match lines associated with the match bits M1 and M2, the right cell 1710b is connected to the match lines associated with the match bits M1, M2, and M3, and the right cell 1710c is connected to the match lines associated with the match bits M1, M2, M3, and M4.

A fourth row of the matrix includes the node cell 1705d and the right cells 1710d-f. In the fourth row, the node cell 1705d is connected to the right cell 1710d, the right cell 1710d is connected to the right cell 1710e, and the right cell 1710e is connected to the right cell 1710f. The node cell 1705d in the fourth row of the matrix receives the star bit value SB0 and the key value KV0. Each of the right cells 1710d-f in the fourth row of the matrix receives the distinguishing bit value DB0 associated with the fourth row. Additionally, the right cell 1710d receives the distinguishing bit value DB1 associated with the second column, the right cell 1710e receives the distinguishing bit value DB2 associated with the third column, and the right cell 1710f receives the distinguishing bit value DB3 associated with the fourth column. Further, the node cell 1705d is connected to the match lines associated with the match bits M0 and M1, the right cell 1710d is connected to the match lines associated with the match bits M0, M1, and M2, the right cell 1710e is connected to the match lines associated with the match bits M0, M1, M2, and M3, and the right cell 1710f is connected to the match lines associated with the match bits M0, M1, M3, and M4.

Although the first stage decoder 240 illustrated in FIG. 17 has four rows and four columns of cells, the first stage decoder 240 may have more or fewer than four rows and columns in other embodiments. In operation, one or more of the rows and columns of cells in the matrix may be unused (e.g., disabled). For example, the sequence of distinguishing bit indexes 120 and the sequence of keys 144 may be partitioned among the first stage decoders 240 such that a first stage decoder 240 includes one or more rows and columns of unused cells in the matrix of the first stage decoder 240. Moreover, a row and column of unused cells in the matrix of the first stage decoder 240 may be used to insert a new key 320 into the database 300 represented by the sequence of distinguishing bit indexes 120 and the sequence of keys 144, as is described more fully herein.

Figure 18:
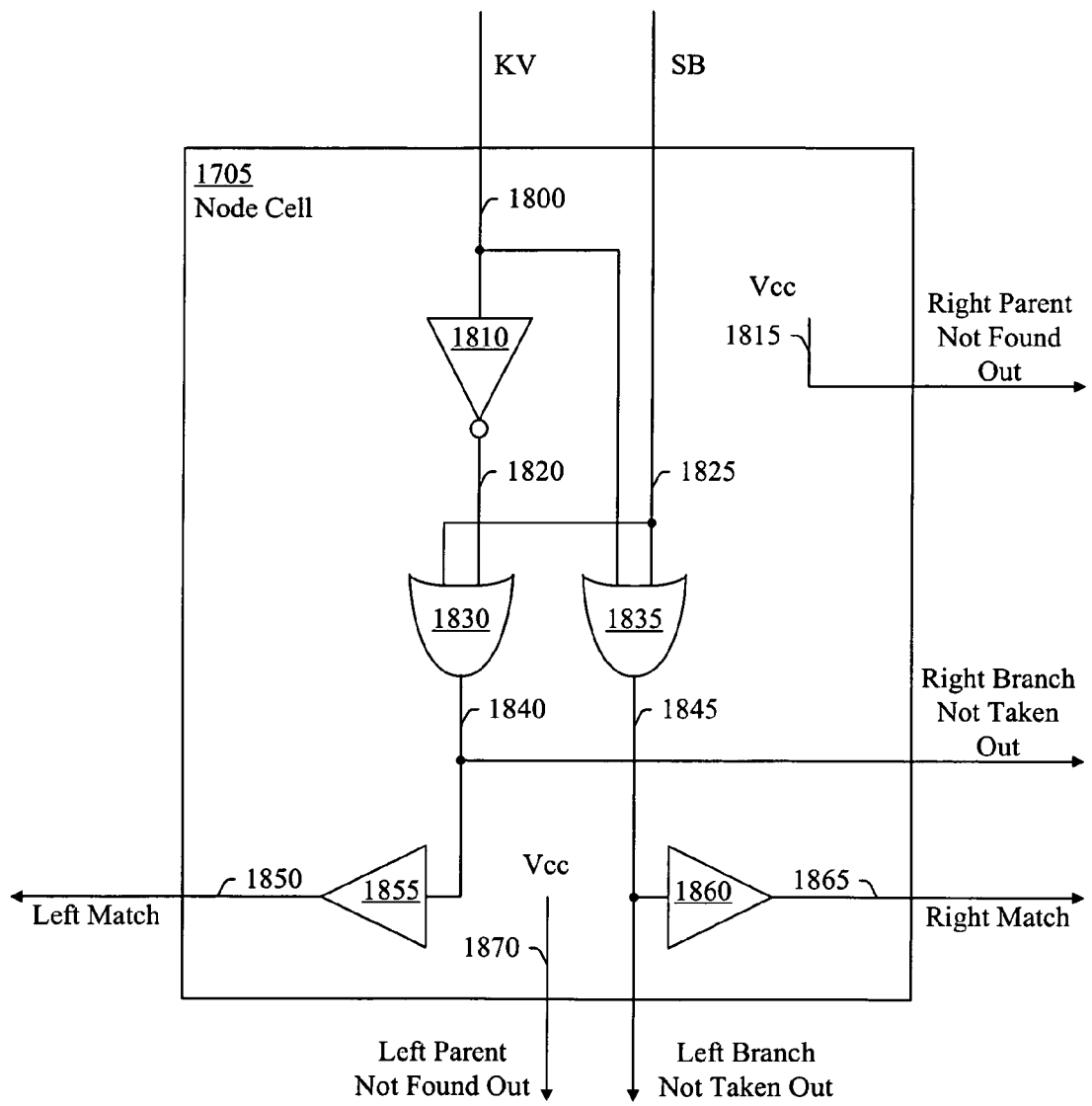
FIG. 18 is a block diagram of a node cell, in accordance with an embodiment of the present invention.

FIG. 18 illustrates the node cell 1705, in accordance with an embodiment of the present invention. The node cell 1705 includes an inverter 1810, an OR circuit 1830, an OR circuit 1835, a driver circuit 1855, and a driver circuit 1860. The OR circuit 1830 is coupled (e.g., connected) to the inverter 1810 and the driver circuit 1855. Further, the OR circuit 1835 is coupled (e.g., connected) to the driver circuit 1860. The node cell 1705 receives a key value (KV) 1800 in the subsequence of key values 245 and a star bit value (SB) in the subsequence of distinguishing bit indexes 230, and generates a parent indicator (left parent not found out) indicator 1870, a branch indicator (right branch not taken out) 1845, a match indicator (left match) 1850, a parent indicator (right parent not found out) 1815, a branch indicator (left branch not taken out) 1845, and a match indicator (right match) 1865.

The inverter 1810 generates an inverted key value 1820 by inverting the key value 1800. The OR circuit 1830 generates the branch indicator 1840 by performing a logical OR operation on the star bit value 1825 and the inverted key value 1820. The branch indicator 1840 indicates whether a right branch of the node 410 represented by the node cell 1705 in the digital search trie 400 represented by the sequence of distinguishing bit indexes 120 and the sequence of keys 144 is selected or pruned in a search operation. If the branch indicator 1840 has a value of one, the right branch of the node 410 represented by the node cell 1705 is selected in a search operation. Otherwise, if the branch indicator 1840 has a value of zero, the right branch of the node 410 represented by the node cell 1705 is pruned.

The driver circuit 1855 generates the match indicator 1850 based the branch indicator 1840. For example, the driver circuit 1855 may be an open-collector driver. The match indicator 1850 indicates whether a leaf 415 connected to the left branch of the node 410 represented by the node cell 1705 in a digital search trie 400 represented by the sequence of distinguishing bit indexes 120 and the sequence of keys 144, if any, is pruned from the digital search trie 400 in the search operation. If match indictor 1850 has a value of zero, the leaf 415 is pruned from the digital search trie 400. The node cell 1705 provides the match indicator 1850 to the match line located to the left of the node cell 1705 in the matrix of cells including the node cell 1705. Moreover, if the match line has a value of one as a result of a search operation, the key 320 identified by the match bit M associated with the match line is a primary candidate key identified by the first stage decoder 240.

The OR circuit 1835 generates the branch indicator 1845 by performing a logical OR operation on the star bit value 1825 and the key value 1800. If a left branch of a node 410 in the digital search trie 400 represented by the sequence of distinguishing bit indexes 120 and the sequence of keys 144 is selected in a search operation, the branch indicator 1845 has a value of one. Otherwise, the branch indicator 1845 has a value of zero.

The driver circuit 1860 generates the match indicator 1865 based on the branch indicator 1845. For example, the driver circuit 1860 may be an open-collector driver. The match indicator 1865 indicates whether a leaf 415 connected to the right branch of the node 410 represented by the node cell 1705 in a digital search trie 400 represented by the sequence of distinguishing bit indexes 120 and the sequence of keys 144, if any, is pruned from the digital search trie 400 in the search operation. If match indictor 1865 has a value of zero, the leaf 415 is pruned from the digital search trie 400. The node cell 1705 provides the match indicator 1865 to the match line located to the left of the node cell 1705 in the matrix of cells including the node cell 1105. Moreover, if the match line has a value of one as a result of a search operation, the key 320 identified by the match bit M associated with the match line is a primary candidate key identified by the first stage decoder 240.

As illustrated in FIG. 18, each of the parent indicator 1815 and the parent indicator 1870 is connected to the supply voltage (e.g., Vcc) and has a value of one (e.g., a logical value of one). Further, if the row in the matrix of cells in the first stage decoder 240 including the node cell 1705 has a right cell 1710 adjacent to the node cell 1705 and to the right of the node cell 1705, the node cell 1705 provides the parent indicator 1815 and the branch indicator 1840 to the right cell 1710. If the column in the matrix of cells in the first stage decoder 240 including the node cell 1705 has a right cell 1710 adjacent to the node cell 1705 and below the node cell 1705, the node cell 1705 provides the branch indicator 1845 and the parent indicator 1870 to the right cell 1710.

Figure 19:
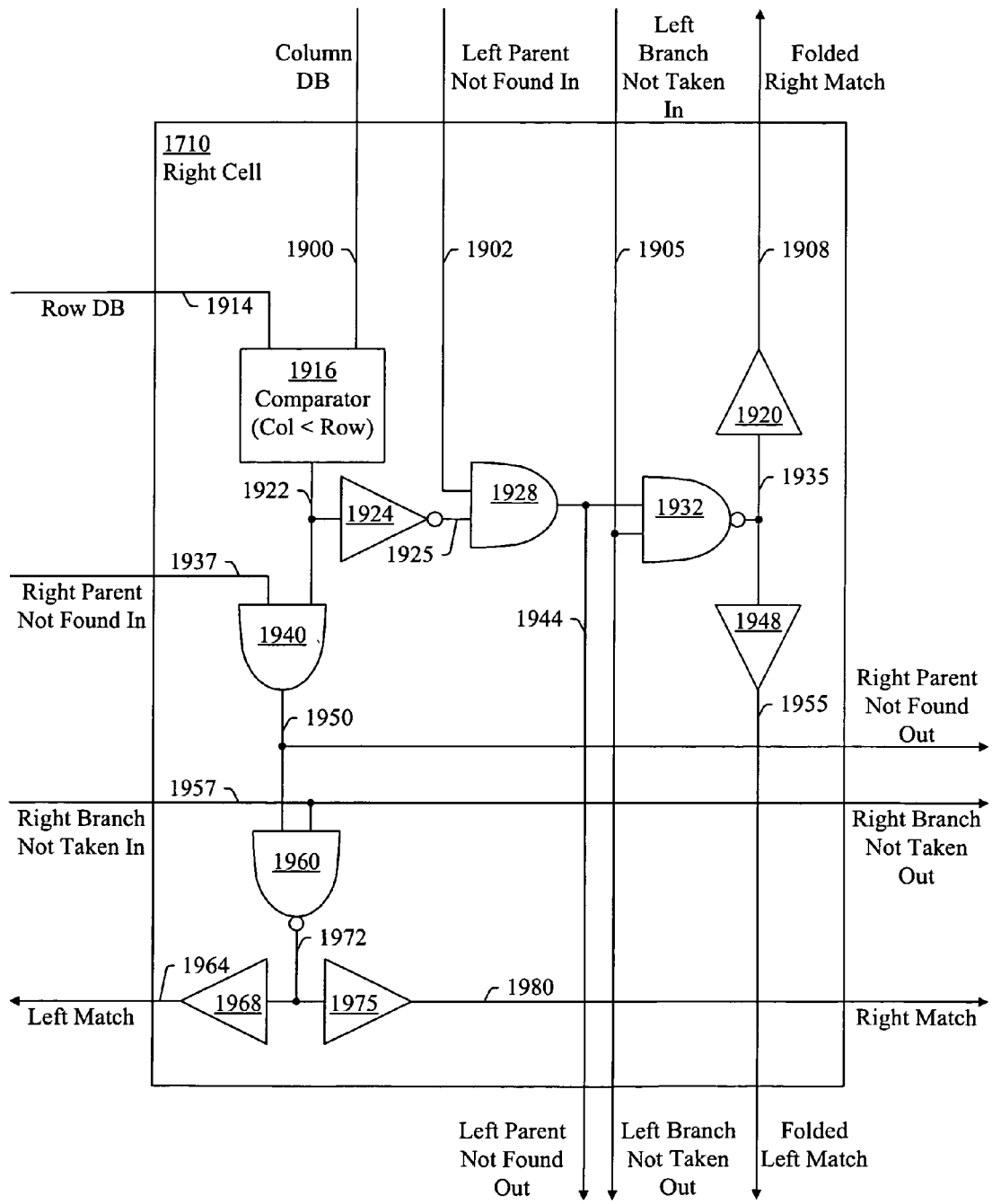
FIG. 19 is a block diagram of a right cell, in accordance with an embodiment of the present invention.

FIG. 19 illustrates the right cell 1710, in accordance with an embodiment of the present invention. The right cell 1710 includes a comparator 1916, an AND circuit 1940, a NAND circuit 1960, a driver circuit 1968, and a driver circuit 1975. Additionally, the right cell 1710 includes an inverter 1924, an AND circuit 1928, a NAND circuit 1932, a driver circuit 1920, and a driver circuit 1948. The AND circuit 1940 is coupled (e.g., connected) to the comparator 1916 and the NAND circuit 1960. The NAND circuit 1960 is coupled (e.g., connected) to the driver circuit 1968 and the driver circuit 1975. The inverter 1924 is coupled (e.g., connected) to comparator 1916 and the AND circuit 1928. Additionally, the NAND circuit 1932 is coupled to the driver circuit 1920 and the driver circuit 1948.

The right cell 1710 in a given row of the matrix of the first stage decoder 240 receives a distinguish bit value (Row DB) 1914 of the distinguishing bit index 310 in the subsequence of distinguishing bit indexes 230 associated with the row. Additionally, the right cell 1710 in a given column of the matrix of the first stage decoder 240 receives a distinguishing bit value (Column DB) 1900 of the distinguishing bit index 310 in the subsequence of distinguishing bit indexes 230 associated with the column.

If the right cell 1710 is adjacent to a node cell 1705 or another right cell 1710 to the left of the right cell 1710 in the row of the matrix of the first stage decoder 240 containing the right cell 1710, the right cell 1710 receives a parent indicator (right parent not found in) 1937 and a branch indicator (right branch not taken in) 1957 from the adjacent node cell 1705. If the adjacent cell is a node cell 1705, the right cell 1710 receives the parent indicator 1815 of the node cell 1705 as the parent indicator 1937 and the branch indicator 1845 of the node cell 1705 as the branch indicator 1957. If the adjacent cell is another right cell 1710, the right cell 1710 receives a parent indicator (left parent not found out) 1950 generated by the adjacent right cell 1710 as the parent indicator 1937. Further, the right cell 1710 receives a branch indicator (right branch not taken out) 1957 of the adjacent right cell 1710 in the row as the branch indicator (right branch not taken in) 1957.

If the right cell 1710 is adjacent to a node cell 1705 or another right cell 1710 above the right cell 1710 in the column of the matrix of the first stage decoder 240 containing the right cell 1710, the right cell 1710 receives a parent indicator (left parent not found in) 1902 and a branch indicator (left branch not taken in) 1905 from the adjacent node cell 1705. If the adjacent cell is a node cell 1705, the right cell 1710 receives the parent indicator 1870 of the node cell 1705 as the parent indicator 1902 and the branch indicator 1840 of the node cell 1705 as the branch indicator 1905. If the adjacent cell is another right cell 1710, the right cell 1710 receives a parent indicator (left parent not found out) 1944 generated by the adjacent right cell 1710 as the parent indicator 1902. Further, the right cell 1710 receives a branch indicator (left branch not taken out) 1905 of the adjacent right cell 1710 as the branch indicator (left branch not taken in) 1905.

The comparator 1916 generates a result 1922 indicating whether the distinguishing bit value 1914 is less than the distinguishing bit value 1900. If the distinguishing bit value 1914 is less than the distinguishing bit value 1900, the result 1922 has a value of one. Otherwise the result 1922 has a value of zero. Thus, the comparator 1916 outputs a value of one if the column distinguishing bit index (Column DB) is less than the row distinguishing bit index (Row DB) and otherwise outputs a zero. The AND circuit 1940 generates the parent indicator 1950 by performing a logical AND operation on the result 1922 and the parent indicator 1937. The parent indicator 1950 indicates whether the right cell 1710 represents a node 410 along a right path from a parent node in the digital search trie represented by the node cell 1705 in the same row of the matrix of the first stage decoder 240 as the right cell 1710.

The NAND circuit 1960 generates a match indicator 1972 by performing a logical NAND operation on the parent indicator 1950 and the branch indicator 1957. The driver circuit 1968 generates a match indicator (left match) 1964 having the value of the match indicator 1972. For example, the driver circuit 1968 may be an open-collector driver. The match indicator 1964 indicates whether a potential leaf 415 connected to the left branch of the node 410 represented by the right cell 1710 is pruned from the digital search trie 400, where the node 410 presented by the right cell 1710 is a node 410 along a right path of a parent node in the digital search trie represented by the node cell 1705 in the same row of the matrix as the right cell 1710. If the match indicator 1964 has a value of zero, the leaf 415 is pruned from the digital search trie 400 and the key 320 associated with the leaf 415 is eliminated as a preliminary candidate key. The right cell 1710 provides the match indicator 1964 to the match line located to the left of the right cell 1710 in the matrix of cells including the right cell 1710.

The driver circuit 1975 generates a match indicator (right match) 1980 having the value of the match indicator 1972. For example, the driver circuit 1975 may be an open-collector driver. The match indicator 1980 indicates whether a potential leaf 415 connected to the right branch of the node 410 represented by the right cell 1710 is pruned from the digital search trie 400, where the node 410 presented by the right cell 1710 is a node 410 along a right path of a parent node in the digital search trie represented by the node cell 1705 in the same row of the matrix as the right cell 1710. The right cell 1710 provides the match indicator 1980 to the match line located to the right of the right cell 1710 in the matrix of cells including the right cell 1710.

The inverter 1924 generates an inverted result 1925 by inverting the result 1922 generated by the comparator 1916. The inverted result 1925 indicates whether the distinguishing bit value 1900 is less than the distinguishing bit value 1914. If he distinguishing bit value 1914 is less than the distinguishing bit value 1900, the inverted result 1925 has a value of one. Otherwise the inverted result 1925 has a value of zero. The AND circuit 1928 generates the parent indicator 1944 by performing a logical AND operation on the inverted result 1925 and the parent indicator 1902. The parent indicator 1944 indicates whether the right cell 1710 represents a node 410 along a left path of a parent node in the digital search trie represented by the node cell 1705 in the same column of the matrix of the first stage decoder 240 as the right cell 1710.

The NAND circuit 1932 generates a match indicator 1935 by performing a logical NAND operation on the parent indicator 1944 and the branch indicator 1905. The driver circuit 1920 generates a match indicator (folded right match) 1908 having the value of the match indicator 1935. For example, the driver circuit 1920 may be an open-collector driver. The match indicator 1908 indicates whether a potential leaf 415 connected the right branch of the node 410 represented by the right cell 1710 is pruned from the digital search trie 400, where the node 410 represented by the right cell 1710 is a along a left path of a parent node in the digital search trie 400 represented by the node cell 1705 in the same column of the matrix as the right cell 1710. If the match indicator 1908 has a value of zero, the leaf 415 is pruned from the digital search trie 400 and the key 320 associated with the leaf 415 is eliminated as a preliminary candidate key. The right cell 1710 provides the match indicator 1908 to the match line located to the above the right cell 1710 in the matrix of cells including the right cell 1710.

The driver circuit 1948 generates a match indicator (folded left match) 1955 having the value of the match indicator 1935. The match indicator 1955 indicates whether a potential leaf 415 connected the left branch of the node 410 represented by the right cell 1710 is pruned from the digital search trie 400, where the node 410 represented by the right cell 1710 is a along a left path of a parent node in the digital search trie 400 represented by the node cell 1705 in the same column of the matrix as the right cell 1710. If the match indicator 1955 has a value of zero, the leaf 415 is pruned from the digital search trie 400 and the key 320 associated with the leaf 415 is eliminated as a preliminary candidate key. The right cell 1710 provides the match indicator 1955 to the match line located below the right cell 1710 in the matrix of cells including the right cell 1710.

Figure 20:
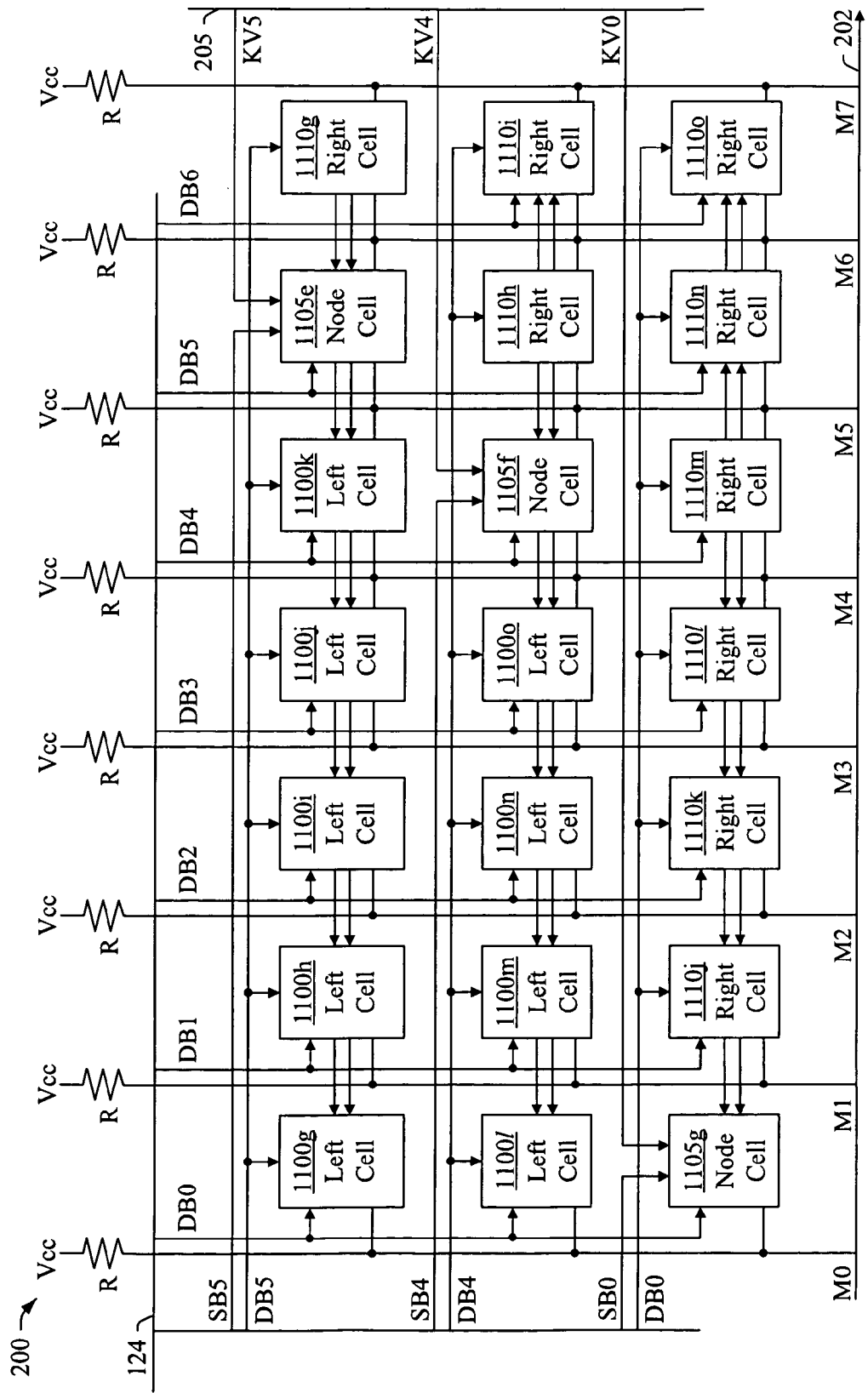
FIG. 20 is a block diagram of a second stage decoder, in accordance with an embodiment of the present invention.

FIG. 20 illustrates the second stage decoder 200, in accordance with an embodiment of the present invention. The second stage decoder 200 includes a matrix of interconnected cells, which includes left cells 1100 (e.g., left cells 1100g-o), nodes cells 1105 (e.g., node cells 1105e-g), and right cells 1110 (e.g., right cells 1110g-o). Each row of the matrix includes a node cell 1105. Each cell in the matrix to the left of a node cell 1105 is a left cell 1100 and represents a potential node 410 along a left path of a parent node in the digital search trie 800 represented by the node cell 1105 in the same row of the matrix as the left cell 1100. Each cell in the matrix to the right of a node cell 1105 is a right cell 1110 and represents a potential node 410 along a right path of a parent node in the digital search trie 800 represented by the node cell 1105 in the same row of the matrix as the right cell 1110.

The second stage decoder 200 generates a match vector 202 based on the sequence of candidate distinguish bit indexes 124, and the sequence of key values 205. In various embodiments, the cells in the matrix of the second stage decoder 200 operate substantially in parallel with each other to determine the match bits M of the match vector 202. In this way, the second stage decoder 200 identifies the sequence of candidate keys indicated by the match vector 202 in substantially constant time (e.g., linear time).

In one embodiment, the matrix includes the same number of rows and columns. In this embodiment, the matrix is a square matrix in which each row and column corresponding to a distinguishing bit index 310 in the sequence of distinguishing bit indexes 120 not identified in the sequence of candidate distinguishing bit indexes 124 is unused (e.g., disabled). In other embodiments, the key match module 122 programs the matrix based on the sequence of candidate distinguishing bit indexes 124 such that the matrix includes the same number of rows as the number of most significant distinguishing bits indexes identified between preliminary candidate keys of adjacent first stage decoders 240 in the sequence of candidate distinguishing bit indexes 124 and the same number of columns as the number of distinguishing bits indexes in the sequence of distinguishing bit indexes 124. For example, the matrix may be a rectangular matrix having fewer rows than columns. In this way, the space complexity of the cells in the matrix of the second stage decoder 200 is reduced.

In one embodiment, the number of keys 320 in the sequence of keys 144 is N, the number of distinguishing bit indexes 310 in the sequence of distinguishing bit indexes 120 is N−1, and the key match module 122 includes k first stage decoders 240. In this embodiment, each first stage decoder 240 has dimensions of (N/K)×(N/K) and the maximum number of distinguishing bit indexes 310 in each subsequence of distinguishing bit indexes 230 generated by the first stage decoder 240 is S, where S is the minimum of W and (N/K) and W is the number of bits in each key 320 of the sequence of keys 144. Further, the dimension of the second stage decoder 200 is (SK)×N. In this way, the number of rows required in the matrix of the second stage decoder 200 is reduced from N to a maximum of SK. In some cases, fewer than SK rows of rows are required in the matrix of the second stage decoder 200. In these cases, one or more of the row in the matrix are unused (e.g., disabled).

The space complexity of the cells among the first stage decoders 240 is K×(N/K)×(N/K) for a non-folded matrix and K/2×(N/K)×(N/K) for a folded matrix. The space complexity of the cells in the second stage decoder 200 is (SK)×N. Moreover, the combined space complexity of the first-stage decoders 240 and the second stage decoder 200 is less than N-squared. The values of N, K, and W may be selected such that the combined space complexity of the cells in the first stage decoders 240 and the cells in the second stage decoder 200 is a near linear complexity. For example, the values of N, K, and W may be selected such that the combined space complexity of the cells in first stage decoders 240 and the second stage decoder 200 is on the order of $N^{3/2}$, which is a substantially linear space complexity.

The second stage decoder 200 of FIG. 20 is an exemplary second stage decoder 200 programmed by the key match module 122 for the database 700 of FIG. 7 representing the digital search trie 800 of FIG. 8. As illustrated in FIG. 20, each left cell 1100 and each right cell 1110 in the matrix receives a distinguishing bit value DB (e.g., distinguishing bit values DB0, DB4 or DB5) of a distinguishing bit index 310 in the sequence of candidate distinguishing bit indexes 124 associated with a row of the matrix and a distinguishing bit value DB (e.g., distinguishing bit values DB0-6) of a distinguishing bit index 310 in the sequence of distinguishing bit indexes 124 associated with a column of the matrix. Each node cell 1105 in the matrix receives a star bit value SB (e.g., star bit values SB0, SB4, or SB5) of the distinguishing bit index 310 in the sequence of candidate distinguishing bit indexes 124 associated with the row of the matrix containing the node cell 1105. The distinguishing bit value DB and the star bit value SB of each distinguishing bit index 310 of the sequence of candidate distinguishing bit indexes 124 represents the value of the distinguishing bit index 310. Additionally, each node cell 1105 in the matrix receives a key value of the sequence of key values 205 associated with the row of the matrix containing the node cell 1105.

As also illustrated in FIG. 20, the second stage decoder 200 generates the match vector 202 which includes eight match bits M (e.g., match bits M0-7). The match bits M correspond to keys 320 in the sequence of keys 144. Each cell in the matrix (e.g. the left cells 1100g-o, the node cells 1105e-g, and the right cells 1110g-o) is connected to a match line associated with a match bit M located to the left of the cell and another match line associated with a match bit M located to the right of the cell. Additionally, each of the match lines associated with a match bit M is connected to a supply voltage Vcc through a pull-up resistor R for establishing a supply voltage (e.g., Vcc) on the match line. The match bits M in the match vector 202 represent a bit vector in which a bit has a value of one if the voltage of the corresponding match line is the supply voltage and a value of zero if the voltage of the corresponding match line is a ground potential. Moreover, each bit in the bit vector having a value of one identifies a secondary candidate key in a sequence of candidate keys indicated by the match vector 202.

In operation, each cell in the matrix may pull down the voltage on the match line to the left of the cell, the match line to the right of the cell, or both. For example, a cell in the matrix may pull down a match line to a ground voltage potential. The voltage on each match line indicates whether a corresponding key 320 in the sequence of keys 144 indicated by the match vector 202 is selected by the second stage decoder 200. If the second stage decoder 200 selects a key 320, the voltage on the match line corresponding to the key 320 is the supply voltage and the match bit M associated with the match line has a value of one. Otherwise, if the second stage decoder 200 does not select a key 320, the voltage on the match line corresponding to the key 320 is a ground potential and the match bit M associated with the match line has a value of zero. If a match bit M has a value of zero, the key 320 in the sequence of keys 144 corresponding to the match bit M is pruned from the digital search trie 400 represented by the sequence of distinguishing bit indexes 120 and the sequence of keys 144. Otherwise, if the match bit M has a value of one (e.g., a supply voltage), the key 320 in the sequence of keys 144 corresponding to the match bit M is selected as a secondary candidate key.

Each node cell 1105 in the matrix represents a node 410 in the digital search trie represented by the sequence of candidate distinguishing bit indexes 124 and the sequence of keys identified by the sequence of key values 205. Additionally, each left cell 1100 in the same row of the matrix as the node cell 1105 represents a node 410 in the digital search trie 400 to the left of the node 410 represented by the node cell 1105. Further, each right cell 1110 in same row of the matrix as the right cell 1110 represents a node 410 in the digital search trie 400 to the right of the node 410 represented by the node cell 1105a. Generally, adjacent cells in each row of the matrix communicate with each other to determine which branch or branches are selected by the node 410 in the digital search trie 400 represented by the node cell 1105 in the row. Further, adjacent cells in each row of the matrix communicate with each other to determine relationships among the nodes 410 in the digital search trie 400 represented by the node cells 1105 in the matrix. For example, adjacent cells in a row of the matrix may determine whether a node 410 represented by the node cell 1105 in the row is a parent node or child node of a node 410 represented by a node cell 1105 in another row of the matrix.

As illustrated in FIG. 20, a first row of the matrix includes the left cells 1100g-k, the node cell 1105e, and the right cell 1110g. In the first row, the left cell 1100g is connected to the left cell 1100h, the left cell 1100h is connected to the left cell 1100i, and the left cell 1100i is connected to the left cell 1100j. Further, the left cell 1100j is connected to the left cell 1100k, the left cell 1100k is connected to the node cell 1105e, and the node cell 1105e is connected to the right cell 1110g. The node cell 1105e in the first row of the matrix receives the star bit value SB5 and the key value KV5. Each of the left cells 1100g-k and the right cell 1110g in the first row of the matrix receives the distinguishing bit value DB5 associated with the first row.

Additionally, the left cell 1100g receives the distinguishing bit value DB0 associated with the first column, the left cell 1100h receives the distinguishing bit value DB1 associated with the second column, and the left cell 1100i receives the distinguishing bit value DB2 associated with the third column. Further, the left cell 1100j receives the distinguishing bit value DB3 associated with the fourth column, the left cell 1100k receives the distinguishing bit value DB4 associated with the fifth column, and the right cell 1110g receives the distinguishing bit value DB6 associated with the seventh column.

Additionally, the left cell 1100g is connected to the match lines associated with the match bits M0 and M1, the left cell 1100h is connected to the match lines associated with the match bits M1 and M2, the left cell 1100i is connected to the match lines associated with the match bits M2 and M3, and the left cell 1100j is connected to the match lines associated with the match bits M3 and M4. Further, the left cell 1100k is connected to the match lines associated with the match bits M4 and M5, the node cell 1105e is connected to the match lines associated with the match bits M5 and M6, and the right cell 1110g is connected to the match lines associated with the match bits M6 and M7.

A second row of the matrix includes the left cells 1100l-o, the node cell 1105f, and the right cells 1110h-i. In the second row, the left cell 1100l is connected to the left cell 1100m, the left cell 1100m is connected to the left cell 1100n, and the left cell 1100n is connected to the left cell 1100o. Further, the left cell 1100o is connected to the node cell 1105f, the node cell 1105f is connected to the right cell 1110h, and the right cell 1110h is connected to the right cell 1110i. The node cell 1105f in the second row of the matrix receives the star bit value SB4 and the key value KV4. Each of the left cells 1100l-o and the right cells 1110h-i in the second row of the matrix receives the distinguishing bit value DB4 associated with the second row.

Additionally, the left cell 1100l receives the distinguishing bit value DB0 associated with the first column, the left cell 1100m receives the distinguishing bit value DB1 associated with the second column, and the left cell 1110n receives the distinguishing bit value DB2 associated with the third column. Further, the left cell 1100o receives the distinguishing bit value DB3 associated with the fourth column, the right cell 1110h receives the distinguishing bit value DB5 associated with the sixth column, and the right cell 1110i receives the distinguishing bit value DB6 associated with the seventh column.

Additionally, the left cell 1100l is connected to the match lines associated with the match bits M0 and M1, the left cell 1100m is connected to the match lines associated with the match bits M1 and M2, the left cell 1100n is connected to the match lines associated with the match bits M2 and M3, and the left cell 1100o is connected to the match lines associated with the match bits M3 and M4. Further, the node cell 1105f is connected to the match lines associated with the match bits M4 and M5, the right cell 1110h is connected to the match lines associated with the match bits M5 and M6, and the right cell 1110i is connected to the match lines associated with the match bits M6 and M7.

A third row of the matrix includes the node cell 1105g and the right cells 1110j-o. In the third row, the node cell 1105g is connected to the right cell 1110j, the right cell 1110j is connected to the right cell 1110k, and the right cell 1110k is connected to the right cell 1110l. Further, the right cell 1110l is connected to the right cell 1110m, the right cell 1110m is connected to the right cell 1110n, and the right cell 1110n is connected to the right cell 1110o. The node cell 1105g in the third row of the matrix receives the star bit value SB0 and the key value KV0. Each of the right cells 1110j-o in the third row of the matrix receives the distinguishing bit value DB0 associated with the third row.

Additionally, the right cell 1110j receives the distinguishing bit value DB1 associated with the second column, the right cell 1110k receives the distinguishing bit value DB2 associated with the third column, and the right cell 1110l receives the distinguishing bit value DB3 associated with the fourth column. Further, the right cell 1110m receives the distinguishing bit value DB4 associated with the fifth column, the right cell 1110n receives the distinguishing bit value DB5 associated with the sixth column, and the right cell 1110o receives the distinguishing bit value DB6 associated with the seventh column.

Additionally, the node cell 1105g is connected to the match lines associated with the match bits M0 and M1, the right cell 1110j is connected to the match lines associated with the match bits M1 and M2, the right cell 1110k is connected to the match lines associated with the match bits M2 and M3, and the right cell 1110l is connected to the match lines associated with the match bits M3 and M4. Further, the right cell 1110m is connected to the match lines associated with the match bits M4 and M5, the right cell 1110n is connected to the match lines associated with the match bits M5 and M6, and the right cell 1110o is connected to the match lines associated with the match bits M6 and M7.

In various embodiments, the second stage decoder 200 programs the matrix in the second stage decoder 200 such that the leftmost columns correspond to the sequence of candidate distinguishing bit indexes 124. For example, the second stage decoder 200 may program the matrix such that the first three columns of the matrix correspond to the distinguishing bit indexes having distinguishing bit values DB0, DB4, and DB5 and the match bits M0, M1, M2 and M3 correspond to the keys 320a, 320e, 320f, and 320g. Further, the key index translator 204 translates the match bits M0, M1, M2, and M3 in the match vector 202 to corresponding match bits M0, M4, M5, and M6 in the match vector 125 such that the match bits M0, M4, M5, and M6 in the match vector 125 correspond to the key values 320a, 320e, 320f, and 320g in the sequence of key values 250 (e.g., the original sequence of key values). In these embodiments, the second stage decoder 200 disables the cells in the rightmost columns of the matrix in the second stage decoder 200 (e.g., the fourth through seventh columns).

Figure 21:
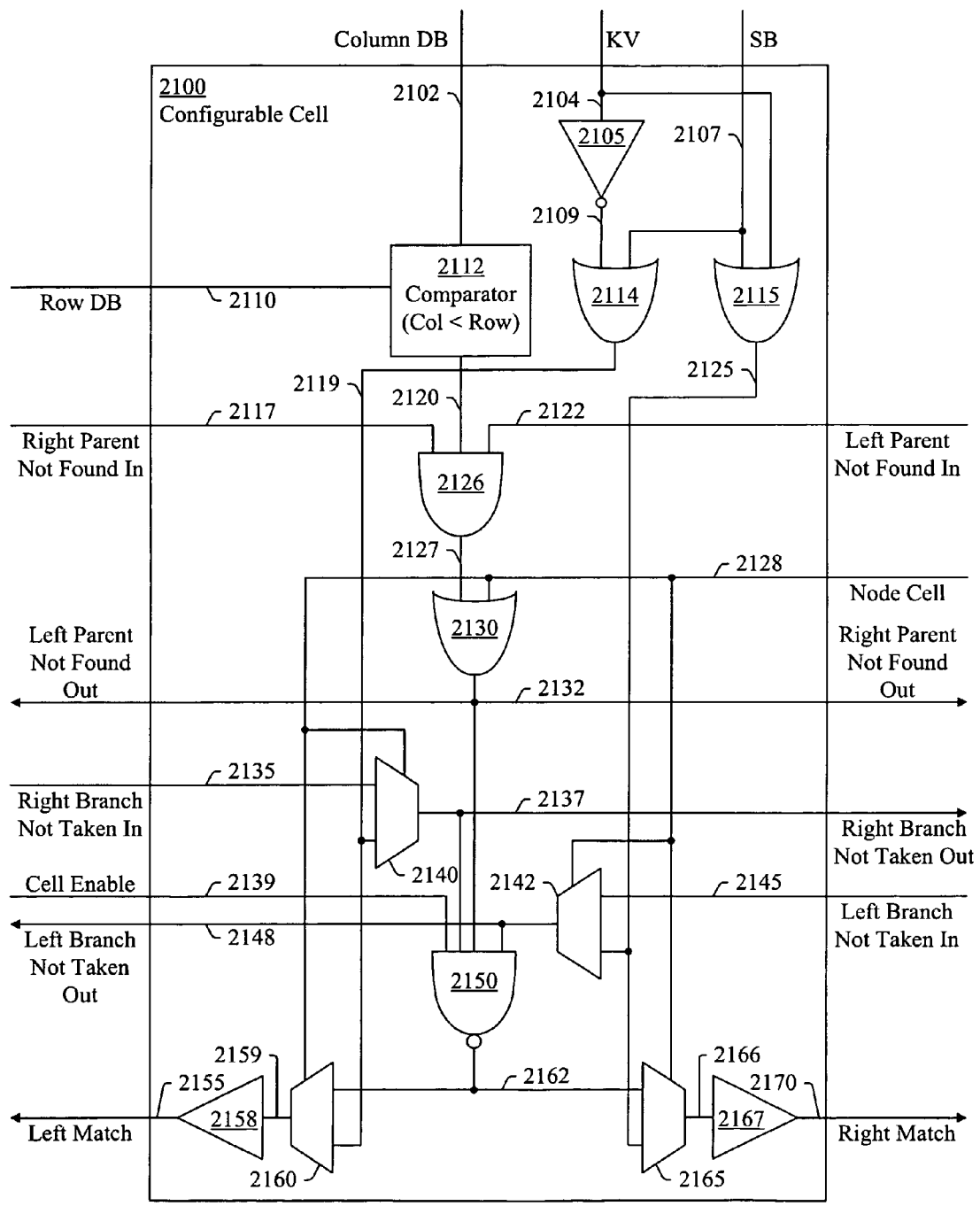
FIG. 21 is a block diagram of a configurable cell, in accordance with an embodiment of the present invention.

FIG. 21 illustrates a configurable cell 2100, in accordance with an embodiment of the present invention. In some embodiments, the second stage decoder 200 includes one or more configurable cells 2100, each of which is configured as a left cell 1100, a node cell 1105, or a right cell 1110. In these embodiments, the key match module 122 programs each configurable cell 2100 in the matrix of the second stage decoder 200 based on the sequence of candidate distinguishing bit indexes 124, as is described more fully herein. Further, the key match module 122 programs the connections from the sequence of candidate distinguishing bit indexes 124 and the sequence of key values 205 to the configurable cells 2100. In this way, the second stage decoder 200 may have dimensions of less than N×N. For example, the second stage decoder 200 may have dimensions of (SK)×N or dimensions of (K−1)×N, as is described more fully herein.

In one embodiment, the configurable cell 2100 includes an inverter 2105, a comparator 2112, an OR circuit 2114, an OR circuit 2115, an AND circuit 2126, an OR circuit 2130, a selector 2140, a NAND circuit 2150, a selector 2142, a driver circuit 2158, a selector 2160, a selector 2165, and a driver circuit 2167. The OR circuit 2114 is coupled to the inverter 2105, the selector 2140, and the selector 2160. The OR circuit 2115 is coupled to the selector 2142 and the selector 2165. The AND circuit 2126 is coupled to the comparator 2112 and the OR circuit 2130. The NAND circuit 2150 is coupled to the AND circuit 2126, the selector 2140, the selector 2142, the selector 2160, and the selector 2165. Further, the driver circuit 2158 is coupled to the selector 2160, and the driver circuit 2167 is coupled to the selector 2165.

Additionally, the configurable cell 2100 includes inputs and outputs, some of which may be tied to a supply voltage (e.g., Vcc) or a ground potential based on the configuration of the configurable cell 2100. Further, some of the inputs or outputs of the configurable cell 2100 may not be connected to an external source or destination depending based on the configuration of the configurable cell 2100. For example, an input of the configurable cell 2100 may be floating in some embodiments (e.g., not tied to a supply voltage or a ground potential).

The inputs to the configurable cell 2100 include a distinguishing bit value (Column DB) 2102, the star bit value (SB) 2107, a distinguishing bit value (Row DB) 2110, a parent indicator (Right Parent Not Found In) 2117, a parent indicator (Left Parent Not Found In) 2122, a node cell indicator (Node Cell) 2128, a branch indicator (Right Branch Not Taken In) 2135, a cell enable 2139, and a branch indicator (Left Branch Not Taken In) 2145. The outputs of the configurable cells 2100 include a parent indicator 2132 (Left Parent Not Found Out/Right Parent Not Found Out), a branch indicator (Right Branch Not Taken Out) 2137, a branch indicator (Left Branch Not Taken Out) 2148, a match indicator (Left Match) 2155, and a match indicator (Right Match) 2170.

The node cell indicator 2128 indicates whether the configurable cell 2100 is configured as a node cell 1105. If the node cell indicator 2128 has a value of one, the configurable cell 2100 is configured as a node cell 1105. Otherwise the configurable cell 2100 is not configured as a node cell 1105. The cell enable 2139 indicates whether the configurable cell 2100 is enabled. If the cell enable 2139 has a value of one, the configurable cell 2100 is enabled. Otherwise the configurable cell 2100 is disabled.

The inverter 2105 generates an inverted key value 2109 by inverting a key value 2104. The OR circuit 2114 generates a branch indicator 2119 by performing a logical OR operation on the star bit value 2107 and the inverted key value 2109. The selector 2140 passes the branch indicator 2119 as the branch indicator 2137 if the node cell indicator 2128 has a value of one. The branch indicator 2137 indicates whether a right branch of the node 410 represented by the configurable cell 2100 in the digital search trie 400 represented by the sequence of distinguishing bit indexes 120 and the sequence of keys 144 is selected or pruned in a search operation. If the branch indicator 2137 has a value of one, the right branch of the node 410 represented by the configurable cell 2100 is selected in a search operation. Otherwise, if the branch indicator 2137 has a value of zero, the right branch of the node 410 represented by the configurable cell 2100 is pruned in the search operation.

Additionally, the selector 2160 passes the branch indicator 2119 as a match indicator 2159 if the node cell indicator 2128 has a value of one. The driver circuit 2158 generates the match indicator 2155 having the value of the match indicator 2159. For example, the driver circuit 2158 may be an open-collector driver. The match indicator 2155 indicates whether a leaf 415 connected to the left branch of the node 410 represented by the configurable cell 2100, if any, is pruned from the digital search trie. If the match indicator 2155 has a value of zero, the leaf 415 is pruned from the digital search trie 400 and the key 320 associated with the leaf 415 is eliminated as a preliminary candidate key. The configurable cell 2100 provides the match indicator 2155 to the match line located to the left of the configurable cell 2100 in the matrix of the second stage decoder 200. Moreover, if the match line has a value of one as a result of the search operation, the key 320 identified by the match bit M associated with the match line is a secondary candidate key identified by the second stage decoder 200.

The OR circuit 2115 generates a branch indicator 2125 by performing a logical OR operation on the star bit value 2107 and the key value 2104. The selector 2142 passes the branch indicator 2125 as the branch indicator 2148 if the node cell indicator 2128 has a value of one. The branch indicator 2148 indicates whether a left branch of the node 410 represented by the configurable cell 2100 in the digital search trie 400 represented by the sequence of distinguishing bit indexes 120 and the sequence of keys 144 is selected or pruned in a search operation. If the branch indicator 2148 has a value of one, the left branch of the node 410 represented by the configurable cell 2100 is selected in a search operation. Otherwise, if the branch indicator 2148 has a value of zero, the left branch of the node 410 represented by the configurable cell 2100 is pruned in the search operation.

Additionally, the selector 2165 passes the branch indicator 2125 as a match indicator 2166 if the node cell indicator 2128 has a value of one. The driver circuit 2167 generates the match indicator 2170 having the value of the match indicator 2166. For example, the driver circuit 2167 may be an open-collector driver. The match indicator 2170 indicates whether a right leaf 415 connected to the right branch of the node 410 represented by the configurable cell 2100, if any, is pruned from the digital search trie 400. If the match indicator 2170 has a value of zero, the leaf 415 is pruned from the digital search trie 400 and the key 320 associated with the leaf 415 is eliminated as a secondary candidate key. The configurable cell 2100 provides the match indicator 2170 to the match line located to the right of the configurable cell 2100 in the matrix of the second stage decoder 200. Moreover, if the match line has a value of one as a result of the search operation, the key 320 identified by the match bit M associated with the match line is a secondary candidate key identified by the second stage decoder 200.

The comparator 2112 generates the result 2120 by comparing the distinguishing bit value 2110 with the distinguishing bit value 2102. The result 2120 indicates whether the distinguishing bit value 2110 is less than the distinguishing bit value 2102. If the distinguishing bit value 2110 is less than the distinguishing bit value 2102, the result 2120 has a value of one. Otherwise the result 2120 has a value of zero. Thus, the comparator 2112 outputs a value of one if the column distinguishing bit index (Column DB) is less than the row distinguishing bit index (Row DB) and otherwise outputs a zero. The AND circuit 2126 generates the parent indicator 2127 by performing a logical OR operation on the result 2120, the parent indicator 2117, and the parent indictor 2122. The OR circuit 2130 generates the parent indicator 2132 by performing a logical OR operation on the parent indicator 2127 and the node cell indicator 2128. If the node cell indicator 2128 has a value of one, the OR circuit 2130 generates the parent indicator 2132 having a value of one. Otherwise, the OR circuit 2130 passes the parent indicator 2127 as the parent indicator 2132.

The NAND circuit 2150 generates a match indicator 2162 by performing a logical NAND operation on the cell enable 2139, the branch indicator 2137, the parent indicator 2132, and the branch indicator 2148. If the node cell indicator 2128 has a value of zero, the selector 2140 passes the branch indicator 2135 as the branch indicator 2137, and the selector 2142 passes the branch indicator 2145 as the branch indicator 2148. Additionally, if the node cell indicator 2128 has a value of zero, the selector 2160 passes the match indicator 2162 as the match indicator 2159, and the selector 2165 passes the match indicator 2162 as the match indicator 2170.

Figure 22:
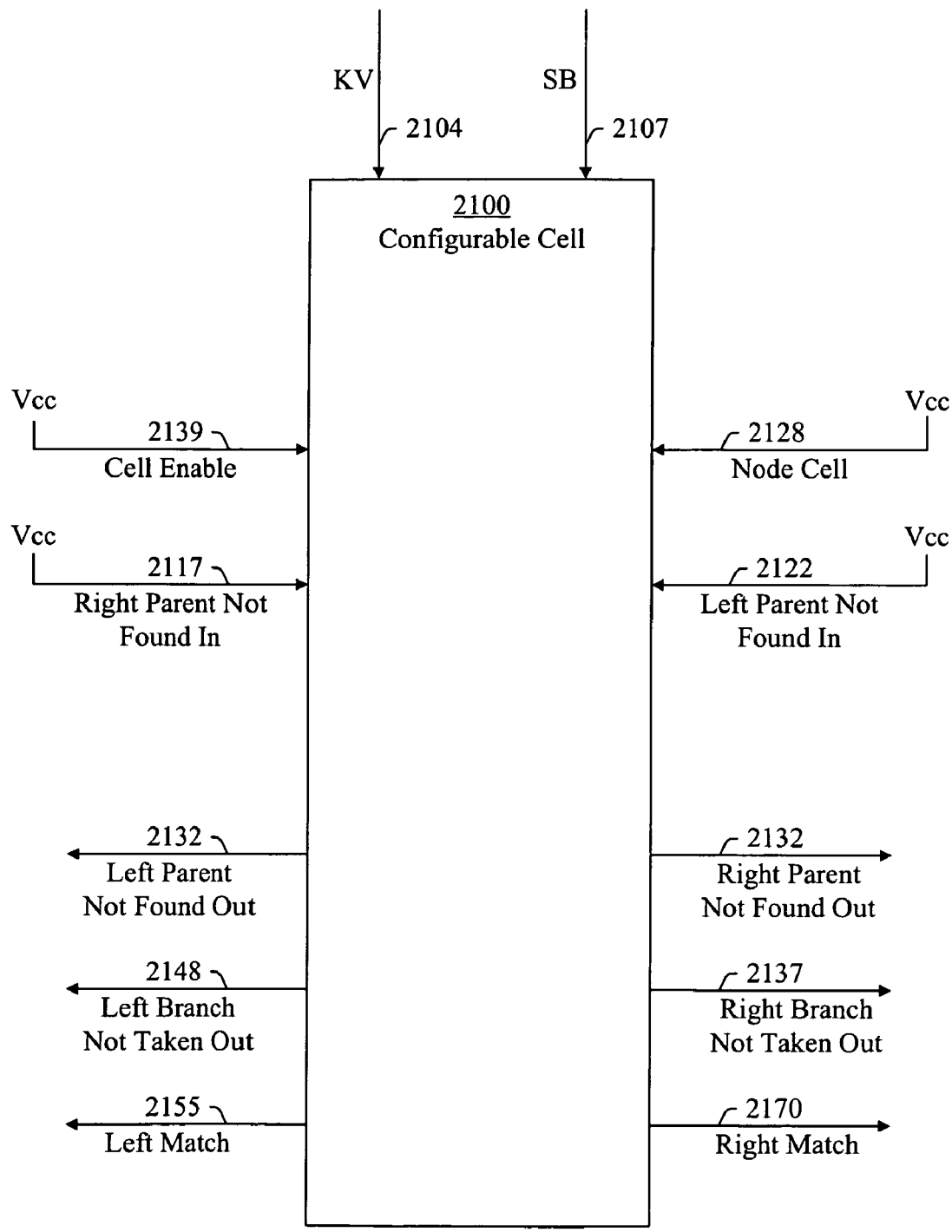
FIG. 22 is a block diagram of a configurable cell configured as a node cell, in accordance with an embodiment of the present invention.

FIG. 22 illustrates the configurable cell 2100 configured as a node cell 1105, in accordance with an embodiment of the present invention. As illustrated in FIG. 22, each of the cell enable 2139, the parent indicator 2117, the node cell indicator 2128, and the parent indicator 2122 is connected to a supply voltage (e.g., Vcc). The configurable cell 2100 receives the key value 2104 and the star bit value 2107, and outputs the match indicator 2155 and the match indicator 2170. Further, the configurable cell 2100 may output the parent indicator 2132 and the branch indicator 2148 to a cell adjacent to and to the left of the configurable cell 2100 in the same row of the matrix in the second stage decoder 200. Additionally, the configurable cell 2100 may output the parent indicator 2132 and the branch indicator 2137 to a cell adjacent to and to the right of the configurable cell 2100 in the same row of the matrix in the second stage decoder 200.

Figure 23:
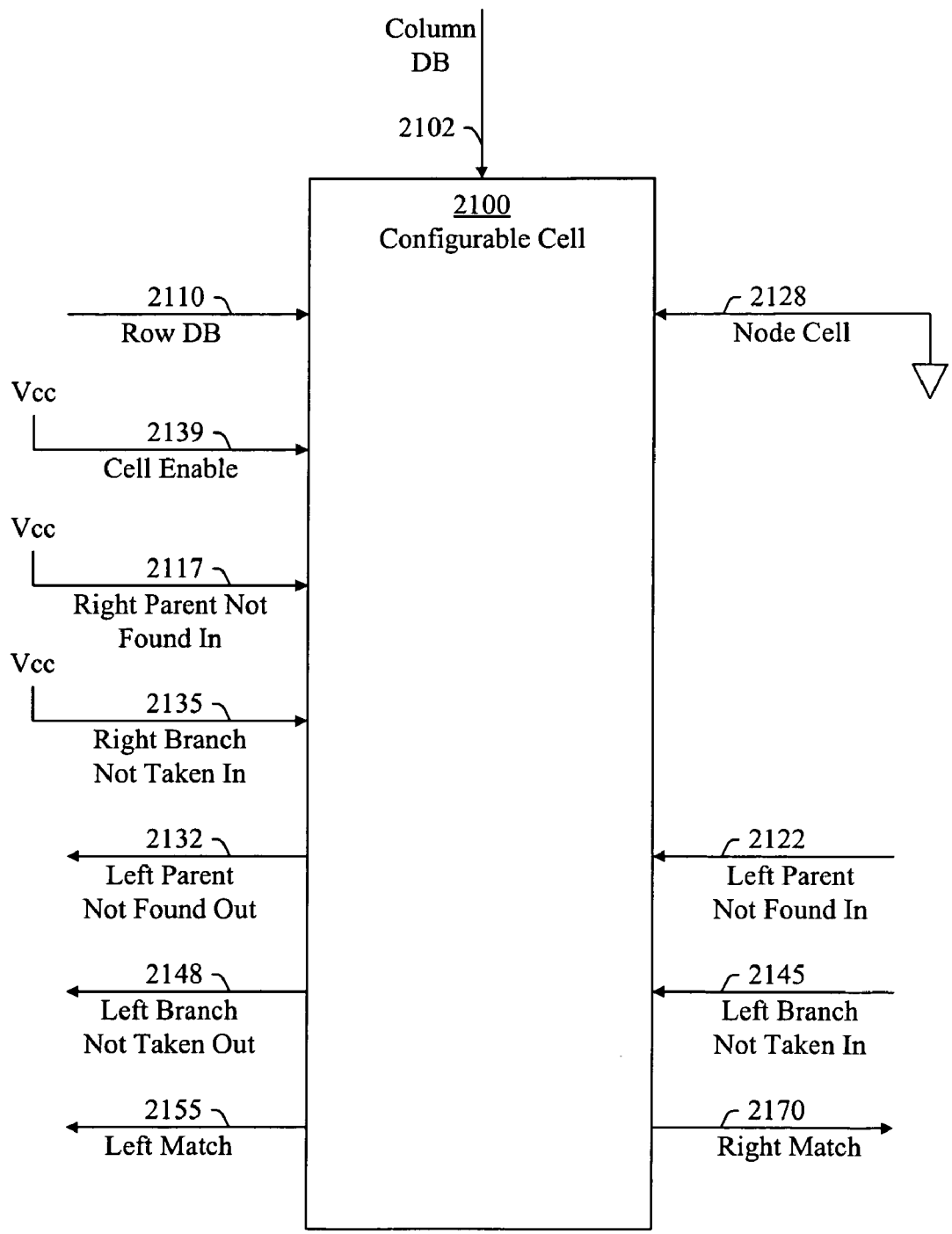
FIG. 23 is a block diagram of a configurable cell configured as a left cell, in accordance with an embodiment of the present invention.

FIG. 23 illustrates the configurable cell 2100 configured as a left cell 1100, in accordance with an embodiment of the present invention. As illustrated in FIG. 23, each of the cell enable 2139, the parent indicator 2117, and the branch indicator 2135 is connected to a supply voltage (e.g., Vcc) and the node cell indicator 2128 is connected to a ground potential. The configurable cell 2100 receives the distinguishing bit value 2110 and the distinguishing bit value 2102, and outputs the match indicator 2155 and the match indicator 2170. Further, the configurable cell 2100 may output the parent indicator 2132 and the branch indicator 2148 to a cell adjacent to and to the left of the configurable cell 2100 in the same row of the matrix in the second stage decoder 200. Additionally, the configurable cell 2100 may receive the parent indicator 2122 and the branch indicator 2145 from a cell adjacent to and to the right of the configurable cell 2100 in the same row of the matrix in the second stage decoder 200.

Figure 24:
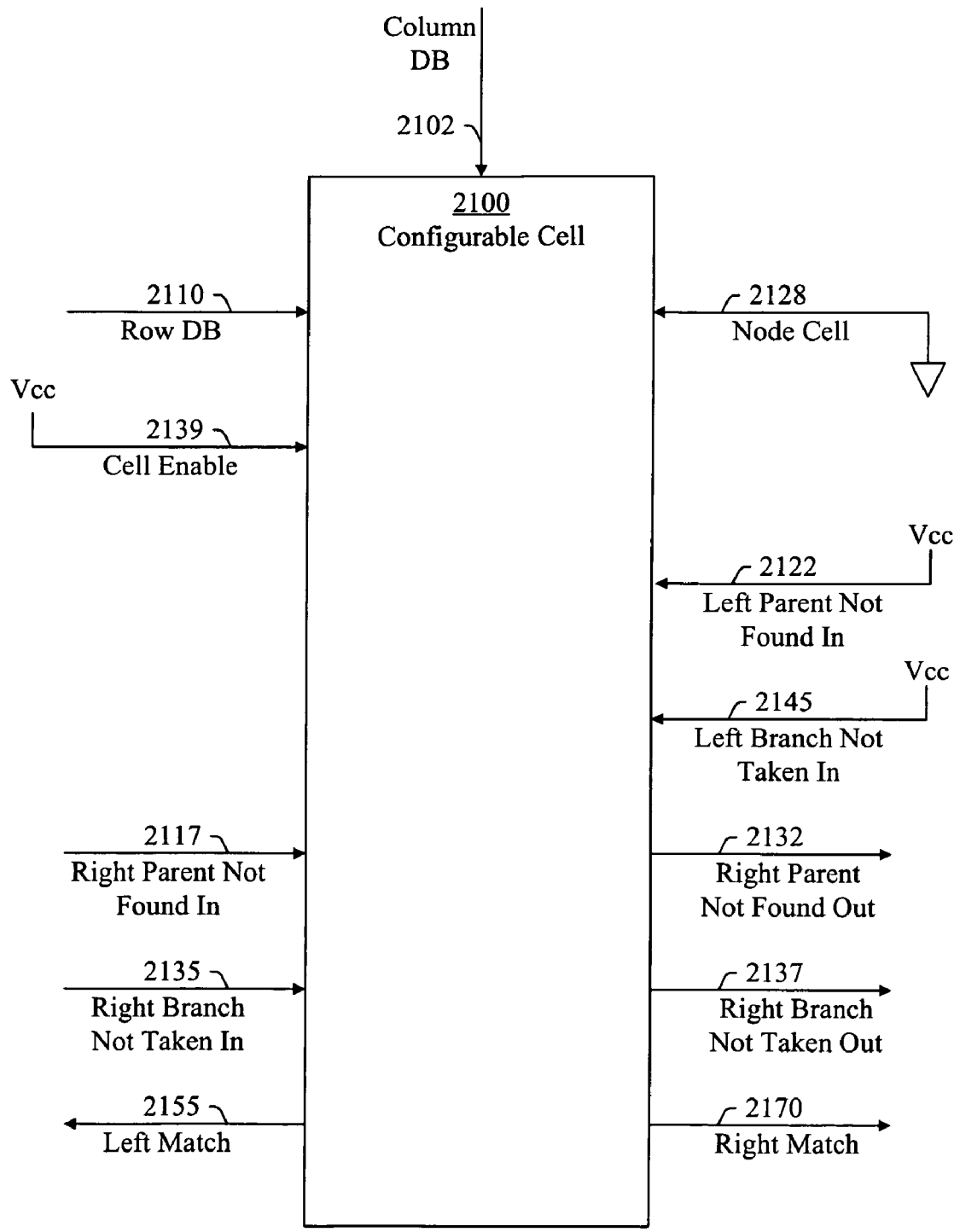
FIG. 24 is a block diagram of a configurable cell configured as a right cell, in accordance with an embodiment of the present invention.

FIG. 24 the configurable cell 2100 configured as a right cell 1110, in accordance with an embodiment of the present invention. As illustrated in FIG. 24, each of the cell enable 2139, the parent indicator 2122, and the branch indicator 2145 is connected to a supply voltage (e.g., Vcc) and the node cell indicator 2128 is connected to a ground potential. The configurable cell 2100 receives the distinguishing bit value 2110 and the distinguishing bit value 2102, and outputs the match indicator 2155 and the match indicator 2170. Further, the configurable cell 2100 may receive the parent indicator 2117 and the branch indicator 2135 from a cell adjacent to and to the left of the configurable cell 2100 in the same row of the matrix in the second stage decoder 200. Additionally, the configurable cell 2100 may output the parent indicator 2132 and the branch indicator 2137 to a cell adjacent to and to the right of the configurable cell 2100 in the same row of the matrix in the second stage decoder 200.

FIG. 25 illustrates a database 2500, in accordance with an embodiment of the present invention. The database 2500 includes a sequence of distinguishing bit indexes 2505 and a sequence of keys 2515. Moreover, the sequence of distinguishing bit indexes 2505 is an exemplary sequence of candidate distinguishing bit indexes 124 and the sequence of keys 2515 is an exemplary sequence of preliminary candidate keys identified by the first stage decoders 240. In this embodiment, the distinguishing bit selection module 220 does not select distinguishing bit indexes 310 within each subsequence of distinguishing bit indexes 230 generated by the first stage decoders 240 but does select the most significant distinguishing bit index between each rightmost preliminary candidate key identified by a match vector 235 and the leftmost preliminary candidate key identified by the subsequent adjacent match vector 235. In this way, the distinguishing bit selection module 220 avoids selecting any distinguishing bit index 310 within each subsequence of distinguishing bit indexes 230 that has a wildcard bit.

As illustrated in FIG. 25, the sequence of distinguishing bit indexes 2505 includes the distinguishing bit index 310a and the distinguishing bit index 310f. The distinguishing bit index 310a is the most significant distinguishing bit index between the key 320a in the partition 500a and the key 320f in the partition 500b. The distinguishing bit index 310f is the most significant distinguishing bit index between the key 320f in the partition 500b and the key 320g in the partition 500c.

In various embodiments, the sequence of distinguishing bit indexes 120 and the sequence of keys 144 are partitioned into K partitions and the distinguishing bit selections module 220 identifies K−1 distinguishing bit indexes 310 from the subsequences of distinguishing bits indexes 230. Moreover, the matrix of the second stage decoder 200 has dimensions of (K−1)×N. In this way, the number of rows in the matrix of the second stage decoder 200 is further reduced from SK to K−1 and the space complexity of the cells in the second stage decoder 200 is (K−1)×N. As is described more fully herein, the space complexity of the cells among the first stage decoders 240 in various embodiments is K×(N/K)×(N/K) or K/2× (N/K)×(N/K). As a result, the combined space complexity of the first stage decoders 240 and the second stage decoder 200 is less than N-squared. Moreover, the values of N and K may be selected such that the combined space complexity of the cells in the first stage decoders 240 and the cells in the second stage decoder 200 is a near linear complexity. For example, the values of N and K may be selected such that the combined space complexity of the cells in the first stage decoders 240 and the second stage decoder 200 is on the order of $N^{3/2}$.

Figure 26:
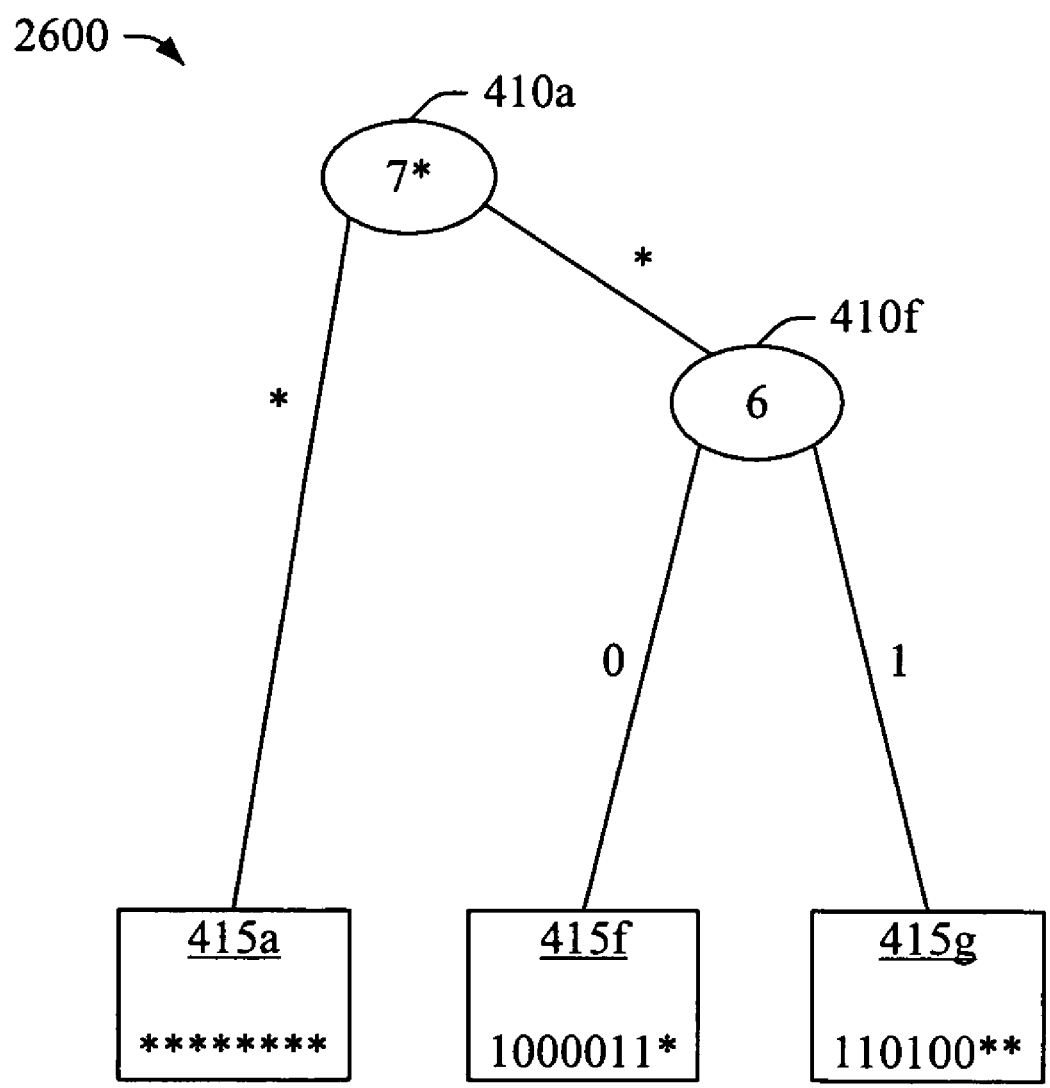
FIG. 26 is a block diagram of a digital search trie, in accordance with an embodiment of the present invention.

FIG. 26 illustrates a digital search trie 2600, in accordance with an embodiment of the present invention. As may be envisioned from FIG. 25 and FIG. 26, the sequence of distinguishing bit indexes 2505 and the sequence of keys 2515 together represent the digital search trie 2600. Moreover, the digital search trie 2600 is a Patricia tree. In the digital search trie 2600, the node 410a represents the distinguishing bit index 310a and the node 410f represents the distinguishing bit index 320f. Additionally, the leaf 415a represents the key 320a, the leaf 415f represents the key 320f, and the leaf 415g represents the key 320g.

Figure 27:
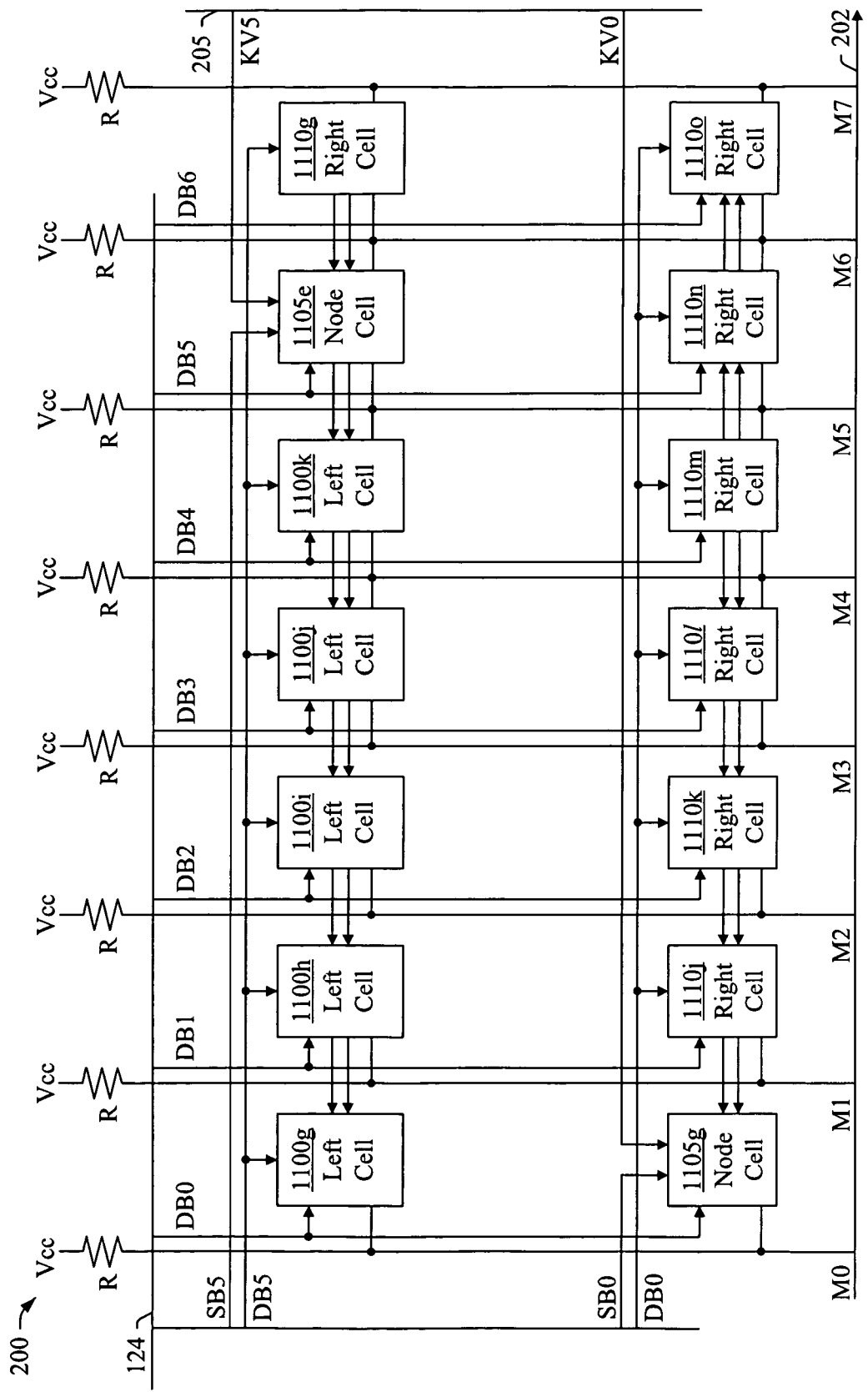
FIG. 27 is a block diagram of a second stage decoder, in accordance with an embodiment of the present invention.

FIG. 27 illustrates the second stage decoder 200, in accordance with an embodiment of the present invention. The second stage decoder 200 of FIG. 20 is an exemplary second stage decoder 200 programmed by the key match module 122 for the database 2500 of FIG. 25 representing the digital search trie 2600 of FIG. 26. The second stage decoder 200 of FIG. 27 is similar to the second stage decoder 200 of FIG. 20 but does not include the second row of cells in the second stage decoder 200 of FIG. 20, which is associated with the distinguishing bit index 310e between the key 320e and the key 320f in the partition 500b. Moreover, the number of rows in the matrix of the second stage decoder 200 illustrated in FIG. 27 is K−1, where K is the number of first stage decoders 240 in the key match module 122.

In various embodiments, the second stage decoder 200 programs the matrix in the second stage decoder 200 such that the leftmost columns correspond to the sequence of candidate distinguishing bit indexes 124. For example, the second stage decoder 200 may program the matrix such that the first two columns of the matrix correspond to the distinguishing bit indexes having distinguishing bit values DB0 and DB5 and the match bits M0, M1, and M2 correspond to the keys 320a, 320f, and 320g. Further, the key index translator 204 translates the match bits M0, M1, and M2 in the match vector 202 to corresponding match bits M0, M5, and M6 in the match vector 125 such that the match bits M0, M5, and M6 in the match vector 125 correspond to the key values 320a, 320f, and 320g in the sequence of key values 250 (e.g., the original sequence of key values). In these embodiments, the second stage decoder 200 disables the cells in the rightmost columns of the matrix in the second stage decoder 200 (e.g., the third through seventh columns).

Figure 28:
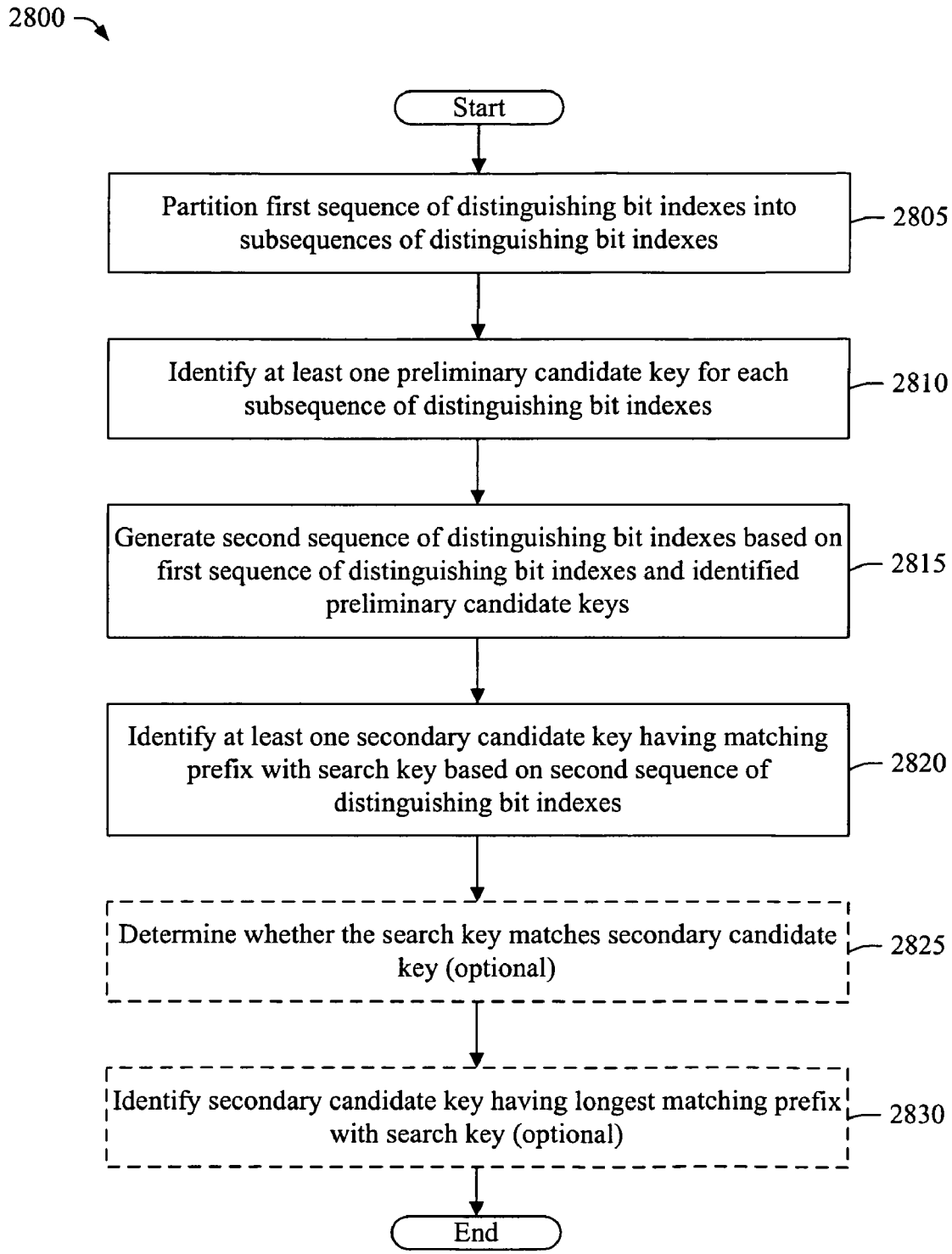
FIG. 28 is a flow chart for a method of searching a database, in accordance with an embodiment of the present invention.

FIG. 28 illustrates a method 2800 of searching a database, in accordance with an embodiment of the present invention. In step 2805, a first sequence of distinguishing bit indexes is partitioned into subsequences of distinguishing bit indexes. In some embodiments, the key bit extractor 255 partitions the sequence of distinguishing bit indexes 120 (e.g., the first sequence of distinguishing bit indexes) among k first stage decoders 240, for example by dividing the sequence of distinguishing bit indexes 120 into k partitions 500 each having a subsequence of distinguishing bit indexes 230. In other embodiments, the sequence of distinguishing bit indexes 120 is partitioned among k first stage decoders 240 in a fixed arrangement. For example, the relationship of each subsequence of distinguishing bit indexes 230 to the sequence of distinguishing bit indexes 120 may be fixed. The method 2800 then proceeds to step 2810.

In step 2810, at least one preliminary candidate key is identified for each subsequence of distinguishing bit indexes. In one embodiment, each of the first stage decoders 240 identifies at least one preliminary candidate key and generates a corresponding match vector 235 indicating each identified preliminary candidate key. The method 2800 then proceeds to step 2815.

In step 2815, a second sequence of distinguishing bit indexes is generated based on the first sequence of distinguishing bit indexes and the identified preliminary candidate keys. In one embodiment, the distinguishing bit selection module 220 generates the sequence of candidate distinguishing bit indexes 124 (e.g., the second sequence of distinguishing bit indexes) based on the match vectors 235 and the subsequences of distinguishing bit indexes 230. The method 2800 then proceeds to step 2820.

In step 2820, at least one secondary candidate key having a matching prefix with a search key is identified based on the second sequence of distinguishing bit indexes. In one embodiment, the key bit extractor 215 generates a sequence of key values 205 based on the search key 117 and the sequence of candidate distinguishing bit indexes 124, and the second stage decoder 200 identifies at least one secondary candidate key based on the sequence of candidate distinguishing bit indexes 124 and the sequence of key values 205. Further, the second stage decoder 200 generates the match vector 202 indicating a sequence of candidate key indexes including each candidate key identified by the second stage decoder 200. In turn, the key index translator 204 generates the match vector 125 based on the match vector 202 and the sequence of key indexes 210 such that the match bits in the match vector 125 represent key values in the sequence of key values 250 (e.g., the original sequence of key values).

In optional step 2825, a determination is made as to whether the search key matches a secondary candidate key. In one embodiment, the priority encoder 128 generates a key match index 136 based on the match vector 125 and the key memory 142 outputs the selected candidate key 146 identified by the key match index 136. Further, the longest candidate prefix module 150 generates a key match indicator 154 based on the search key 117 and the selected candidate key 146 indicating whether the search key 117 matches the selected candidate key 146. The method 2800 then proceeds to optional step 2830.

In optional step 2830, a secondary candidate key having a longest matching prefix with the search key is identified. In one embodiment, the longest candidate prefix module 150 generates a most significant distinguishing bit index 160 identifying a most significant distinguishing bit index between the search key 117 and the selected candidate key 146. Further, the longest prefix match module 164 generates the longest prefix match indicator 167 based on the sequence of candidate distinguishing bit indexes 124 and the most significant distinguishing bit index 160. The longest prefix match indicator 167 indicates whether any secondary candidate key identified by the sequence of candidate distinguishing bit indexes 124 has a matching prefix with the search key 117. Additionally, the longest prefix match module 164 generates the longest prefix match index 170. If a secondary candidate key identified by the sequence of candidate distinguishing bit indexes 124 has a matching prefix with the search key 117, the longest prefix match index 170 identifies the secondary candidate key having the longest matching prefix with the search key 117. For example, the longest prefix match index 170 may be the distinguishing bit index 310 in the sequence of candidate distinguishing bit indexes 124 identifying the secondary candidate key having the longest matching prefix with the search key 117. The method 2800 then ends.

In various embodiments, the method 2800 may include more or fewer than the steps 2805-2830 described above and illustrated in FIG. 28. In some embodiments, one or more of the steps 2805-2830 may be performed in a different order than that described above and illustrated in FIG. 28 or may be performed in parallel with each other. For example, one or more of the steps 2805-2830 may be performed substantially simultaneously with each other.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A machine comprising a search engine for searching a database comprising a first sequence of distinguishing bit indexes and a sequence of keys together representing a first digital search tile, the search engine comprising:
   a plurality of first stage decoders configured to generate a first sequence of key indexes based on the first sequence of distinguishing bit indexes and a search key, each key index of first sequence of key indexes identifying a preliminary candidate key in the sequence of keys;
   a distinguishing bit selection module coupled to the plurality of first stage decoders and configured to generate a second sequence of distinguishing bit indexes based on the first sequences of distinguishing bit indexes and the first sequence of key indexes, the second sequence of distinguishing bit indexes and the sequence of preliminary candidate keys together representing a second digital search trie;

a second stage decoder coupled to the distinguishing bit selection module and configured to generate a second sequence of key indexes based on the search key and the second sequence of distinguishing bit indexes, each key index in the second sequence of key indexes indentifying a secondary candidate key in the sequence of keys having a matching prefix with the search key, wherein each first stage decoder of the plurality of first stage decoders comprises a matrix of interconnected cells configured to generate a subsequence of key indexes in the first sequence of key indexes, and the second stage decoder comprises a matrix of interconnected cells configured to generate the second sequence of key indexes;

a priority encoder coupled to the second stage decoder and configured to select the last key index in the second sequence of key indexes;

a key memory coupled to the priority encoder and configured to store the sequence of keys, the key memory further configured to select a candidate key in the sequence of keys based on the selected key index; a longest candidate prefix module coupled to the key memory and configured to identify a most significant distinguishing bit index between the search key and the selected candidate key; and a longest prefix match module coupled to the longest candidate prefix module and configured to identify a longest matching prefix key in the at least one secondary candidate key based on the most significant distinguishing bit index, the longest matching prefix key being the secondary candidate key of the at least one secondary candidate key having a longest matching prefix with the search key.

2. The machine of claim 1, wherein the longest candidate prefix module is further configured to generate a pseudo key based on the search key and the selected candidate key and to identify a predecessor key or successor key in the sequence of keys based on the pseudo key, the pseudo key comprising the longest matching prefix between the search key and the selected candidate key following by a sequence of bits each having a value of the most significant distinguishing bit, and the search engine further comprises a key insertion module configured to insert the search key into the database based on the predecessor key or the successor key.

3. A machine comprising a search engine for searching a database comprising a first sequence of distinguishing bit indexes and a sequence of keys together representing a first digital search tile, the search engine comprising:

a plurality of first stage decoders, each first stage decoder configured to identify at least one preliminary candidate key in the database based on a search key and a subsequence of distinguishing bit indexes corresponding to the first stage decoder in the first sequence of distinguishing bit indexes;

a distinguishing bit selection module coupled to the plurality of first stage decoders and configured to generate a second sequence of distinguishing bit indexes based on the first sequence of distinguishing bit indexes and the preliminary candidate keys identified by the plurality of first stage decoders;

a second stage decoder coupled to the distinguishing bit selection module and configured to identify at least one secondary candidate key in the database having a matching prefix with the search key based on the second sequence of distinguishing bit indexes and the search key, wherein the plurality of first stage decoders is further configured to generate a first sequence of key indexes each indentifying a preliminary candidate key identified by the plurality of first stage decoders and the second stage decoder is further configured to generate a second sequence of key indexes each indentifying a secondary candidate key of the at least one secondary candidate key;

a priority encoder coupled to the second stage decoder and configured to select the last key index in the second sequence of key indexes;

a key memory coupled to the priority encoder, the key memory configured to store the sequence of keys and select a candidate key in the sequence of keys based on the selected key index; a longest candidate prefix module coupled to the key memory and configured to identify a most significant distinguishing bit index between the search key and the selected key; and a longest prefix match module coupled to the longest candidate prefix module and configured to identify a longest matching prefix key in the at least one secondary candidate key based on the most significant distinguishing bit index, the longest matching prefix key being the secondary candidate key of the at least one secondary candidate key having a longest matching prefix with the search key.

4. The machine of claim 3, wherein the longest candidate prefix module is further configured to determine whether the search key matches the selected candidate key.

5. The machine of claim 3, wherein the longest candidate prefix module is further configured to generate a pseudo key based on the search key and the selected key and to identify a predecessor key or a successor key in the sequence of keys based on the pseudo key, the pseudo key comprising the longest matching prefix between the search key and the selected candidate key following by a sequence of bits each having a value of the most significant distinguishing bit, and the search engine further comprising a key insertion module configured to insert the search key into the database based on the predecessor key or the successor key.

6. A method a searching a database comprising a first sequence of distinguishing bit indexes and a sequence of keys together representing a first digital search tile, the method comprising:

partitioning the sequence of distinguishing bit indexes into subsequences of distinguishing bit indexes;

identifying at least one preliminary candidate key in the database for each subsequence of distinguishing bit indexes based on a search key;

generating a second sequence of distinguishing bit indexes based on the subsequences of distinguishing bit indexes and the identified preliminary key candidates, the second sequence of distinguishing bit indexes and the identified preliminary key candidates together representing a second a digital search trie;

identifying at least one secondary candidate key in the database having a matching prefix with the search key based on the second sequence of distinguishing bit indexes, wherein identifying the at least one preliminary candidate key in the database for each subsequence of distinguishing bit indexes in the sequences of distinguishing bit indexes comprises generating a first sequence of key indexes each identifying a preliminary candidate key of the identified preliminary candidate keys, and wherein identifying the at least one secondary candidate key in the database comprises generating a second sequence of key indexes each identifying a secondary candidate key of the identified secondary candidate keys;

selecting a last key index in the second sequence of key indexes;

selecting a candidate key in the sequence of keys based on the selected key index;

identifying a most significant distinguishing bit index between the search key and the selected candidate key; and identifying a longest matching prefix key in the at least one secondary candidate key based on the most significant distinguishing bit index, the longest matching prefix key being the secondary candidate key of the at least one secondary candidate key having a longest matching prefix with the search key.

7. The method of claim 6, further comprising determining whether the search key matches the selected candidate key.

8. The method of claim 6, further comprising: generating a pseudo key based on the search key and the selected key; identifying a predecessor key or a successor key in the sequence of keys based on the pseudo key, the pseudo key comprising the longest matching prefix between the search key and the selected candidate key following by a sequence of bits each having a value of the most significant distinguishing bit, and inserting the search key into the database based on the predecessor key or the successor key.

* * * * *